United States Patent
Almblad et al.

[11] Patent Number: 5,807,042
[45] Date of Patent: Sep. 15, 1998

[54] METHOD AND APPARATUS FOR AUTOMATICALLY MAKING KEYS

[76] Inventors: Robert Almblad, 440 Banbury Rd., Mundelein, Ill. 60060; John Blin, 1903 Stanton Ct., Arlington Heights, Ill. 60004; Paul Jurczak, 1662 Vineyard Dr., Gurnee, Ill. 60031

[21] Appl. No.: 477,224

[22] Filed: Jun. 7, 1995

Related U.S. Application Data

[63] Continuation of PCT/US94/14862 Dec. 22, 1994.

[51] Int. Cl.⁶ .................................. B23C 3/28; G05B 1/00
[52] U.S. Cl. ............................. 409/83; 250/202; 250/560; 356/376; 364/474.03; 409/81; 409/96
[58] Field of Search .................................. 409/82–83, 81, 409/80, 96, 131, 132; 76/110; 348/95; 250/202, 560, 561; 356/376, 393; 358/293, 291, 292; 364/474.03, 474.17; 382/8

[56] References Cited

U.S. PATENT DOCUMENTS

| | | | |
|---|---|---|---|
| 4,300,170 | 11/1981 | Sakamoto | 358/484 |
| 4,300,836 | 11/1981 | Holmes et al. | 250/202 X |
| 4,652,738 | 3/1987 | Nishihara et al. | 250/202 |
| 4,652,765 | 3/1987 | Nishihara | 250/560 |
| 4,653,104 | 3/1987 | Tamura | 356/376 X |
| 4,803,371 | 2/1989 | Durland | 250/560 |
| 4,845,764 | 7/1989 | Ueda et al. | 382/8 |
| 4,929,843 | 5/1990 | Chmielewski et al. | 250/561 |
| 5,119,190 | 6/1992 | Lemelson | 348/95 |
| 5,127,532 | 7/1992 | Cimino et al. | 76/110 X |
| 5,128,531 | 7/1992 | Fadel | 409/81 X |
| 5,255,199 | 10/1993 | Barkman et al. | 364/474.17 |
| 5,307,151 | 4/1994 | Hof | 356/376 |

FOREIGN PATENT DOCUMENTS

| | | | |
|---|---|---|---|
| 2489535 | 3/1982 | France | 409/83 |
| 120944 | 6/1987 | Japan | 409/80 |
| 4093150 | 3/1992 | Japan | 409/80 |
| 5237743 | 9/1993 | Japan | 409/80 |

*Primary Examiner*—William R. Briggs
*Attorney, Agent, or Firm*—Michael R. McKenna

[57] ABSTRACT

The invention relates to a key making machine that automatically extracts characteristics of an object key without human intervention. An object key is automatically aligned, key characteristics extracted and compared with known key manufacturers' information stored in memory, an appropriate key blank in a robotically accessible inventory is selected, cut, deburred, and automatically dispensed to the customer.

103 Claims, 19 Drawing Sheets

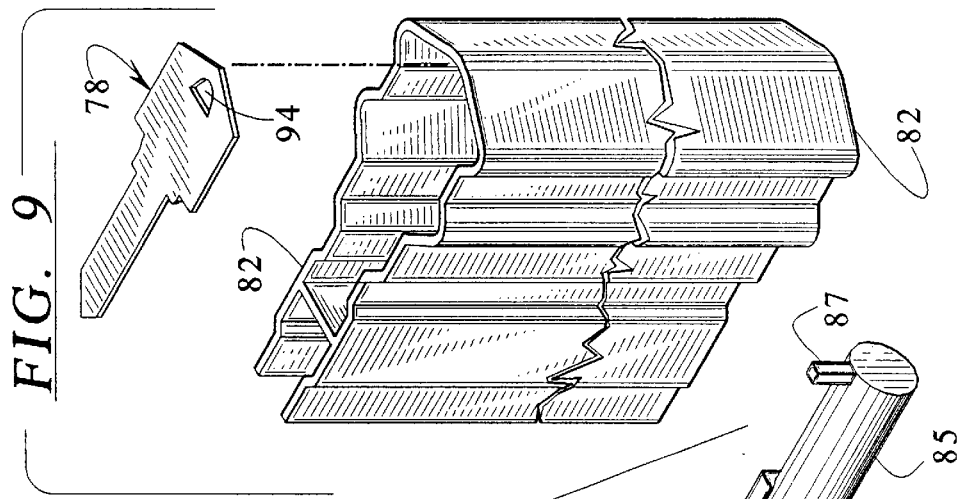
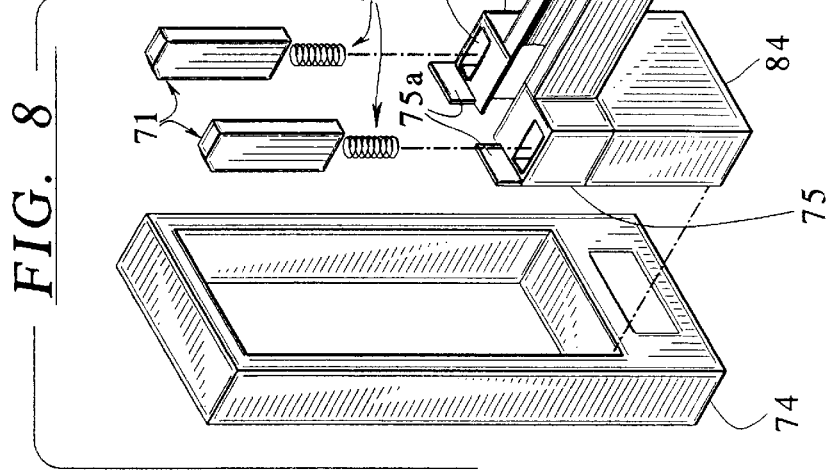
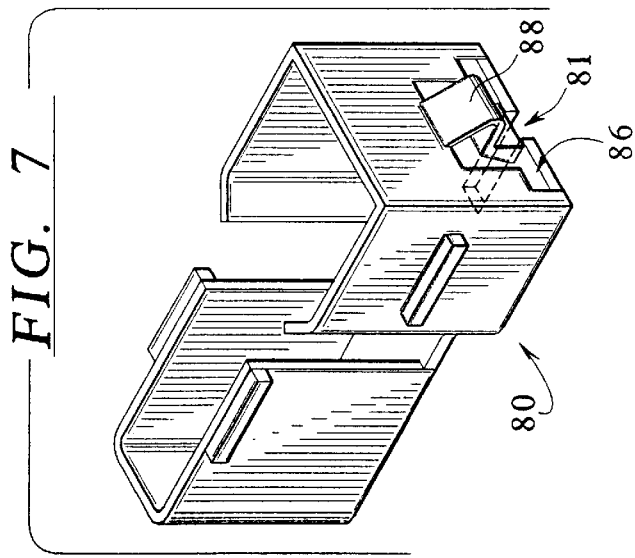

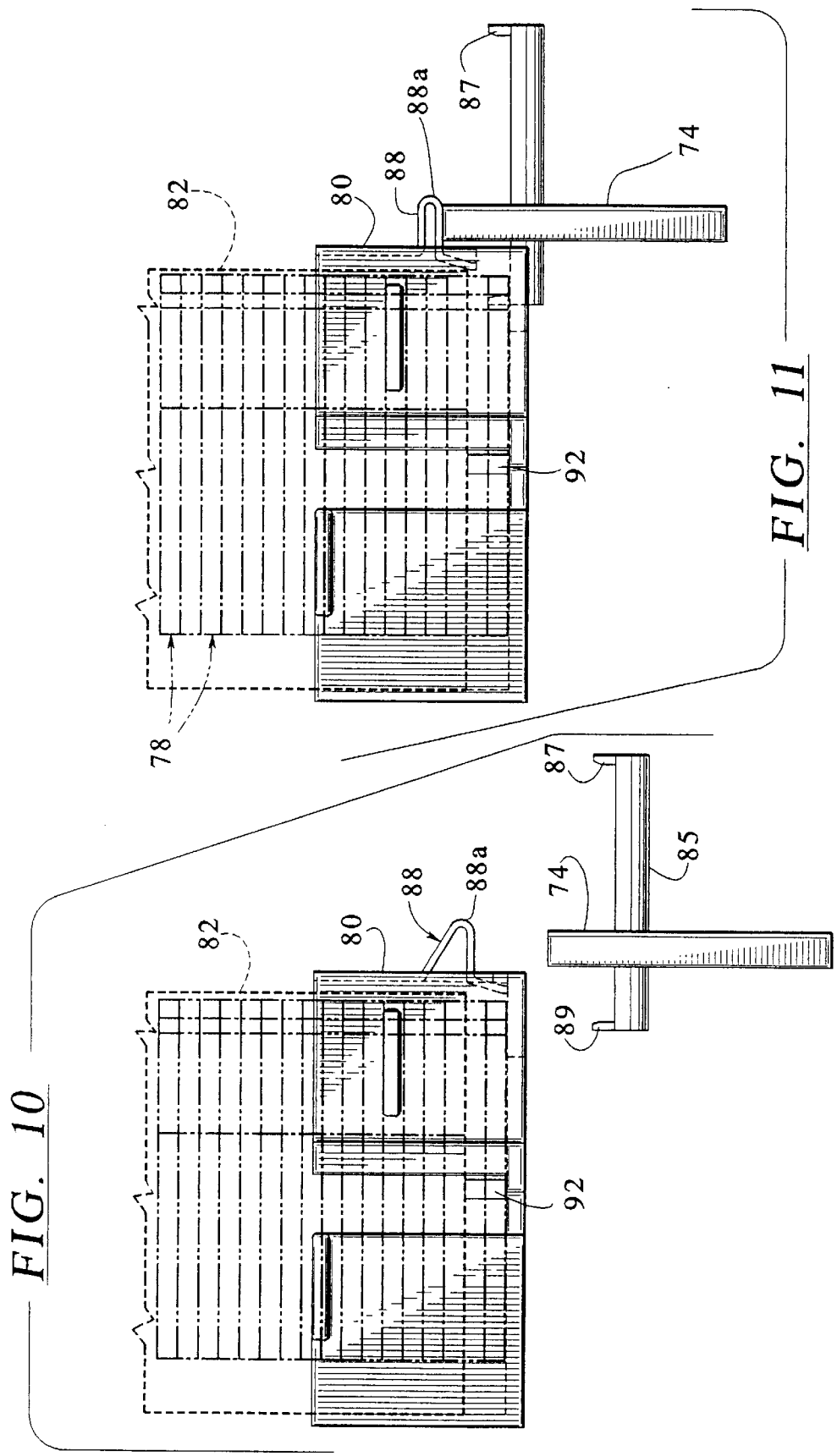

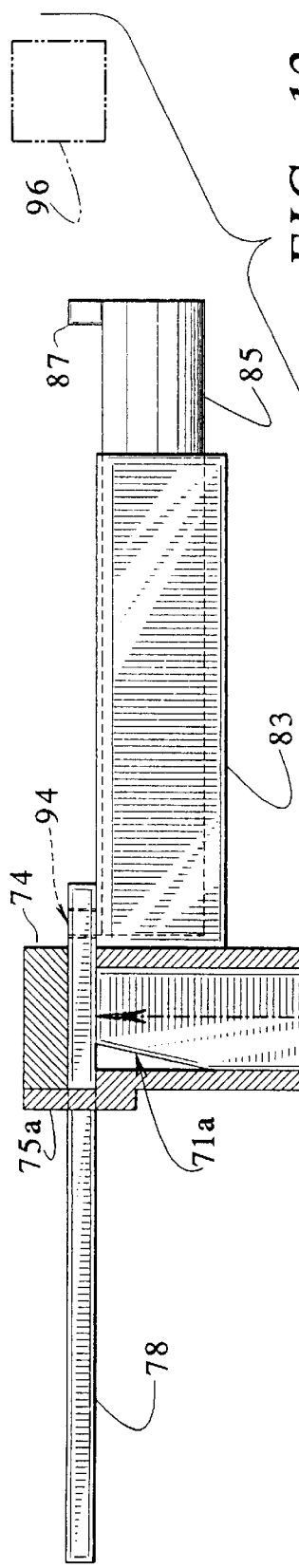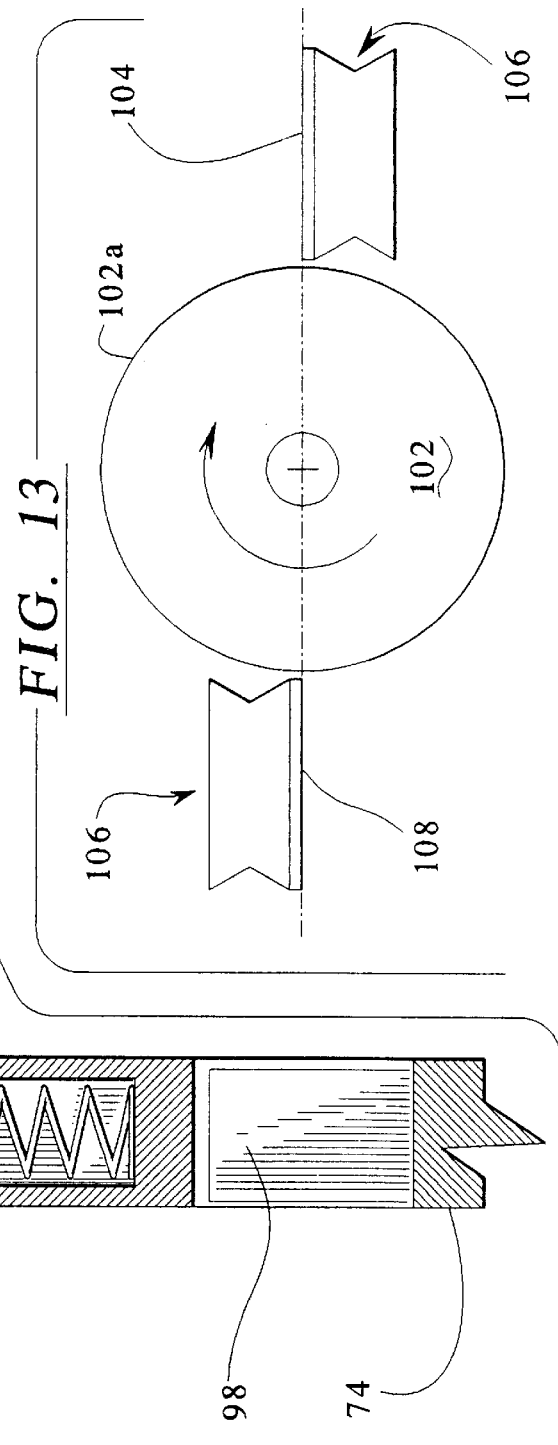

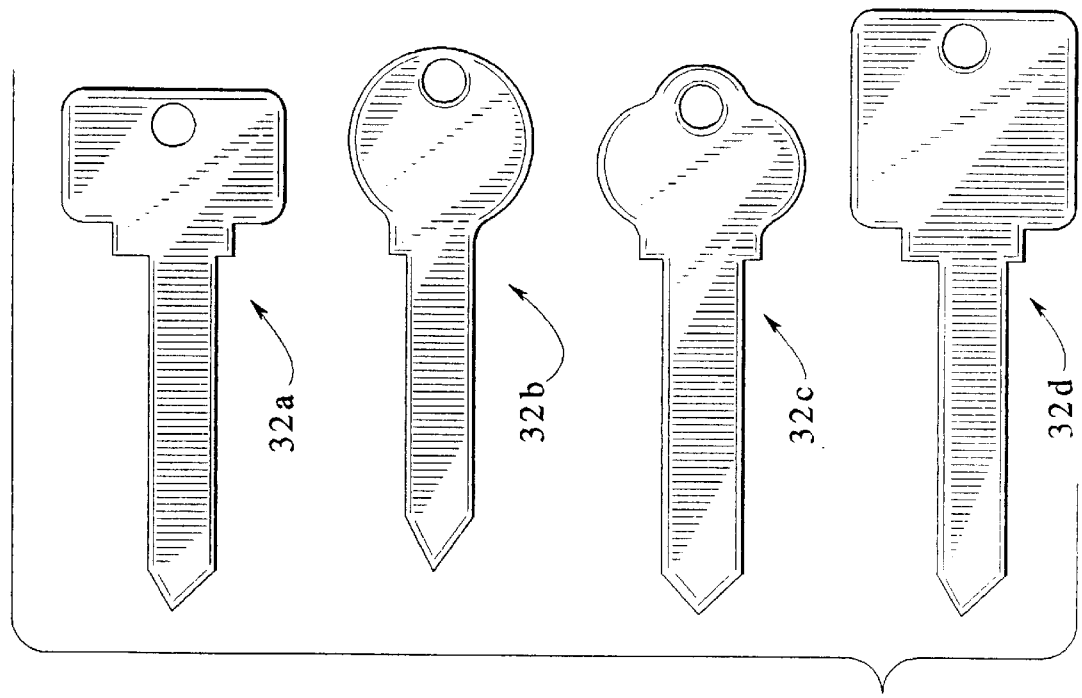
FIG. 15
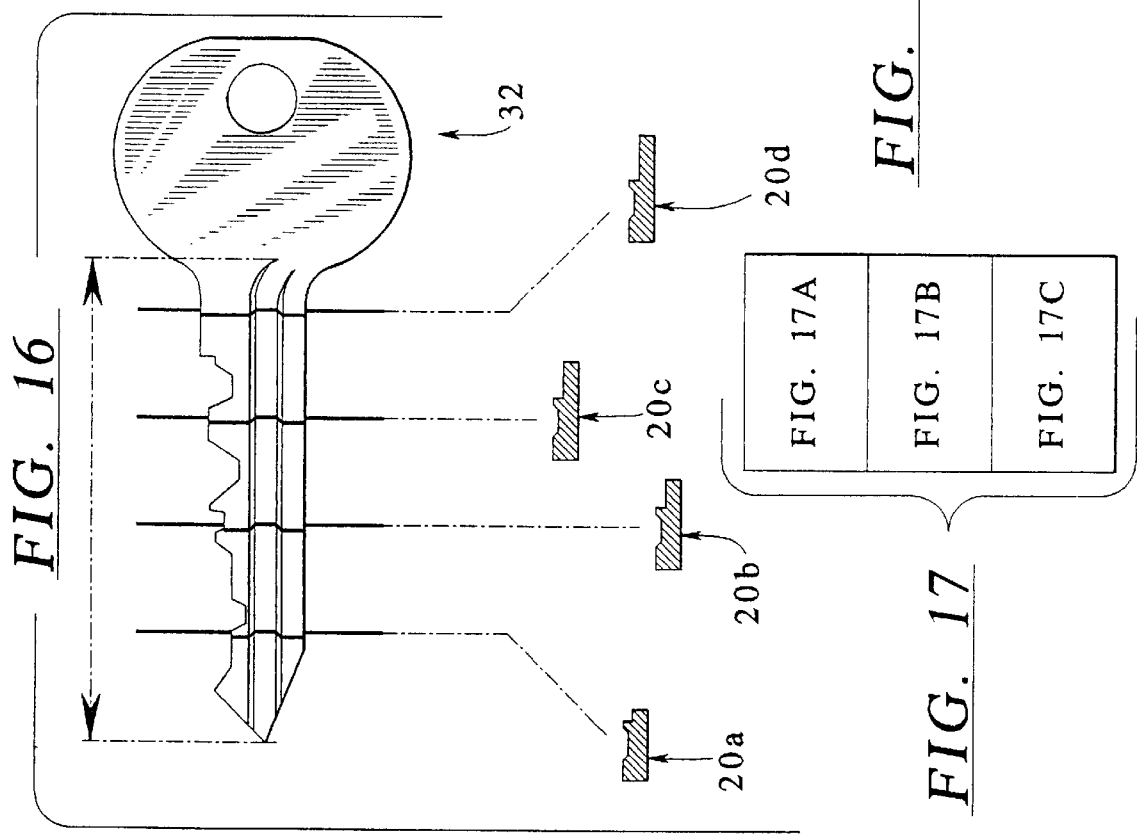
FIG. 16
FIG. 17
| FIG. 17A |
| FIG. 17B |
| FIG. 17C |

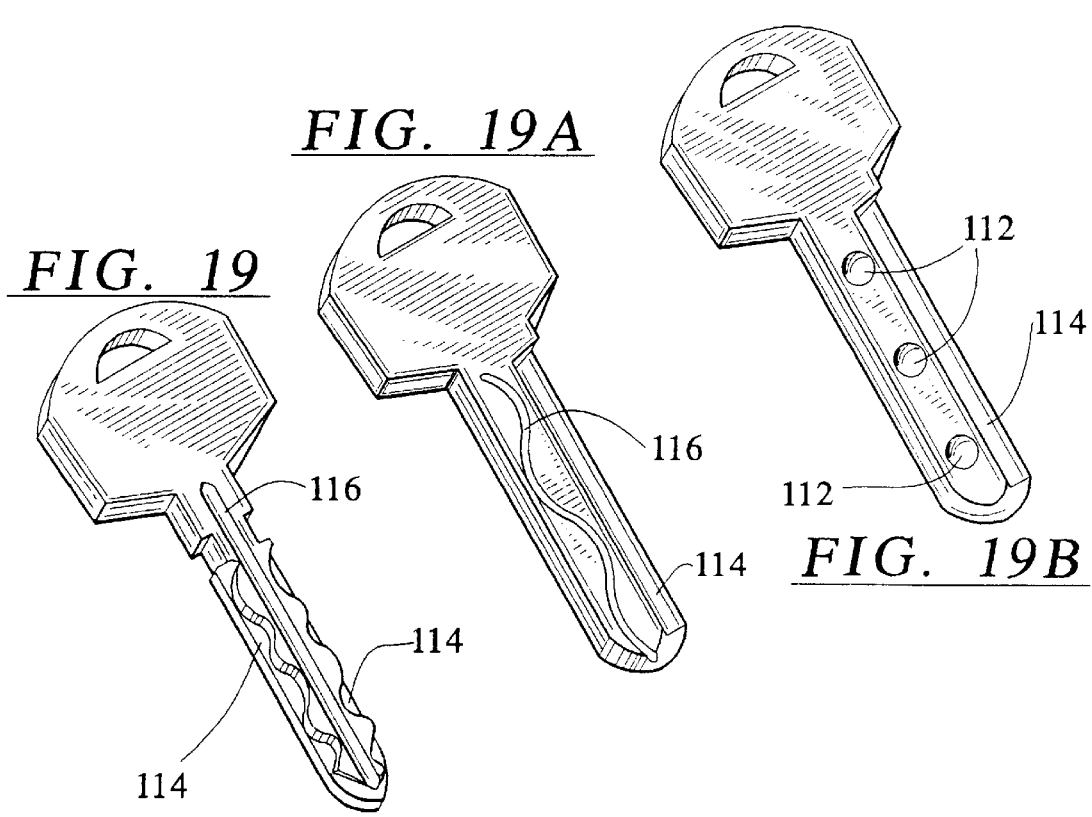

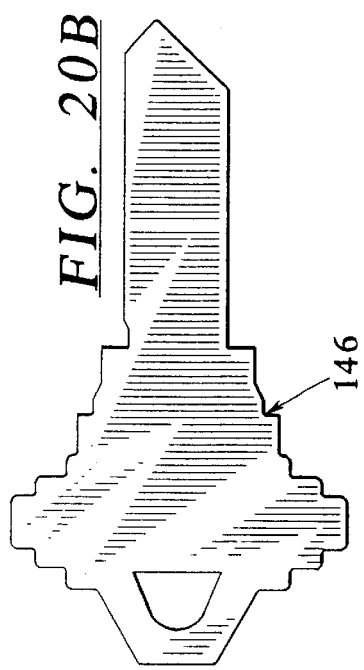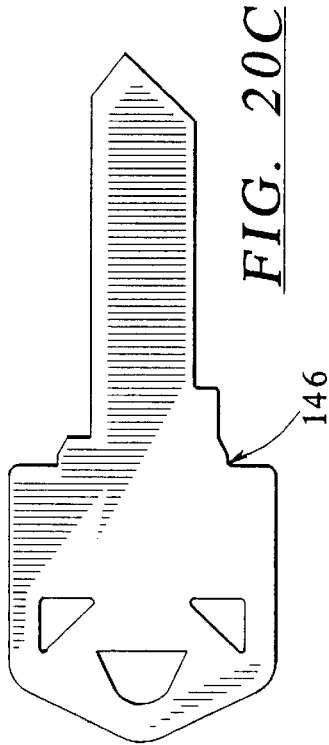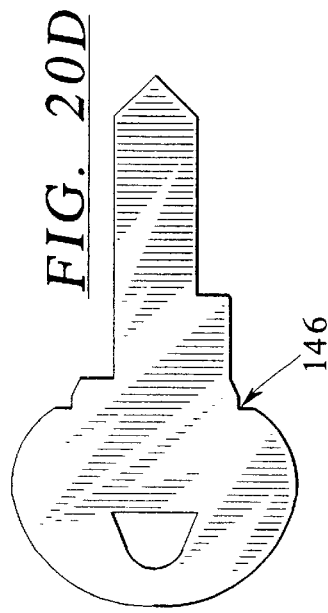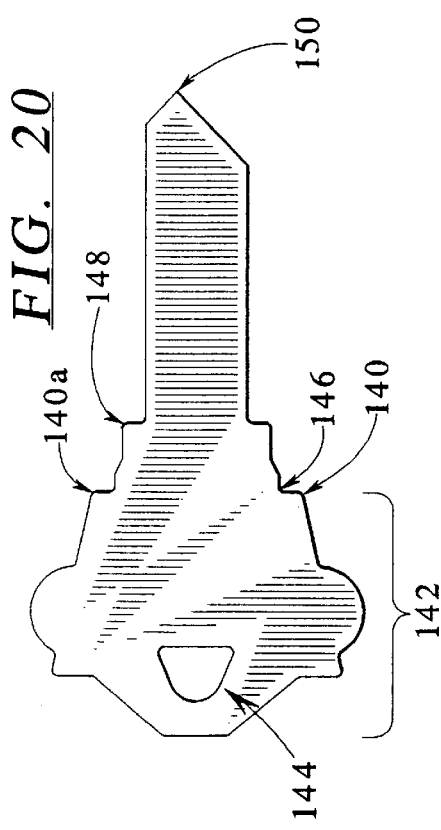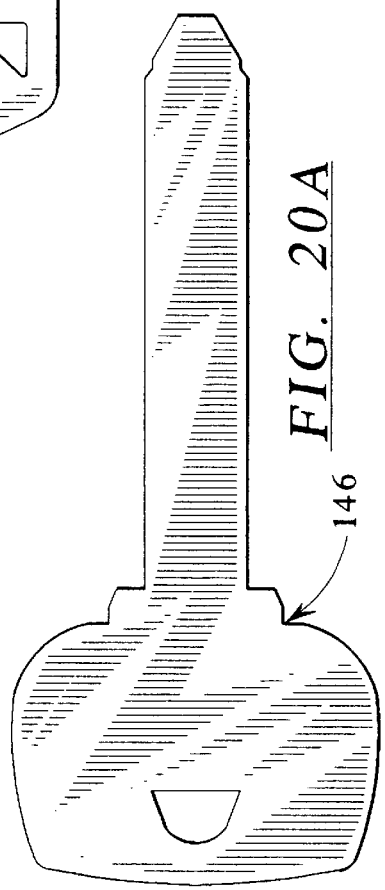

METHOD AND APPARATUS FOR AUTOMATICALLY MAKING KEYS

The applicant claims the benefit of the following prior filed copending international application designating the United States of America by the same inventors: International Application No. PCT/US94/14862; International Filing Date: Dec. 22, 1994.

TECHNICAL FIELD

This invention generally relates to methods and apparatus for automatic key making. More particularly, the invention extracts key attributes of an object key without mechanically fixturing and without physically contacting the key after the key making apparatus independently positions the object key for such extraction without human intervention.

BACKGROUND OF THE INVENTION

The key making art has taught us that each lock manufacturer has adopted a number of different key blanks, each with its own unique shape and specific groove characteristics. Furthermore, for each key blank its manufacturer has assigned one or more known key cut codes that define the manner in which the key blank can be cut to match the manufacturer's lock.

There are several thousand types of key blanks in the world. When a key is presented to be duplicated by a locksmith, he must be skilled at looking, inspecting, and measuring the customer's key (object key) to determine which key blank it is among the thousands made, and he must also be skilled at trace cutting the notches (cuts or bits) of the customer's key into a correctly identified key blank. If the wrong key blank is chosen, then it will not operate in the customer's lock. Also, if the key cuts are not traced precisely, then the new key will not work in the lock.

The traditional method of key identification is to inspect the handle (bow) and any stamping, the grooves, and the length. What has not been done, is to measure the cuts in a key, and then compare this information to the grooves and/or outer shape to determine the type of key blank.

For each key with an elongated blade and a handle, the blade has longitudinal grooves determined by the manufacturer to match its locks. Notches are cut into at least one side of the blade. The handle normally has a hole disposed along the longitudinal centerline which is adapted to allow the key to be used on a key ring. The grooves of a key begin at the point that the blade extends from the handle.

The manufacturer's key cut codes define the relationship between the cuts and key blank, and between one cut and another. The following characteristics (attributes) are representative: (1) the distance from the key shoulder to the center of the first cut; (2) the distance between cuts, i.e. the distance being measured from the center of one cut to the center of an adjacent cut; (3) the depth of each cut; (4) the angle of each cut; (5) the length of the flat at the bottom of each cut; (6) the distance between the tip and key shoulder; and (7) the distance from the key shoulder to the center of the first cut. Once attributes, such as key outer shape, groove characteristics, and key cut features of an object key can be extracted, recognized, and compared to that which was supplied by an original key manufacturer, a new key duplicating the original can be automatically selected and cut.

Since the shape of the blade, grooves and key cut codes define the functional features of a key, this is the information that must be identified and utilized to make a proper key. In other words, if the shape of the blade, key cut codes, or grooves are wrong, the key will not operate the lock. Even though the handle may be different, if the shape of the blade, codes, and grooves are correct, it will still operate the lock.

Various types of key making machines currently exist which identify and utilize a key manufacturer's coding to duplicate a customer's key. However, none of the following patents teaches a method or apparatus that extracts key cut codes of an object key absent some means of physically making referential contact with the object key. Nor do the patents discussed disclose a method or apparatus that extracts the aforementioned key attributes without physically making referential contact with the key after the key making apparatus independently positions the object key for such extraction without human intervention.

U.S. Pat. No. 2,070,228, issued in 1935, is the seminal patent relating to key cut codes. The device taught measures relative depth of key cuts using spring loaded tumblers which make physical contact with the key cuts. Analysis of the slope of the key cut is not considered. The acquired data is then used by a locksmith to determine an appropriate key code.

U.S. Pat. No. 4,090,303, relating to a key decoding apparatus, discloses a method of determining the original key cuts utilizing manufacturers' predetermined key cut depth and spacing. The key decoding apparatus disclosed employs an index card having sequential indexes thereon corresponding to a predetermined coded depth of the key desired to be duplicated. This card is inserted into a housing and the key to be duplicated is inserted into a slot in the housing where it engages an indexing member which enters one of the key cuts on the key and indicates on the card the coded depth of that key cut. The angle of the cut of the same key cut may also be determined. The remaining key cuts of the key may be decoded in like manner.

The '303 disclosure does not teach the use of key cut spacing and depth to determine the key blank, rather this determination is left to the locksmith. It neither aids in the selection of a manufacturer's index (coding) card nor in the selection of a key blank. What '303 does disclose is that when a manufacturer's predetermined key cut depth and spacing index card is independently selected by the locksmith, the correct depth of the key cuts can be duplicated. The same index card is then inserted into a housing which includes an indexing drum having key cuts therein with spacing that corresponds to the predetermined coded spacing of the key to be duplicated.

Some of the drawbacks to these designs are that each teaches the utilization of a manufacturer's index card data as the criteria to determine which key blank is appropriate. But an individual locksmith first has to determine which key blank he will use without the use of the manufacturer's index cards.

Alternative technology is available in the form of U.S. Pat. No. 3,865,011 issued to Patriquin in 1975 which reveals an automatic key duplicating apparatus which discloses a sample device for receiving and retaining a sample key in a vice. The principal disadvantage of such a device is its requirement for proper positioning requiring the skills of a mechanical operator such as a locksmith.

Additionally, U.S. Pat. No. 3,796,130 issued in 1974 to Gartner reveals a semi-automatic key duplicating and vending machine. This device requires the customer to place his key into one of a plurality of slots, each slot adapted to receive a key blade of a different cross-section corresponding to the shape of one of the key blanks in storage. Selection of the proper slots provides a means for selecting the appropriate key blank in storage and automatically positions such blank for trace cutting a duplicate profile to that of the customer's key. The principal disadvantages of such a device are that smaller keys fit into larger holes, its inability to determine the differences in key blade length or shoulder position which can distinguish one key blank from another, and the fact that this device merely duplicates the cut features of the customer's key which may be overly worn.

U.S. Pat. No. 4,717,294 discloses a key cutting device which cuts key blanks by employing a set of coded depth keys supplied by the lock manufacturer.

U.S. Pat. No. 4,899,391 discloses a system for identifying an appropriate key blank from a pattern comprised of a plurality of horizontal grooves of a predetermined depth and spacing taken from the image of the front profile of the key. The principal disadvantage of such a device is its need to be precisely fixtured and it needs to take images of the grooves from the blade tip. Length of the blade and shoulder position cannot be determined and discontinuities result from slight bends in the blade and/or surface imperfections. Moreover, keys with worn tips cannot be read accurately at all.

U.S. Pat. No. 3,442,174 issued to Weiner et al. for a key blank dispensing and cutting apparatus which requires the assistance of the customer in selecting a slot in which to insert the blade of the key. Once having found the slot, the blank identification process is completed. Unfortunately, the apparatus only allowed for identification of the profile of the key and could not take into account keys having identical profiles and varying lengths and shoulder positions and smaller keys that fit into larger holes. Moreover, the apparatus was limited to forty eight known key blanks, whereas the instant device teaches no such limitation. Additionally, the selection method disclosed reveals mechanical push rods, one for each of forty eight key blanks to push a key blank out of its respective key blank container. In the instant device only one robotic means for withdrawal of a key blank from a key dispenser is required for all stored key blanks.

Other representative art includes U.S. Pat. Nos. 5,245,329, 5,050,462, 4,929,129, and 3,358,561.

These earlier methods and apparatus for automatic key making required skill on the part of the operator to fixture the object key in some fashion and to have some special knowledge of key blanks with some kind of training. Moreover, the prior art methods to decode keys required instruments and gadgets that only locksmiths would be familiar with.

While unrelated to the key making art, the following patents are nevertheless of note. U.S. Pat. No. 4,809,341 teaches a method and apparatus used in semiconductor device fabrication for a reticle or mask image, which has a slight modification of reduction or magnification, using a comparison method in which the real image pattern is compared with the pattern produced from design data; and U.S. Pat. No. 4,805,224 which reveals a pattern recognition method and device employing second order differential analysis of distinctive features. Other art referenced in the International Search Report includes U.S. Pat. Nos. 4,143,582; 4,324,513; 5,129,010; 5,193,120; 4,899,391; and 3,796,130.

The citation of the foregoing publications is not an admission that any particular publication constitutes prior art, or that any publication alone or in conjunction with others, renders unpatentable any claim of the present application. None of the cited publications is believed to detract from the patentability of the claimed invention.

Unlike the key vending machines referenced above, the important invention disclosed herein is designed to be operated by an inexperienced customer who possesses neither the skills of a trained locksmith nor those of a skilled imaging operator.

Moreover, deficiencies in the prior art relating to proper sizing of the object key, elimination of distortions and surface flaws, and the need to mechanically fixture the object key have not been remedied by the art disclosed.

No other device for automatically making keys has disclosed a non-contact means for extracting laterally exposed attributes, comprising three dimensional grooves, outer shape and laterally exposed key cuts, of an object key. Nor has the prior art taught a key making apparatus or method that automatically establishes an operative positional relationship between an object key and the key making machine without pre-fixturing the object key in a vice or some other holding device.

To alleviate these problems, and others which will become apparent from the disclosure which follows, the present invention provides a key making apparatus that automatically establishes an operative positional relationship between an object key and the components of the apparatus that extract information from an object key, extracts the attribute information necessary for it to determine the correct key blank and the correct key cut codes and a method of automatically cutting the correct codes in to a key blank despite any deficiencies in the codes of the object key.

Attribute information is extracted by the instant apparatus automatically reading an object key and comparing the attributes of the object key with a master pattern memory of known manufacturers' keys. Then it selects the proper matching key blank and cuts it to the original key cut codes established by the manufacturer. Alternatively, the key blank can be trace-cut, duplicating the used attributes of the object key. Alternatively, key cuts hybridizing the key cut features of the object key and the key cut codes of a known manufacturer's key may be determined for use with the corresponding key blank.

ADVANTAGES OF THIS INVENTION

Unlike the foregoing devices which teach structures that require fixturing an object key requiring the precision of a trained locksmith to properly place the key within a vice or similar holding device, the instant invention allows the key to be loosely situated within a specified but yet broader area. Thereafter, the key making machine operates automatically to position the key, to extract key attributes so that a corresponding key blank stored in the machine can be identified, and corresponding key cut codes can be identified and cut into the corresponding key blank to make a new key conforming to the manufacturer's original specifications. Every necessary aspect of the key making process has been incorporated into the preferred embodiments of the instant apparatus.

Furthermore, a superior method and apparatus is disclosed herein which allows the internal grooves to be identified more accurately. The prior art discussed above reveals a method for looking down the front profile of the key, that is, looking longitudinally from the tip of the blade. This method is subject to inaccuracies due to distortions from wear and blade bending. Moreover, the system is unable to determine blade length, shoulder position, or attribute information.

By combining a backlighting method, which sees the outer shape of the key, including its key cut features, and a light stripe method, which obliquely projects a light stripe on to the blade producing a multi-dimensional image, the disadvantages of the prior art have been overcome.

Another embodiment of the instant invention comprises a non-contact method for extracting attributes of an object key. In this method and apparatus both externally exposed and laterally protected attributes may be extracted. It involves the use of a means for receiving object images, such as a camera, which has a lens capable of viewing a shallow focal plane.

The disclosed embodiments of the instant invention can identify and produce not only American made keys, but those of Europe and throughout the world having laterally protected cuts and curved grooves as well.

The instant automatic key making apparatus provides an efficient and convenient means of making new keys. The apparatus of the present invention performs all of the required functions to achieve the objective of making a key that meets the specifications of the original manufacturer. Additionally, the methods disclosed provide that the apparatus may acquire new key information which may be added to the machine's database, thus, allowing the range of applicable customer keys to expand.

Moreover, the methods disclosed herein requires no skill on the part of the operator or any knowledge of keys. Particularly when compared to the foregoing devices, the instant invention is user-friendly.

The embodiments of the disclosed invention reveal a self-service key making apparatus requiring few instructions and little or no skill or special knowledge on the part of the customer. Ease of use is a critical advantage. It is no harder to use than a photocopy machine—no greater level of complexity is required.

Still other advantages will be apparent from the disclosure that follows.

SUMMARY OF THE INVENTION

The invention relates to methods and apparatus for automatically making keys by extracting key cut codes, or other attributes, of an object key without physically contacting the key in such extraction process. Additionally, the key making apparatus may independently position the object key for such extraction without human intervention.

The key making apparatus may comprise a transparent section on which an object key may be supported which is rotatable, and a backlighting means is used to pass light through the transparent section and project an image of the object key. From the image received, the position of the longitudinal centerline of the object key relative to a fixed datum is determined and an output signal generated. The object key may then be rotated to align it. Object key attributes may thus be extracted without fixturing or confining the object key in a holder or like device and a correct key blank may be identified.

Moreover, after extracting essential attribute information which is then compared with known key manufacturer's information stored in memory, an appropriate key blank in a robotically accessible inventory is selected, cut, deburred, and automatically dispensed.

BRIEF DESCRIPTION OF THE DRAWINGS

Preferred embodiments of the invention are described hereinafter with reference to the accompanying drawing wherein:

FIG. 7 is a perspective view of a preferred embodiment of the dispenser cup showing its hinged door;

FIG. 8 is a perspective view of a preferred embodiment of the key effector showing a clamp and spring biased block in an exploded format;

FIG. 9 is a perspective view of a preferred embodiment of the key holding container showing its relationship to one key blank of a stack of key blanks;

FIG. 10 is a side elevation view of a preferred embodiment of the dispenser cup with the hinged door closed and the key holding container, shown in phantom, disposed therein, and the clamp and rod of the key effector in a pre-engagement position;

FIG. 11 is a side elevation view of a preferred embodiment of the dispenser cup with the hinged door engaged by the clamp of the key effector to open same and the key holding container, shown in phantom, disposed therein, and a pin disposed upwardly on the rod engaged with a hole in the handle of a key blank;

FIG. 12 is a partial cut-away side elevation view of a preferred embodiment of the key effector with the key blank secured in position for cutting;

FIG. 13 is a side elevation view of a preferred embodiment of a rotatable cutting wheel and associated anvils for cutting a key blank;

FIG. 15 is a top plan view of representative shapes of different keys;

FIG. 16 is a top plan view of a cut key and representative light stripes projected thereon, with a representation of the characteristics of the key from the respective light stripes;

FIGS. 19, 19A, and 19B, are, respectively, perspective views of a key having laterally protected attributes: FIG. 19 showing a key having laterally protected key cuts and a linear groove, FIG. 19A showing a key having a laterally protected linear groove and a laterally protected curved groove, and FIG. 19B showing a key having a laterally protected linear groove and a plurality of laterally protected recessed dimples;

FIGS. 20, 20A, 20B, 20C, AND 20D, are, respectively, top plan views of representative shapes of different key blanks, each having a uniformly disposed hip to support registration of the key blank when secured by the key effector (not shown);

DETAILED DESCRIPTION OF THE INVENTION

Figure 1:
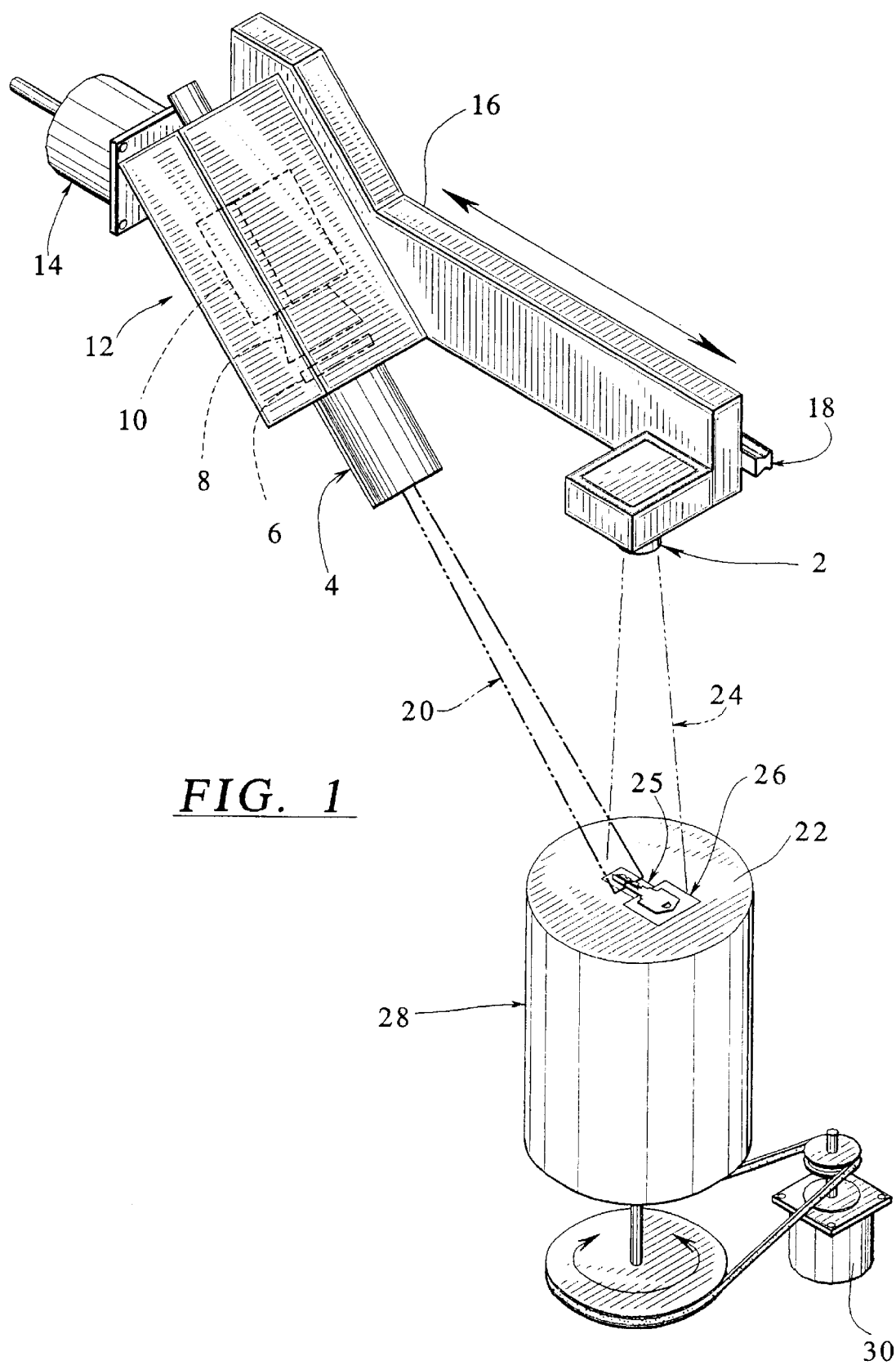
FIG. 1 is a perspective view of a preferred embodiment of a rotatable object key supporting means and an assembly of the light stripe generator and camera of the automatic key making apparatus of the present invention.

The preferred embodiments depicted in the drawing include an automatic key making apparatus, a flow diagram of a preferred method of operation, and a block diagram of various components. The discussion that follows, without limiting the scope of the invention, will refer to the invention as depicted in the drawing, showing methods and embodiments of an apparatus that will automatically make new keys requiring only minimum skill on the part of the user (customer).

A preferred method for automatically making keys comprises establishing an operative positional relationship between an object key and a means for extracting attributes of an object key while leaving the object key independent of constraint and then extracting attributes of an object key.

This method is achieved by an automatic key making apparatus, which in one of its preferred embodiments, orients the object key into an operative positional relationship before extracting its attributes, leaving the object key independent of constraint. In another embodiment laterally exposed attributes are extracted independent of physical contact.

One method for automatically making keys comprises establishing an operative positional relationship between an object key and a means for extracting laterally protected attributes of an object key while leaving the object key independent of forcible holding and extracting laterally protected attributes of an object key independent of physical contact.

In a preferred embodiment of the invention both laterally protected and laterally exposed attributes of an object key are recognized and compared with a master pattern memory to identify a corresponding key blank having a hole in the handle and its associated key cut code.

Another method comprises receiving an object key on a rotatable means for supporting an object key having a transparent section, backlighting the object key by passing light through a transparent section of the supporting means and projecting an object image, receiving at least one object image of the object key, determining from the object image the position of the longitudinal centerline of the object key in a generally horizontal position relative to a light stripe which may be projected on to the object key by a light stripe generator, producing an output signal corresponding to the determination, and rotating the means for supporting an object key for alignment with a line perpendicular to the light stripe.

Any structured light may be used for applications requiring surface feature extraction. Structured light being defined as any method, including filtering, polarizing, lensing, aperturing, and light placement at appropriate angles of incidence, that controls the light path between its source, the illuminated object and the camera.

In its preferred form, collimated light in which all of the light waves travel parallel to one another, is used to produce sharply defined shadows of parts placed in its path which can be cast either directly onto a sensor or on to a flat surface where it can then be measured. Backlighting produces a silhouette image of an object contour or polyline. A preferred embodiment utilizes for a backlight source a 7 watt bulb with a light diffuser of opaque plastic.

Figure 4:
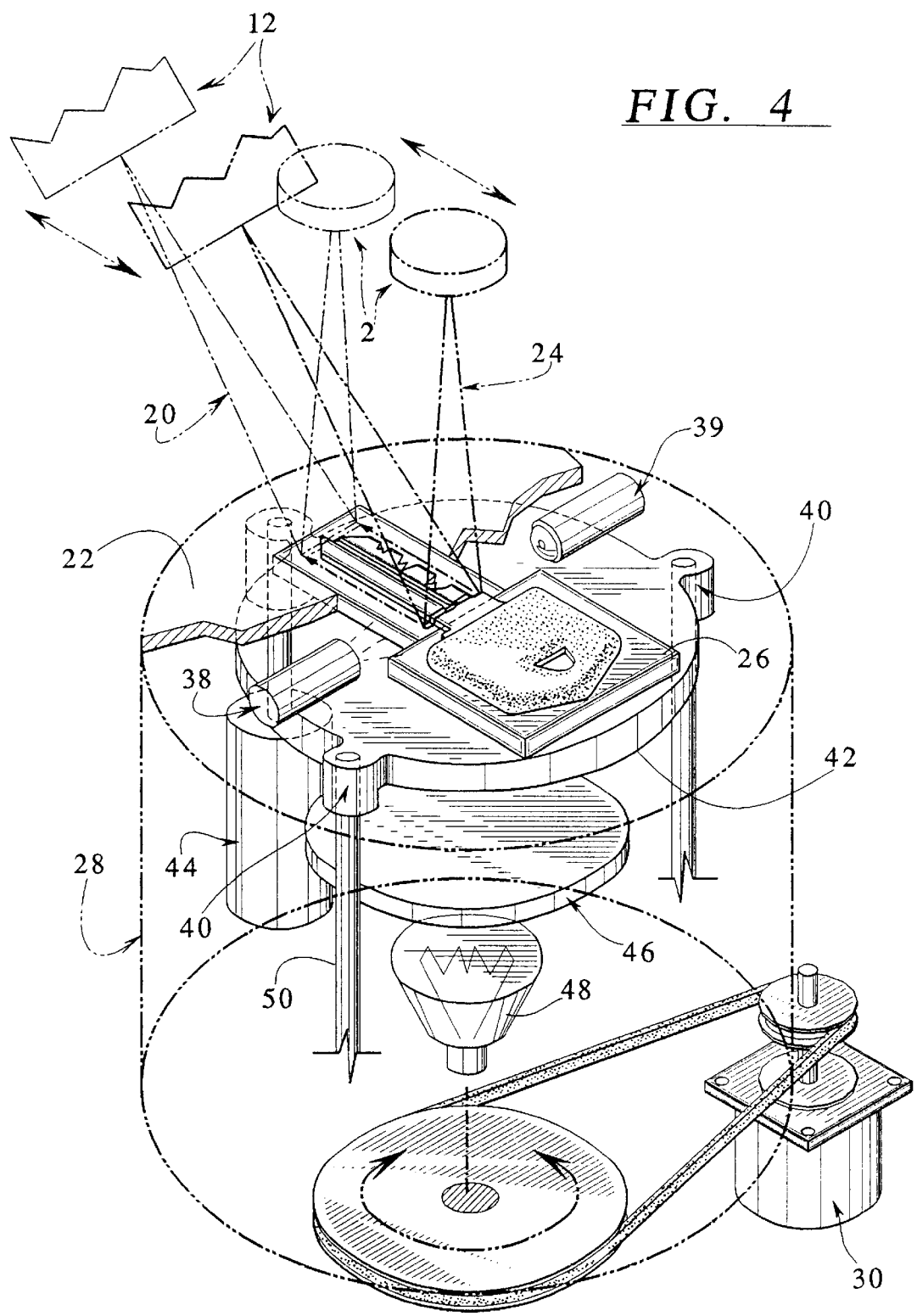
FIG. 4 is a cut-away perspective view of a preferred embodiment of the rotatable object key supporting means showing the backlighting means, the horizontal adjustment means, and tandem movement of the assembly of the light stripe generator and camera of the automatic key making apparatus of the present invention.

As shown in the drawing, this invention establishes an operative positional relationship between the object key 32 and the automatic key making apparatus. The pedestal 28 on which the object key may be placed may be rotated by an offset motor drive 30, as shown in FIG. 4. Thus, even if a customer does not orient the object key 32 properly, backlighting will reveal its orientation and the transparent section (blade section 25 and handle section 26, taken together) of the pedestal 28 can be rotated to re-orient the object key. The camera 2 is used to receive the object image of the object key 32 produced by backlighting and it produces an output signal which can be processed by computer to determine the position of the longitudinal centerline of the object key 32 relative to a fixed datum.

A key method of establishing an operative positional relationship between an object key and a means for extracting attributes of an object key while leaving the object key independent of constraint and may be employed with any known method of extracting attributes of an object key including those utilizing physical contact.

Another method for automatically making keys involves aligning an object key with a horizontal plane.

Figure 2:
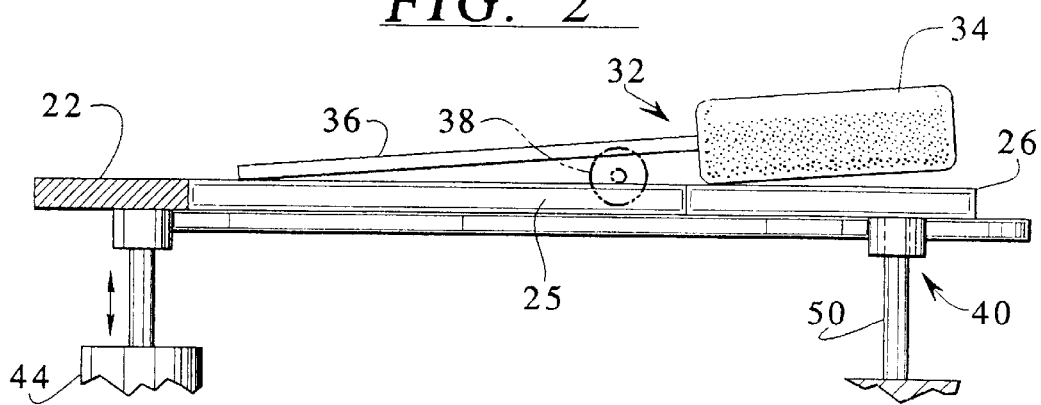
FIG. 2 is a fragmentary side elevation view of a preferred embodiment of a transparent section of the object key supporting means with an object key disposed in a sloped position thereon of the automatic key making apparatus of the present invention.
Figure 3:
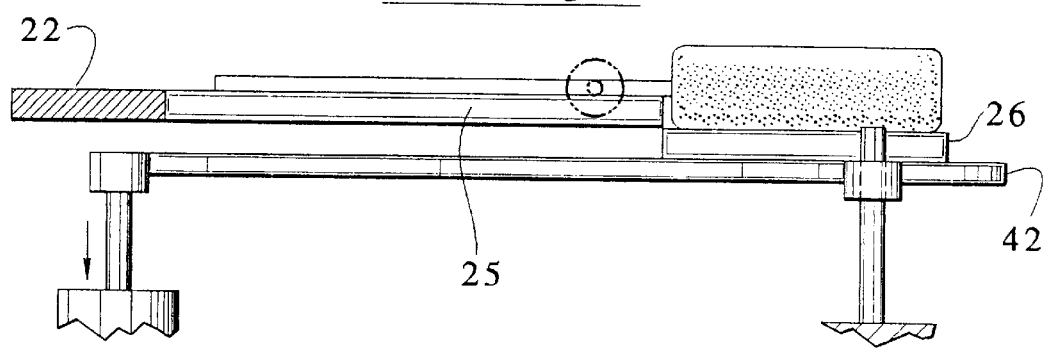
FIG. 3 is a fragmentary side elevation view of a preferred embodiment of the transparent section of the object key supporting means of FIG. 2 with the handle section lowered and horizontal light obstructed by the blade of the object key disposed flatly on the blade section thereof of the automatic key making apparatus of the present invention.

As best shown in FIGS. 2 and 3 of the drawing, the present invention provides that when an object key 32 is placed on the transparent section (25, 26) of the pedestal 28, it may not be lying flat due to a bulky key handle 34. The instant invention remedies this problem utilizing a horizontal light generator 38 and horizontal light receiver 39 (see FIG. 4) positioned immediately above the pedestal 28 that allows light to be transmitted and received under the key blade 36. The handle 34 can then be lowered until the blade 36 is positioned flatly on the blade section 25.

In this embodiment of the apparatus, the transparent section has a blade section 25 proximate to a handle section 26 and the handle section is movable vertically from an upper position which is parallel to the plane of the blade section (illustrated in FIG. 2) to a lower position at a spaced distance below the plane of the blade section (illustrated in FIG. 3). The handle section 26 is sized and adapted to support the handle of an object key 32 that has a blade 36 and a handle 34. The blade section 25 is sized and adapted to support the blade of an object key.

The means for aligning an object key with a horizontal plane includes a horizontal light generator 38 arranged and adapted to project a generally horizontal beam of light immediately above the transparent section and transverse to the blade of an object key which may be supported on the transparent section. The light generator could be as common as a light bulb or as sophisticated as a fiber optic cable.

As best shown in FIG. 4 of the drawing, the present invention provides that when the backlight 48 turns off and a horizontal light is projected immediately above the pedestal 28 and transverse to a blade 36 of the object key 32 which is supported on a blade section 25 and an adjacent handle section 25 of the transparent section for a blade and handle, respectively, of the object key 32; and the horizontal beam of light which is not obstructed by the blade of the object key disposed on the blade section is received by a horizontal light receiver 39 which produces at least one output signal. As best shown in FIG. 2 of the drawing, if the blade 36 of the object key is not positioned flatly on the blade section 25, horizontal light above a minimum threshold will be received and the vertical elevation of the handle section 26 of the transparent section will be incrementally lowered in relation to the output signal.

The steps of the previous paragraph are repeated until the light received no longer exceeds the minimum threshold, indicating that the blade of the object key is disposed flatly on the blade section.

In some instances the customer may forget to place the object key 32 on the pedestal 28. In such instances, the horizontal leveling light will not be blocked regardless of the handle section height adjustment. This will indicate that either the key is not positioned on the transparent section or that the customer forgot to insert the key altogether, triggering a signal to open the key access door (not shown in the drawing) and the customer will be re-instructed to place the key.

By projecting a generally horizontal beam of light immediately above a means for supporting an object key and transverse to the blade of the object key which may be supported thereon and receiving the light of the horizontal beam that is not obstructed by the blade of an object key disposed on the blade section of the means for supporting an object key and producing at least one output signal, and incrementally lowering the vertical elevation of the handle section of the means for supporting an object key in relation to said second output signal, and repeating these sequential steps a specified number of times, the non-existence of an object key can be determined and an appropriate signal generated. Such signal would indicate that there was a lack of an object key blocking the light reception, which would indicate that the object key was not disposed on the supporting means. In such a case the signal would produce a response wherein an overhead light (not shown in the drawing) would be turned on, appropriate instructions would be displayed to the customer, and the access door would open.

The horizontal light generated would be obstructed by the blade of an object key, if it were disposed horizontally on the blade section of the transparent section of the pedestal, as shown in FIG. 3. Otherwise, when the blade of an object key is other than horizontally disposed in face to face contact with the blade section, the light generated will be seen by a horizontal light receiver disposed to receive light from the horizontal light generator that is not obstructed by the blade.

In the present embodiment, an output signal would be produced by the light receiver. The output signal would correspond to the quantum of light received or be generated as a fixed constant while a specified threshold of light is being received. A fiber optic sensor may be employed.

As best shown in FIG. 3 of the drawing, to adjust the vertical elevation of the handle section 26 for controlling the horizontal pitch of an object key disposed on the transparent section of the means for supporting an object key, the horizontal control means actuates a motor drive 44 to lower the handle section 26, whereby, an object key having a handle thickness larger than its blade thickness which is disposed on the transparent section of the means for supporting an object key may be aligned with a horizontal plane by lowering the handle section on which the handle of the object key is supported in finite steps in response to the output signal generated by the horizontal light receiver 39.

Alternatively, a means to raise the blade section coupled with a like movement of the horizontal light generator and receiver could be utilized to coordinate a face to face relationship between the blade section and the blade of the object key. Such an alternative system could alternatively require an adjustment of the coordinates for the imaging process. This alternative embodiment is not reflected in the drawing.

In a preferred embodiment of the automatic key making device, as shown in FIGS. 2 and 3, the means for adjusting the vertical elevation of the handle section 26 of the means for supporting an object key comprises a stepper linear actuator 44 having a shaft physically connected to the handle section 26 and at least one linear slide 40 disposed vertically for sliding support of the moving section. Servo actuators can likewise be employed. A stepper linear actuator is preferred because it can move the handle down in 0.010 inch increments.

One preferred process for automatically making keys comprises the sequential steps: a. receiving an object key on a rotatable means for supporting an object key having a transparent section; b. backlighting the object key by passing light through the transparent section of the supporting means and projecting an image; c. receiving at least one object image of the object key; d. determining from the object image the position of the longitudinal centerline of the object key in a horizontal plane relative to a light stripe projected on to the object key by a light stripe generator; e. producing an output signal corresponding to the determination; f. rotating the means for supporting an object key for alignment with a line perpendicular to a light stripe which may be projected on to the object key by a light stripe generator in relation to the output signal; g. projecting a generally horizontal beam of light immediately above the means for supporting an object key and transverse to a blade of an object key supported on the transparent section thereof, the transparent section having a blade section and an adjacent handle section for a blade and handle, respectively, of the object key; h. receiving the horizontal beam of light that is not obstructed by the blade of an object key disposed on the blade section of the means for supporting an object key and producing at least one output signal; i. incrementally lowering the vertical elevation of the handle section of the means for supporting an object key in relation to the output signal; and j. repeating sequential steps g, h, and i until the light received no longer exceeds a minimum threshold, indicating that the blade of the object key is disposed flatly on the blade section.

Operation from the customer's perspective, the customer places a key (the "object key") through an access door and on to an illuminated pedestal in accordance with the monitor's instructions. The customer may be required to close the access door (or initiate its operation by pressing a button or depositing money), which turns off an overhead light creating a small "dark room" for the key. Furthermore, closing the door trips a mechanical switch that activates the apparatus to begin the following events: a backlight 48 is turned on and an image of the object key is captured to determine the position of its longitudinal centerline and the object key is rotated a few degrees, if necessary, to be in proper alignment for a light stripe picture.

As best shown in FIG. 1 and 4 of the drawing, the present invention provides that the means for receiving an object image comprises at least one camera, the camera 2 being a pixel device for oriented fiber optic arrays. The preferred camera is available from a number of manufacturers and is a 256 grey scale CCD high resolution camera and a 4/40 lens. Signal output of the camera is sent to a frame grabber installed in the computing means. A standard 486 PC may act as the computing means.

Some of the identifying attributes of an object key are disposed on its silhouette. These laterally exposed attributes may include the outer shape, see FIG. 15, and the exposed key cuts, as shown on the object key 32 of FIG. 16. Other identifying attributes of an object key cannot be seen on the silhouette. Such laterally protected attributes may include groove characteristics 116 extending longitudinally along the blade of an object key or as laterally protected key cuts 114 or recessed dimples 112, as shown in FIG. 19. Additionally, the silhouette view provides information about the location of the handle and the blade of the object key, so that the light stripe generator can be positioned to project a light stripe on to the object key where its grooves begin.

The instant invention teaches a means to extract the laterally exposed attributes using backlighting and a means to extract the laterally protected attributes using a light stripe which is illustrated in FIG. 1.

In an embodiment of this invention, as shown in FIGS. 1 and 4, an object key may be placed on a transparent section (25, 26) of a pedestal 28 and backlighted by a light source 48 through a lens 46 positioned below the object key so that light passes through the transparent section (25, 26) and projects an image of the object key. The transparent section of the pedestal 28 may lie in a generally horizontal plane. A suitable camera 2 is positioned to receive the image and produce an output signal which can be supplied to a computer as a means for identifying the laterally exposed attributes of the object key.

Then the backlight 48 is turned on and about five (5) pictures are taken, the camera 2 is then moved in three quarter (¾) inch increments across a distance of about four (4) inches and the five (5) pictures are repeated at each location; these pictures are then digitalized and electronically gathered together to form one silhouette of the key in the form of a polyline; information about the shape, depth of cut, location of cuts, and location of the shoulder, etc. are extracted and stored in memory (RAM). The number of pictures taken will obviously depend on the quality and capability of the camera.

The extracted silhouette of the object key information is compared to silhouette information of known manufacturers' keys that are stored in memory (ROM), whereby, a matching key blank may be identified. Another process for automatically making keys comprises receiving an object key on a transparent section of a means for supporting an object key, backlighting the object key by passing light through the transparent section of the supporting means and projecting an object image, receiving at least one object image of the object key, producing an output signal, and identifying laterally exposed attributes of the object key responsive to the output signal. Additionally, a comparison can be made where each master code signal defining traits of a master pixel pattern limited to the laterally exposed attributes of a selected manufacturer's key.

From such identified laterally exposed attributes, a corresponding key blank and associated key cut codes may be determined. However, this procedure is not as reliable as the multi-recognition process herein described.

With the object image captured by the camera and processed by the computer through an analog/digital converter, the attributes of an object key may be identified. The computer provides a pattern recognition means for recognizing a pixel pattern from an object image of the object key, and for producing a series of code signals with respect to each target pixel from the result of the recognition. The code signals define traits of the recognized pixel pattern for each target pixel, where the pixel patterns define attributes of the object key. Moreover, the computer is programmed to discriminate between various pixel patterns. A pattern memory in which a set of predetermined master patterns is stored in the ROM of the computer. Each predetermined master pattern is a plurality of master code signals. The master code signals define traits of a master pixel pattern, where the master pixel pattern defines attributes of a selected manufacturer's key. The computer is programmed to compare the code signals from the pattern recognition means with a corresponding master code signal and to produce an identifying signal, which defines a corresponding key blank with a predetermined master pattern having master code signals that match code signals from the result of the recognition of the pixel pattern of the object key. This process allows a corresponding key blank matching attributes of a known manufacturer's key to be determined.

In a preferred embodiment, the pattern recognition means recognizes laterally exposed attributes represented on a polyline of a silhouette of the object key. The laterally exposed attributes may include the outer shape of an object key, as illustrated in FIG. 15, or the laterally exposed key cuts, as shown on the cut key 32 of FIG. 16. When the laterally exposed attributes of an object key are recognized and compared to the master pattern memory, a corresponding key blank matching the outer shape of a known manufacturer's key may be determined.

Moreover, a plurality of discrete object images of the object key may be produced and captured, and gathered together to form an integrated pixel pattern which may be processed for recognition. In such embodiment, the code signals define traits of the recognized pixel pattern for each target pixel, where the integrated pixel pattern defines attributes of the object key.

The apparatus for making keys may backlight the object key, capture its image, repositioning the camera, and repeat the process, producing a series of backlit images which can be gathering together for an integrated image and corresponding output signal.

In addition, the referenced master pattern memory for comparison with the results of the recognition of the light stripe image may be limited to those having master code signals corresponding to the previously determined manufacturer's keys as determined from the previous match.

If there are no matches, an "expert" rejection mode is initiated wherein the backlight is turned off and an overhead light (not shown in the drawing) is turned on and at least one, but preferably five (5), pictures are taken across the four (4) inches. These pictures are gathered together and stored on the hard drive (RAM) of the computer. This type of picture, when brought upon the monitor, looks just like a "picture" of the key and can be viewed at a later time by a resident locksmith to determine exactly what kind of key it is. If it is a key that the machine should have been able to identify, but could not because the handle or some other feature of the key was slightly different, then this new information about this particular key may be added to the master memory of key silhouettes so that the next time it can be recognized. In this way, the machine will get "smarter and smarter" with use. Lastly, as the access door opens, the monitor will instruct the customer that our key making apparatus cannot currently make a duplicate of the object key and that it should be taken to a locksmith.

In a preferred embodiment of the invention, the automatic key making apparatus has a CRT video monitor which displays advertisement material and a variety of instructions. See FIG. 18 for an relational view of the electronically actuated components of the disclosed invention.

An initial rejection process is initiated when there is a lack of master code signals matching the primary code signals from the result of the recognition of the pixel pattern of the object key. In response to the rejection signal, an overhead light is turned on illuminating the object key and a picture taken of the illuminated object key. The attribute information from the picture is stored in memory.

A means is provided for storing memory data of rejected object keys. These object keys are rejected because they do not have corresponding master code signals matching the code signals from the result of said recognition of the pixel pattern of the object key. By storing memory data of rejected object keys, the key making apparatus may acquire additional information about keys that are not as yet available in its master pattern memory. This can serve to assist in the expansion of the memory database.

Figure 17A:
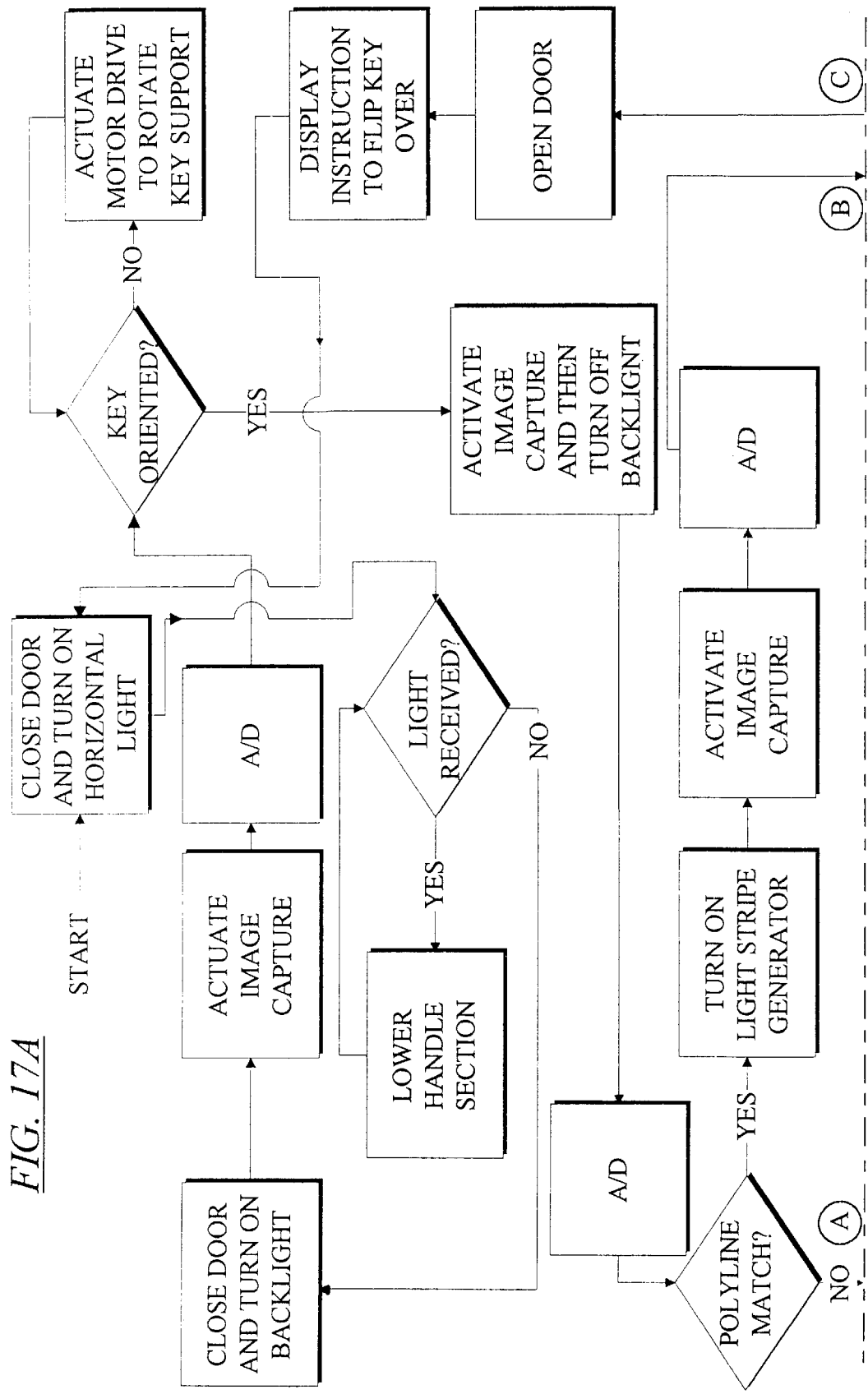
FIG. 17 is a flow diagram of a preferred embodiment of the operation of the automatic key making apparatus of the present invention (FIGS. 17A, 17B and 17C, taken together diagram another preferred embodiment of the operation of the automatic key making apparatus of the present invention)
Figure 17B:
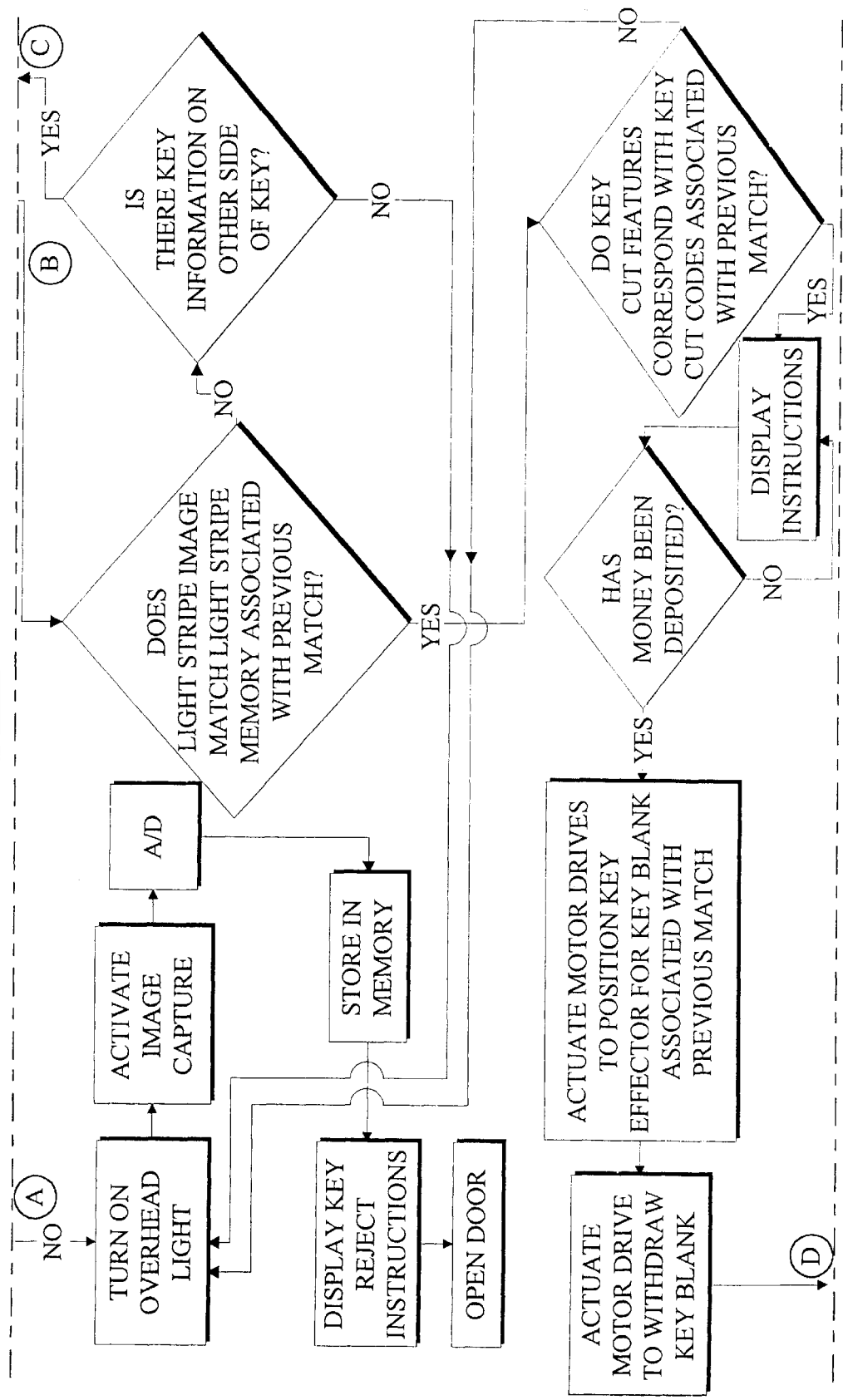
Figure 17C:
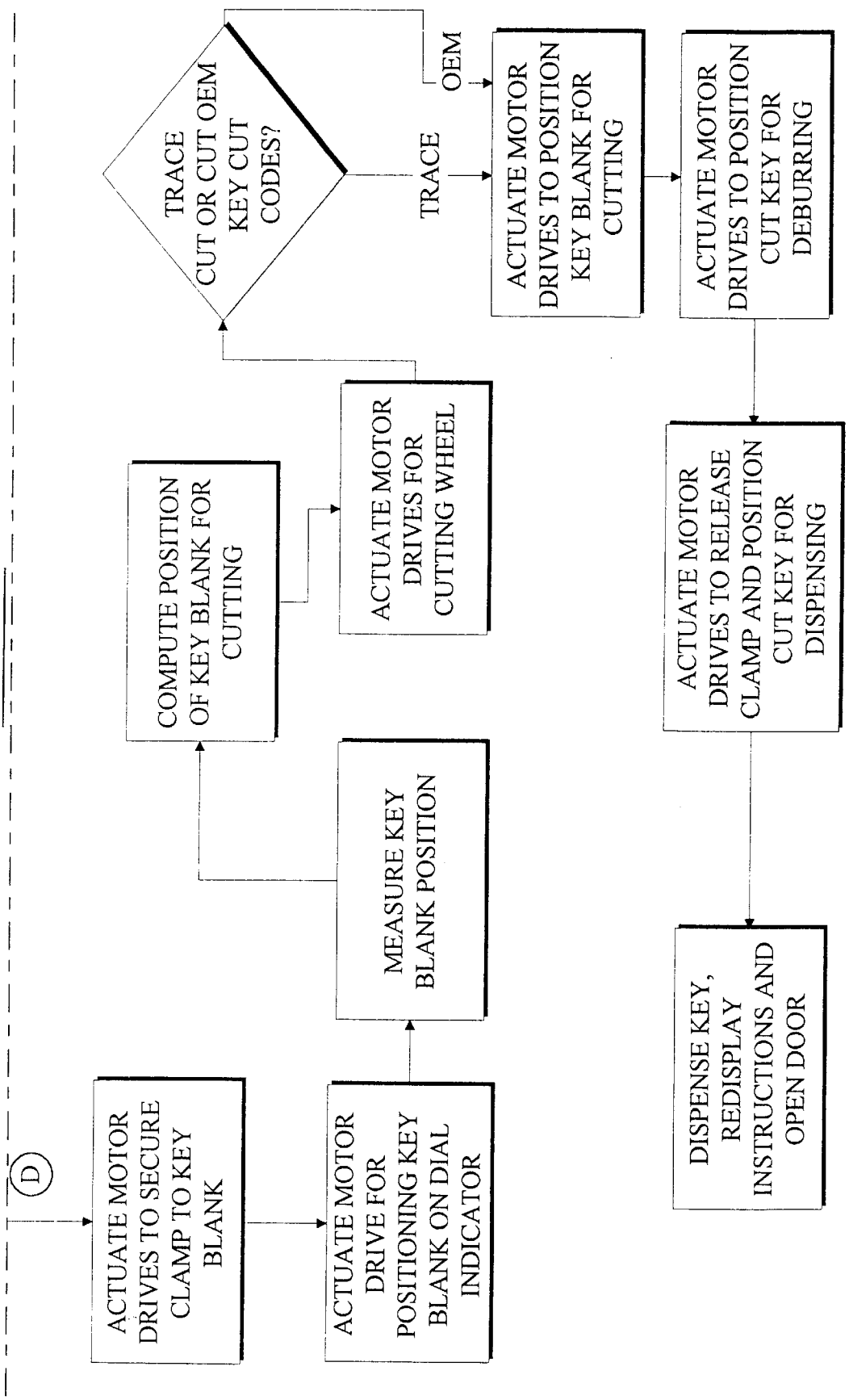

Additional rejection signals may be generated during the process as is more fully discussed hereinafter. See FIG. 17 (17A, 17B, and 17C) for a preferred method of the processes described herein.

Referring to FIG. 4, a preferred embodiment of the invented apparatus comprises a light stripe generator 12 which produces and projects a light stripe (see FIG. 16). The instant apparatus requires that the object key be aligned such that the light stripe projected on to the object key is precisely perpendicular to the longitudinal centerline of the object key. As shown in FIG. 16, a light stripe projected obliquely on to an object key reflect a two dimensional pattern (illustrated as 20a, 20b, 20c, and 20d) which can be used to interpret the three dimensional characteristics of the key from the respective light stripes.

The preferred embodiments depicted in FIGS. 1 and 4 of the drawing include a light stripe generator 12 arranged and adapted to project at least one light stripe obliquely on to the object key 32 and a means for receiving an image of the projected light stripe reflected from the object key.

The light stripe generator 12 may be comprised of a collimated light source, i.e. a bulb 10, a disk having a slit 6, and a convex lens 4, where the disk 6 is positioned between the light source 10 and the lens 4 to project a light stripe. The light stripe generator 12 uses a 1.6/75 lens to produce a pattern light source with a 25 watt halogen light source. A preferred embodiment provides for the light of the of the light stripe generator to pass through a slit of 0.005 inches giving a 0.015 inch wide light stripe at the object key.

Alternatively, a laser adapted to produce an array which forms a line may be applied.

Furthermore, the light stripe method functions to recognize laterally protected attributes of the object key which result from capturing the image of at least one light stripe being projected obliquely on to the blade thereof.

A preferred process involves the following steps: projecting at least one light stripe obliquely on to an object key; receiving an object image of the light stripe of laterally protected attributes of the object key, recognizing a pixel pattern from the object image, producing a series of code signals that define traits of the recognized pixel pattern for each target pixel from the result of the recognition, comparing the code signals with master code signals from a master pattern memory, the master code signals defining traits of a master pixel pattern of a selected manufacturer's key, and producing an identifying signal from such comparison, the identifying signal defining a corresponding key blank with a predetermined master pattern having master code signals that match code signals from the result of the recognition of the pixel pattern of the object key. In addition, key cut codes may also be identified utilizing this method.

In another application of the foregoing method the steps may be taken in the sequence presented.

If the silhouette matches, then we match the light stripe with the master light stripes of one or more keys with the same silhouette in memory.

To insure optimum image capture of the object key, the camera 2 may be moved along the rail 18 and a series of camera pictures taken and then gathered together to form a composite picture as to the light stripe, as best shown in FIGS. 1 and 4. It is preferred that the movement of the assembly be made in increments of about 0.050 inches. Furthermore, by varying the exposure factors, reflectivity variations which may result from object key wear and dirt, may be corrected when the plurality of sequential images of the light stripe taken along an object key are gathered together and aberrant images are discarded.

The light stripe generator 12 is actuated to project a light stripe on to the blade of the object key (the object key may be rotated 90 degrees, if necessary, to align its longitudinal centerline at a right angle with the light stripe). In a preferred embodiment, the camera 2 takes about five (5) light stripe pictures over a distance of about one-half (½) inch, so a picture is taken every one-tenth (1/10) of an inch at five (5) different locations, with the first being taken near the shoulder where grooves begin. At each light stripe location, a number of pictures are taken at different exposure times to compensate for surface reflectivity.

The exposure times start fast and finish slow. Time factors are 2, 4, 8, 16, 32, 64, 128, etc., with pictures taken until either the last picture is overexposed or the maximum time limit is reached, at which point the camera moves to the next light stripe location and begins the next set of pictures at increasing exposure times. The optimum picture at a specific location is selected for comparison using the best exposure times and the best picture location.

A method for automatically making keys comprises: a. backlighting an object key and projecting an image; b.

receiving at least one backlit object image of the object key; c. recognizing a pixel pattern from the backlit object image; d. producing a series of primary code signals that define traits of the recognized pixel pattern for each target pixel from the result of the recognition, the target pixels defining a polyline of laterally exposed attributes of the object key; e. comparing the primary code signals relating to the outline shape of the polyline with corresponding master code signals from a master pattern memory, each master code signal defining traits of a master pixel pattern of the shape of a selected manufacturer's key; f. producing a first rejection signal from such comparison, the rejection signal defining a lack of corresponding master code signals matching the primary code signals from the result of the recognition of the pixel pattern of the object key; and, in response to the first rejection signal: g. turning on an overhead light and illuminating the object key; h. receiving at least one object image of the illuminated object key and producing first memory signal; and i. storing the first memory signal.

As best shown in FIG. 1 of the drawing, the present invention provides a preferred embodiment of the invention where the light stripe generator 12 and the camera 2 are in a fixed positional relationship with each other and may be repositioned in tandem. This is accomplished by affixing the generator 12 and camera 2 to a holding bracket 16 which is movable linearly along a rail 18 that is parallel to the longitudinal centerline of the object key as it is positioned to have the light stripe projected on to it. The best mode contemplated is for the light stripe generator 12 to be positioned at a 45 degree angle from the plane of the top 22 of the pedestal 28.

As shown in FIG. 1 of the drawing, the present invention provides an elongated horizontal rail 18 having its longitudinal axis lying perpendicular to the light stripe. A bracket 16 slidingly supported by the rail 18, with the bracket 16 supporting the light stripe generator 12 and the camera 2 for receiving an image 24 of the light stripe. The camera 2 and the light stripe generator 12 are attached to the bracket 16 and in fixed positional relationship with each other. A motor 14 moves the bracket 16 along the rail 18, whereby, the light stripe generator 12 and the camera 2 can be moved in tandem along the rail 18 and images 24 of the light stripe projected along an object key may be extracted.

It should be readily understood that the process of varying the exposure for the light stripe images and the process of repositioning the imaging assembly are complementary and may therefore be used separately or together.

As best shown in flow diagram, FIG. 17 of the drawing, the present invention provides that if the light stripe information fails to match, then an inquiry mode is initiated to determine whether there may be information on another side of the object key from information in the master pattern memory relating to the previously selected manufacturer's key, if there is, then the monitor instructs the customer to "turn the key over" and "close the door", and the entire process to this point is repeated. This time the light stripe information is taken from the other side of the key in an attempt to identify the key with this additional information. If there is no additional useful information on the other side of the object key as determined from the master memory or from looking at the other side, then the "expert" rejection mode is initiated.

An inquiry process to determine whether additional attribute information is disposed on the underside of an object key includes: a. backlighting an object key and projecting an image; b. receiving at least one backlit object image of the object key; c. recognizing a pixel pattern from the backlit object image; d. producing a series of primary code signals that define traits of the recognized pixel pattern for each target pixel from the result of the recognition, the target pixels defining a polyline of laterally exposed attributes of the object key; e. comparing the primary code signals relating to outline shape of the polyline with corresponding master code signals from a master pattern memory, each master code signal defining traits of a master pixel pattern relating to the shape of a selected manufacturer's key; f. producing a first identifying signal from such comparison, the first identifying signal defining a corresponding key blank with a predetermined master pattern having master code signals that match code signals from the result of the recognition of the pixel pattern of the object key, whereby, a corresponding selected manufacturer's key and a corresponding key blank responsive to the first identifying signal may be determined; g. projecting at least one light stripe on to an object key; h. receiving an object image of the light stripe of laterally protected attributes of the object key; i. recognizing a pixel pattern from the object image of the light stripe of the laterally protected attributes of the object key; j. producing a series of secondary code signals that define traits of the recognized pixel pattern for each target pixel from the result of the recognition, the target pixels defining a light stripe of the laterally protected attributes of the object key; k. comparing each of the secondary code signals with corresponding master code signals from a master pattern memory, each master code signal defining traits of a master pixel pattern of the laterally protected attributes of the selected manufacturer's key; l. producing an inquiry signal from such comparison, the inquiry signal defining a lack of corresponding master code signals matching the secondary code signals from the result of the recognition of the pixel pattern of the object key; and, in response to the inquiry signal: m. determining whether there may be information on another side of the object key from the master pattern memory relating to the selected manufacturer's key, and producing a rejection signal, the rejection signal defining a lack of information on another side of the object key; and, in response to the rejection signal: n. turning on an overhead light and illuminating the object key; o. receiving at least one object image of the illuminated object key and producing a memory signal; and p. storing the memory signal.

The key cut attributes of the object key are extracted by the backlighting method previously discussed. If the key cut codes of an identified key blank fail to match up, then the "expert" rejection mode is initiated.

A method for automatically making keys comprises: a. projecting a light stripe from a light stripe generator obliquely on to an object key; b. receiving an object image of the light stripe of the object key; c. repositioning an assembly of the light stripe generator and the object image receiver which are in fixed positional relationship with each other; d. repeating steps a, b, and c; e. gathering together the plurality of object images and producing an integrated object image; f. recognizing a pixel pattern from the integrated object image; g. producing a series of code signals that define traits of the recognized pixel pattern for each target pixel from the result of the recognition; h. comparing the code signals with corresponding master code signals from a master pattern memory, each master code signal defining traits of a master pixel pattern of laterally protected attributes of a selected manufacturer's key; and i. producing an identifying signal from such comparison, the identifying signal defining a corresponding key blank with a predetermined master pattern having master code signals that match code signals from the result of the recognition of the pixel pattern of the object key.

A preferred multi-recognition process, illustrated in part in the flow diagram, FIG. 17 (but excluding the inquiry and rejection steps of the diagram), comprises: a. receiving an object key having a blade and a handle on a rotatable means for supporting an object key having a transparent section with a fixed blade section adjacent to a movable handle section; b. backlighting the object key by passing light through the transparent section of the supporting means and projecting an image; c. receiving at least one object image of the object key; d. determining from the object image the position of the longitudinal centerline of the object key relative to a light stripe which may be projected on to the object key by a light stripe generator; e. producing a first output signal corresponding to the determination; f. rotating the means for supporting an object key for alignment with a line perpendicular to a light stripe which may be projected on to the object key by a light stripe generator in relation to the first output signal; g. projecting a generally horizontal beam of light immediately above the means for supporting an object key and transverse to the blade of the object key supported thereon; h. receiving the light of the horizontal beam that is not obstructed by the blade of an object key disposed on the blade section of the means for supporting an object key and producing at least one second output signal; i. incrementally lowering the vertical elevation of the handle section of the means for supporting an object key in relation to the second output signal; and j. repeating sequential steps g, h, and i until the light received no longer exceeds a minimum threshold, indicating that the blade of the object key is disposed flatly on the blade section; k. continuing to backlight the object key by passing light through the transparent section of the supporting means and projecting an image; l. receiving at least one backlit object image of the object key; m. recognizing a pixel pattern from the backlit object image; n. producing a series of primary code signals that define traits of the recognized pixel pattern for each target pixel from the result of the recognition, the target pixels defining a polyline of laterally exposed attributes of the object key; o. comparing the primary code signals relating to outline shape of the polyline with corresponding master code signals from a master pattern memory, each master code signal defining traits of a master pixel pattern relating to the shape of a selected manufacturer's key; p. producing a first identifying signal from such comparison, the first identifying signal defining a corresponding key blank with a predetermined master pattern having master code signals that match code signals from the result of the recognition of the pixel pattern of the object key, whereby, a corresponding selected manufacturer's key and a corresponding key blank responsive to the first identifying signal may be determined; q. projecting at least one light stripe obliquely on to an object key disposed on the transparent section, thereby creating an image of laterally protected attributes of the object key; r. receiving an object image of the light stripe of the laterally protected attributes of the object key; s. recognizing a pixel pattern from the object image of the light stripe of the laterally protected attributes of the object key; t. producing a series of secondary code signals that define traits of the recognized pixel pattern for each target pixel from the result of the recognition, the target pixels defining a light stripe of the laterally protected attributes of the object key; u. comparing each of the secondary code signals with a corresponding master code signal from the master pattern memory, the master code signals defining traits of a master pixel pattern relating to the laterally protected attributes of the selected manufacturer's key; v. producing a second identifying signal from such comparison, the second identifying signal defining that the corresponding key blank with a predetermined master pattern having master code signals matches the secondary code signals from the result of the recognition of the pixel pattern of the laterally protected attributes of the object key; w. comparing the primary code signals relating to laterally exposed key cut features of the polyline with the master code signal from the master pattern memory, the master code signals defining traits of a master pixel pattern of key cut codes of the selected manufacturer's key; x. producing a third identifying signal from such comparison, the third identifying signal defining a key cut code of the selected manufacturer's key with a predetermined master pattern having master code signals that match the primary code signals from the result of the recognition of the pixel pattern of the laterally exposed attributes of the object key, whereby, the key cut code of the object key is identified and the corresponding key blank is confirmed, in response to the third identifying signal; y. selecting the corresponding key blank from a plurality of key blanks from the identifying signal; z. grasping the key blank; aa. positioning the key blank for cutting; and ab. cutting key cut features into the key blank to create a new key.

A composite light stripe is stored in memory. This light stripe information is compared to master pattern memory relating to the previously identified key blank. If the light stripe information matches, then the apparatus continues by attempting to match the key codes: i.e. depths, spaces and distances with all the master codes of the key blank previously identified by the outer shape of the silhouette and by light stripe. In instance during the preferred multi-recognition process there may arise a lack of correspondence between a. outer shape image recognition and the master pattern memory; b. the light stripe image recognition and the master pattern memory corresponding the key blank identified with the outer shape image recognition; or c. the key cut feature image recognition and the master pattern memory corresponding the key blank identified with the outer shape image recognition which was verified with the light stripe image recognition. In such instances, a rejection signal will be initiated turning on an overhead light and illuminating the object key, receiving at least one object image of the illuminated object key and producing a memory signal, and storing the memory signal. See FIG. 17. If required because of the configuration of the components relative to the access door of the apparatus, the pedestal 28 is then reverse rotated to place it in its starting position, the light stripe generator 12 is turned off, and the overhead light is turned on and the access door automatically opens permitting the customer to remove the object key.

If the automatic key making apparatus has successfully identified a corresponding key blank, the key cuts and the corresponding key cut codes, and the corresponding key blank is in the machines' inventory, then the monitor gives the customer instructions on how to enter a number of copies of keys desired to be made and how much money to put in a currency acceptor. The timing of this step may easily be advanced.

If we do get all three matches, then the automatic key making apparatus selects the appropriate key blank and cuts it by reference to the original manufacturer's key cut code specifications (OEM) contained in memory. The apparatus could trace cut the key. Alternatively, cuts could be a combination of the OEM and trace cutting.

A reliable identification method involves obtaining all three matches. It is to be understood that a lesser number of matches, with a lesser standard of reliability, could be employed as well.

Figure 22:
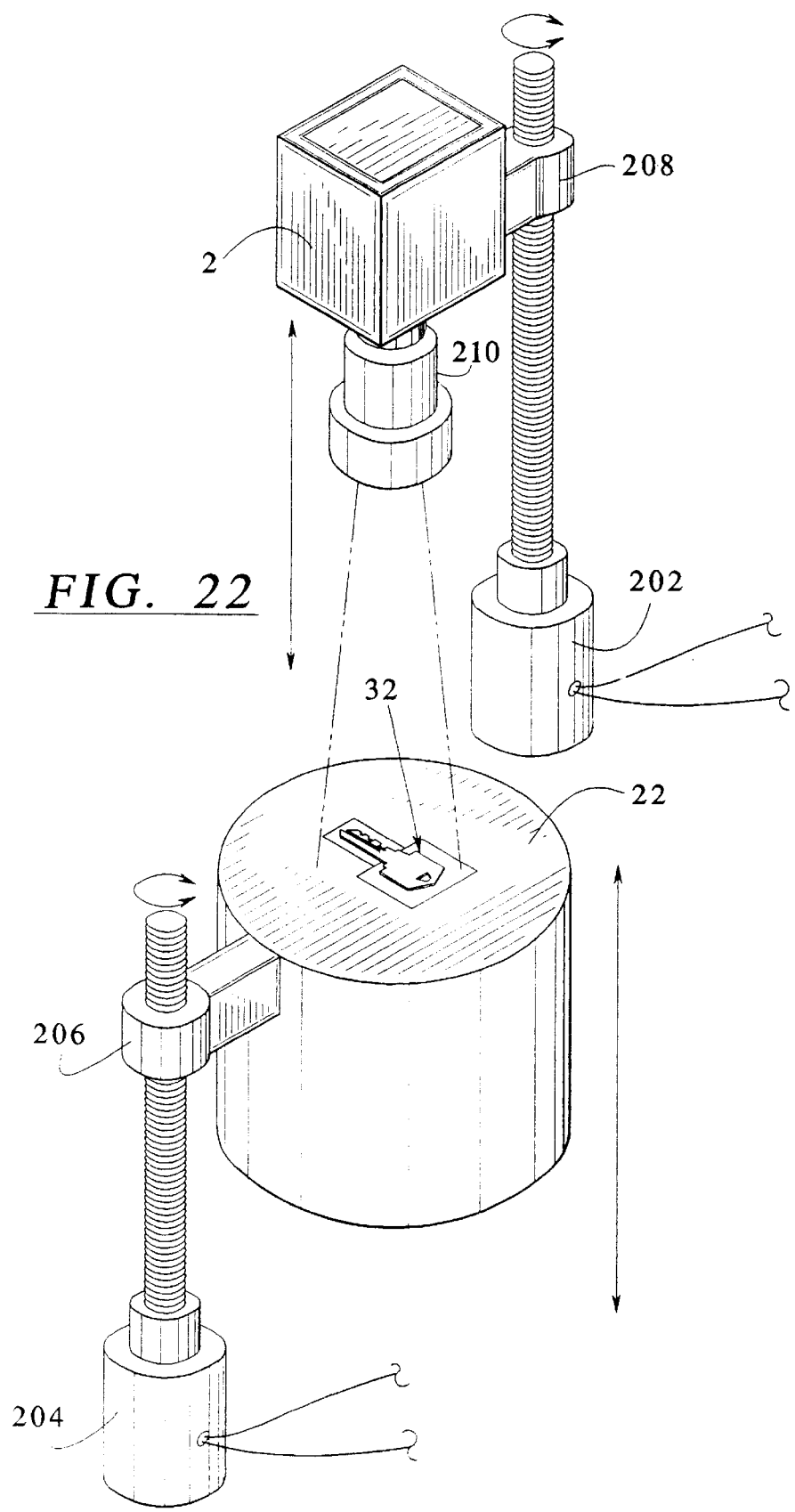
FIG. 22 is a perspective view of a preferred embodiment of an object key support means and a camera of the automatic key making apparatus of the present invention showing independent means for vertically moving the camera and the support means.

Another embodiment of the key making apparatus comprises a non-contact method for extracting attributes of an object key 32. This method and apparatus is not limited to externally exposed attributes—both externally exposed and laterally protected attributes are extracted. As best shown in FIG. 22, it involves the use of a means for receiving object images, such as a camera 2, which has a lens 210 capable of viewing a shallow focal plane (See FIGS. 23 and 24).

Such a camera 2 is operative with a means for adjusting the focal plane viewed by the camera such that a light arranged and adapted to project light onto an object key 32 disposed on a supporting means can reveal an image of an object key to the camera that is in focus and this image either alone or with other images, that is images taken at different focal planes in which the object key 32 lies can produce an appropriate signal. Again, a computer means, operably connected to and responsive to the output signal of the camera, can then be employed for identifying attributes of the object key 32.

Figure 23:
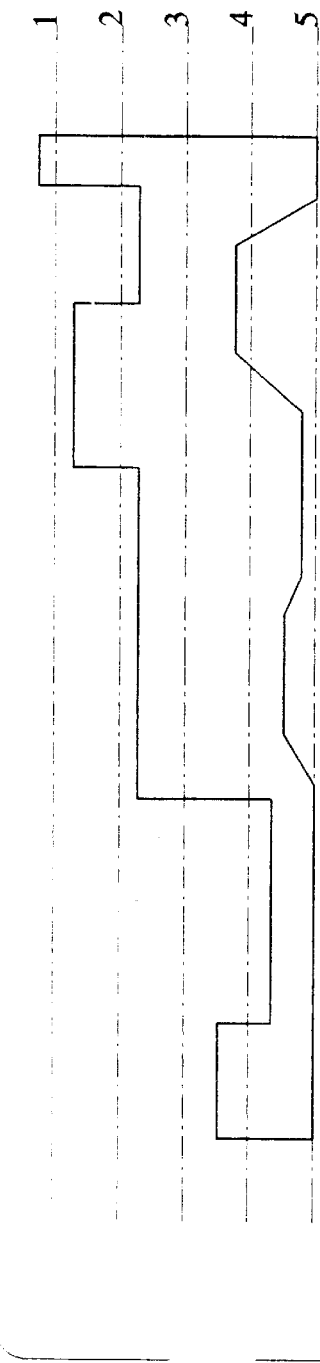
FIG. 23 is a representative cross sectional view of an object key showing five numbered representative focal planes.
Figure 24:
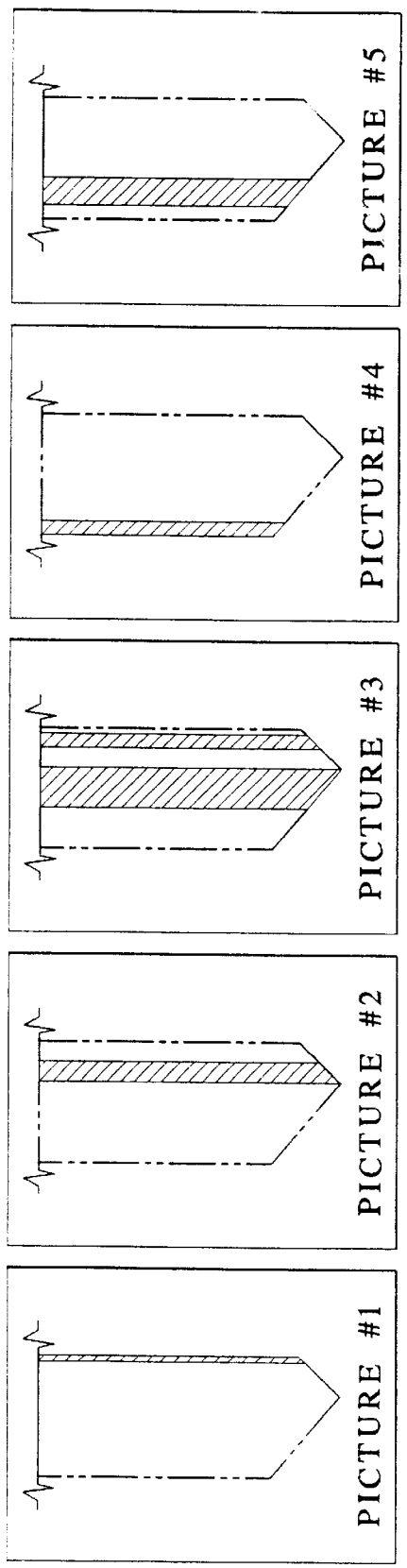
FIG. 24 is a representation of the object key image in each of the respective focal planes of FIG. 23, each picture respectively in pictures 1–5.

In order for the preferred methodology to be achieved, a means for adjusting the focal plane viewed by the camera 2. As illustrated in FIGS. 23 and 24, pictures of the object key 32 taken at the various focal planes to reveal both laterally exposed and laterally protected attributes of the object key 32. The camera 2, having a lens 210 with a shallow focal plane, will receive maximum light intensity from the plane that is in focus. Once a picture is taken the focal plane can be adjusted to bring a new focal plane into focus. Continuing this mode of changing the focal plane a three dimensional image can be processed from the multiple frames containing the in focus images.

The means for identifying attributes of an object key 32 comprises:

a. a pattern recognition means for recognizing an integrated pixel pattern from a plurality of discrete object images of the object key, and for producing a series of code signals with respect to each target pixel from the result of the recognition, the code signals defining traits of the recognized pixel pattern for each target pixel, the integrated pixel pattern defining attributes of the object key 32; and b. a discrimination means having a pattern memory in which a set of predetermined master patterns is stored, the predetermined master patterns being a plurality of master code signals, the master code signals defining traits of a master pixel pattern, the master pixel pattern defining attributes of a selected manufacturer's key, for comparing the code signals from the pattern recognition means with a corresponding master code signal, and for producing an identifying signal, the identifying signal defines a corresponding key blank having a hole in the handle thereof with a predetermined master pattern having master code signals that match code signals from the result of the recognition of the pixel pattern of the object key 32, whereby, a corresponding key blank matching attributes of a known manufacturer's key may be determined.

Each of the discrete object images of the object key 32 of the key making apparatus may comprise a pixel pattern from a discrete focal plane in which the object key lies.

The identifying signal further defines a key cut code identified with the corresponding key blank. Whereby, key cuts conforming to the key cut codes of a known manufacturer's key may be determined.

The identifying signal of the key making apparatus further defines a key cut code identified with the corresponding key blank. Whereby, key cuts conforming to the key cut codes of a known manufacturer's key may be determined.

Additionally, the identifying signal may further define key cut features of the object key 32 that correspond generally with key cut codes identified with the corresponding key blank. In such instance, the key cut features of the object key 32 may be determined for use with the corresponding key blank.

In the key making apparatus, the identifying signal may further defines key cut features of the object key 32 that correspond generally with key cut codes identified with the corresponding key blank, whereby, the key cut features of the object key 32 may be determined for use with the corresponding key blank.

Additionally, the identifying signal of the key making apparatus, may further defines both a key cut code and key cut features of the object key 32 that correspond generally with key cut codes identified with the corresponding key blank. Whereby, key cuts hybridizing the key cut features of the object key 32 and the key cut codes of a known manufacturer's key may be determined for use with the corresponding key blank.

The means for adjusting the focal plane viewed by the camera 2 may comprises a lens 210 with a variable focus. Furthermore, the means for adjusting the focal plane viewed by the means for receiving an object image of an object key comprises a means for varying the distance between an object key 32 disposed on the supporting surface and the means for receiving an object image.

Focal plane adjustment may comprise a means for moving the supporting surface relative to the means for receiving an object image or a means for moving the means for receiving an object image relative to the supporting surface. Stepper motor drives are preferred. See motor drives 202 and 204 of FIG. 22.

Additionally, the key making apparatus may further comprises a means for aligning the supporting means and the means for receiving an object image of an object key, to enhance a revealed image of an object key disposed on the supporting means and received by the camera producing an output signal.

A preferred embodiment of the means for aligning comprises: a means for supporting an object key having a transparent section on which the object key 32 may be placed, a means for backlighting arranged and adapted to pass light through the transparent section of the supporting means and project an image of the object key positioned thereon, a means for receiving the object image of the object key, a means for ascertaining the position of the object key 32 on the supporting means and producing an output signal, and a means for repositioning the object key relative to the means for receiving the object image of the object key responsive to the output signal produced by the ascertaining means. In this way, the object key 32 can be repositioned relative to the means for receiving the object image of the object key. This may involve horizontal movement of the camera 2, the support means 22, or both.

In another preferred embodiment of the key making apparatus, the non-contact means for extracting laterally exposed attributes of an object key 32 comprises a means for backlighting arranged and adapted to pass light through a transparent section of a supporting means and project an image of an object key positioned thereon; a means for receiving at least one object image of an object key positioned on the transparent section and producing an output signal; and a means for identifying laterally exposed attributes of an object key 32 that is operably connected and responsive to the output signal of the means for receiving an object image of the object key.

It is anticipated that both a still camera and a video camera could be employed. A high resolution device to produce sharp clear images is preferred. Additionally, a zoom lens could be added to assist in showing greater detail and to receive views of the entire object key 32, including its handle and blade.

While a preferred method and apparatus contemplates a high resolution video or still camera, other methods and apparatuses of non-contact measurement, which would be readily known by those skilled in the art, including laser range detection, radar range detection, ultrasound range detection, laser optical triangulation, proximity sensors and air pressure sensors, and the like, are comtemplated equivelants that are generally known.

In regard to the methodology, please refer to FIG. 17A-1, FIG. 17B-1, and FIG. 17C, which taken together show a preferred embodiment of the sequence of steps necessary to extract said attributes and make a new key. The principal here is to activate image capture on a shallow focal plane and then to make an adjustment to set a new focal plane from which a new image can be captured. The number of repetitions required will depend on the depth of the focal plane, which may be dependent on the type of light and camera employed. As best shown in FIGS. 23 and 24, FIG. 23 is a representative cross sectional view of an object key showing five numbered representative focal planes. The object key image in each of the respective focal planes is illustrated in pictures 1–5 respectively of FIG. 24. Utilizing this preferred methodology, it will be no longer necessary to rotate the pedestal upon which the object key is positioned. It may be preferred, however, to align the camera 2 and the object key 32 along a line of sight.

In one embodiment the extraction of laterally exposed and laterally protected attributes of an object key 32 can be accomplished without need to level the object key 32 on the supporting means. And in another embodiment, the lowering of the handle section can be employed to facilitate precision in extracting attributes.

Figure 21:
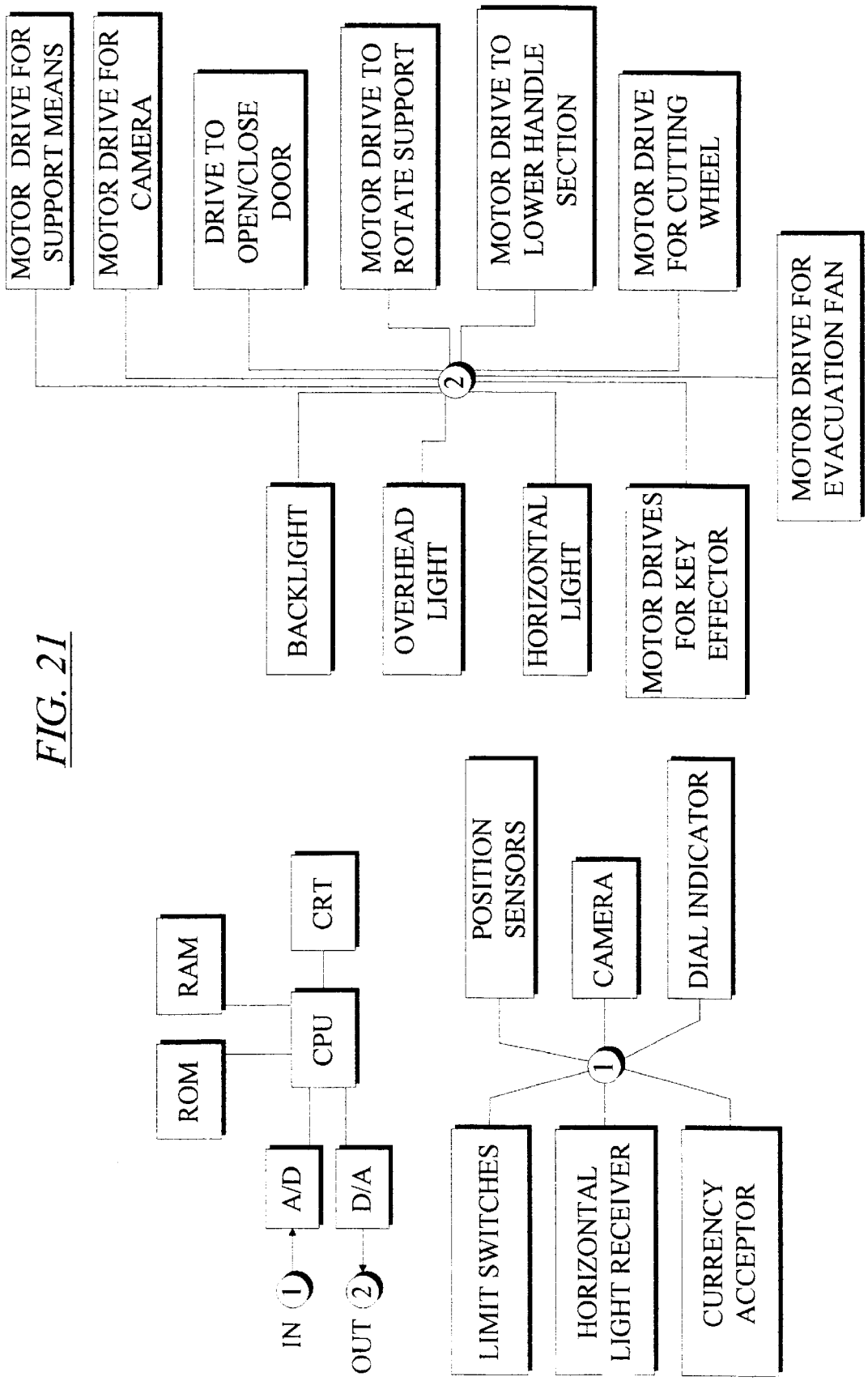
FIG. 21 is a block diagram of a preferred embodiment of the electrically actuated components of the automatic key making apparatus of the present invention which extracts both externally exposed and laterally protected attributes of an object key utilizing a camera with a shallow focal plane.

As shown in FIG. 21, motor drives have been provided for the object key support means and for the camera. These motor drives are shown in FIG. 22, as 204 and 202, respectively. Illustration of the relationship between the object key 32 and the camera 2 is illustrated in FIG. 22. The focal plane for camera 2 may be adjusted by moving camera 2 vertically by means of the motor drive 202; by moving the object key support means vertically by means of the motor drive support means 204; and by adjusting the focus on lens 210, provided such lens has a variable focus.

A method for automatically making keys which comprises adjusting the focal plane viewed by a means for receiving an object image of an object key and extracting attributes of an object key 32.

A method for automatically making keys which comprises adjusting the focal plane viewed by a means for receiving an object image of an object key while leaving the object key 32 independent of constraint and extracting attributes of an object key 32.

A method for automatically making keys which comprises extracting attributes of an object key 32 independent of physical contact.

A method for automatically making keys which comprises:

a. receiving an object key 32 on a means for supporting an object key;

b. receiving at least one object image of an object key;

c. producing an output signal; and d. identifying attributes of the object key 32 responsive to the output signal.

The method for adjusting the focal plane viewed by a means for receiving an object image of an object key comprises adjusting a variable focus lens of the means for receiving an object image of an object key; and varying the distance between an object key 32 disposed on a supporting surface and the means for receiving an object image. The distance between an object key 32 disposed on the supporting surface and the means for receiving an object image may be varied by moving the supporting surface relative to the means for receiving an object image or by moving the means for receiving an object image relative to the supporting surface.

This preferred embodiment of a method for automatically making keys comprises aligning a supporting means and a means for receiving an object image of an object key and producing an output signal, whereby, a revealed image of an object key disposed on the supporting means may be received by the means for receiving an object image of an object key.

A method for automatically making keys which comprises placing an object key 32 on a means for supporting which has a transparent section on which the object key may be placed, passing backlight through the transparent section of the supporting means and project an image of the object key positioned thereon, receiving the object image of the object key, ascertaining the position of the object key 32 on the supporting means 22 and producing an output signal, and repositioning the object key 32 relative to the means for receiving the object image of the object key responsive to the output signal produced by the ascertaining means.

The method for automatically making keys further comprising the following steps:

a. recognizing a pixel pattern from an object image of the object key;

b. producing a series of code signals with respect to each target pixel from the result of the recognition, the code signals defining traits of the recognized pixel pattern for each target pixel, the pixel patterns defining attributes of the object key; c. comparing the code signals from a pattern recognition means with a corresponding master code signal from a discrimination means having a pattern memory in which a set of predetermined master patterns is stored, the predetermined master patterns being a plurality of master code signals, the master code signals defining traits of a master pixel pattern, the master pixel pattern defining attributes of a selected manufacturer's key;

d. producing an identifying signal, the identifying signal defines a corresponding key blank having a hole in the handle thereof with a predetermined master pattern having master code signals that match code signals from the result of the recognition of the pixel pattern of the object key 32, whereby, a corresponding key blank matching attributes of a known manufacturer's key may be determined.

A preferred embodiment of the method for automatically making keys may further comprise recognizing an integrated pixel pattern from a plurality of discrete object images of the object key 32, each of the discrete object images taken from a discrete focal plane in which the object key lies, producing a series of code signals with respect to each target pixel from the result of the recognition, the code signals defining traits of the recognized pixel pattern for each target pixel, the integrated pixel pattern defining attributes of the object key 32, and comparing the code signals from the pattern recognition means with a corresponding master code signal from a discrimination means having a pattern memory in which a set of predetermined master patterns is stored, the predetermined master patterns being a plurality of master code signals, the master code signals defining traits of a master pixel pattern, the master pixel pattern defining attributes of a selected manufacturer's key; producing an identifying signal, the identifying signal defines a corresponding key blank having a hole in the handle thereof with a predetermined master pattern having master code signals that match code signals from the result of the recognition of the pixel pattern of the object key 32. Whereby, a corresponding key blank matching attributes of a known manufacturer's key may be determined.

A preferred method for automatically making keys may further comprise the following steps:

a. recognizing a pixel pattern from an object image of the object key;

b. producing a series of code signals with respect to each target pixel from the result of the recognition, the code signals defining traits of the recognized pixel pattern for each target pixel, the integrated pixel pattern defining attributes of the object key;

c. comparing the code signals from the pattern recognition means with a corresponding master code signal from a discrimination means having a pattern memory in which a set of predetermined master patterns is stored, the predetermined master patterns being a plurality of master code signals, the master code signals defining traits of a master pixel pattern, the master pixel pattern defining attributes of a selected manufacturer's key;

d. producing an identifying signal, the identifying signal defines both a key cut code and key cut features of the object key 32 that correspond generally with key cut codes identified with the corresponding key blank and a corresponding key blank having a hole in the handle thereof with a predetermined master pattern having master code signals that generally correspond to code signals from the result of the recognition of the pixel pattern of the object key 32, whereby, a corresponding key blank matching attributes of a known manufacturer's key and key cuts hybridizing the key cut features of the object key 32 and the key cut codes of a known manufacturer's key may be determined.

Furthermore, recognizing an integrated pixel pattern from a plurality of discrete object images of the object key, where each of the discrete object images taken from a discrete focal plane in which the object key lies (see FIGS. 23 and 24), may produce a series of code signals with respect to each target pixel from the result of the recognition, the code signals defining traits of the recognized pixel pattern for each target pixel, the integrated pixel pattern defining attributes of the object key 32. The code signals from the pattern recognition means may then be compared with a corresponding master code signal from a discrimination means having a pattern memory in which a set of predetermined master patterns is stored, the predetermined master patterns being a plurality of master code signals, the master code signals defining traits of a master pixel pattern, the master pixel pattern defining attributes of a selected manufacturer's key.

Then producing an identifying signal, the identifying signal defines both a key cut code and key cut features of the object key 32 that correspond generally with key cut codes identified with the corresponding key blank and a corresponding key blank having a hole in the handle thereof with a predetermined master pattern having master code signals that generally correspond to code signals from the result of the recognition of the pixel pattern of the object key 32, whereby, a corresponding key blank matching attributes of a known manufacturer's key and key cuts hybridizing the key cut features of the object key 32 and the key cut codes of a known manufacturer's key may be determined.

Figure 18:
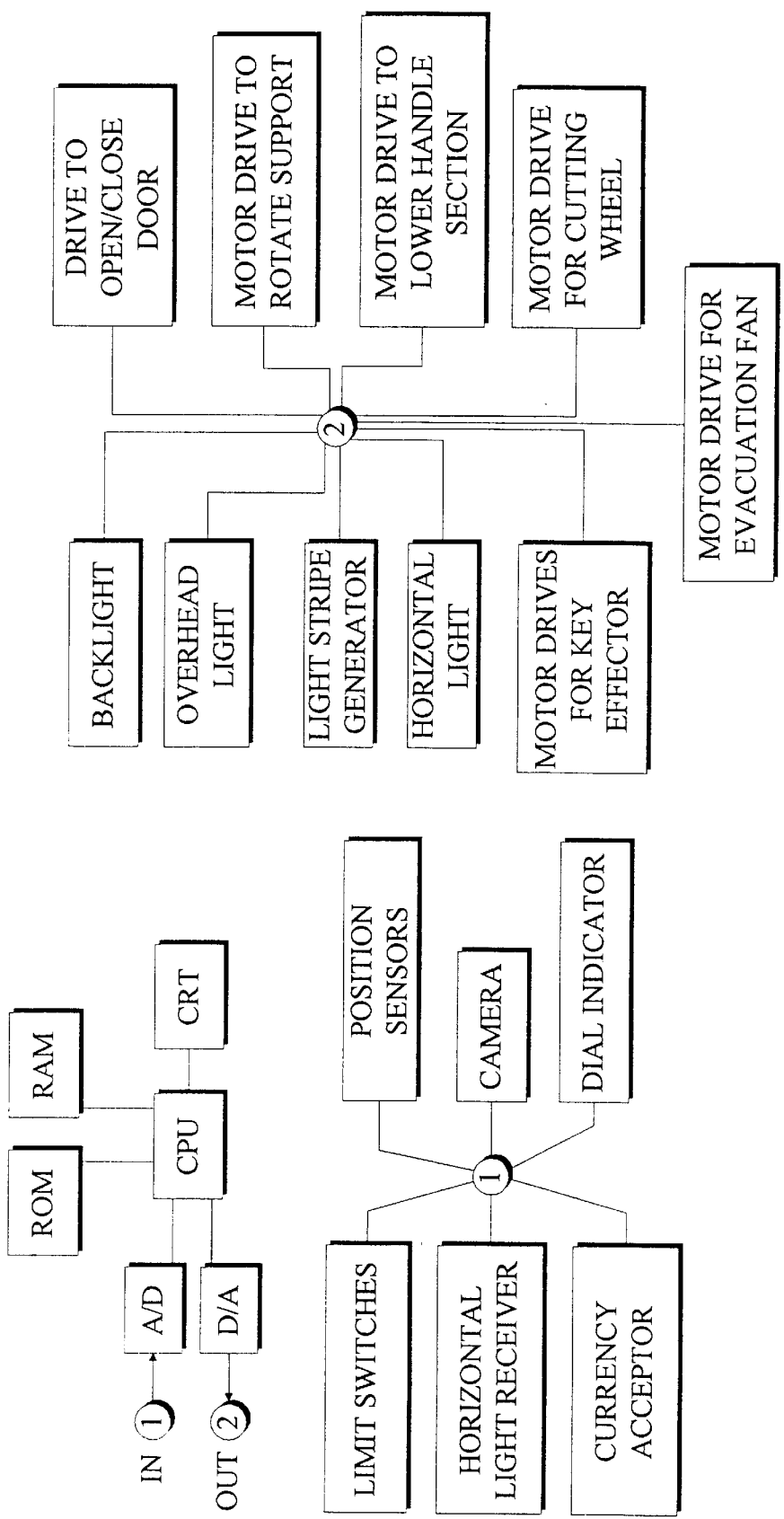
FIG. 18 is a block diagram of a preferred embodiment of the electrically actuated components of the automatic key making apparatus of the present invention.

Additionally, the methods for automatically making keys described above may further comprise the following additional steps: a. selecting a key blank corresponding to the identifying signal from a plurality of key blanks; b. grasping the key blank; c. positioning the key blank for cutting; d. cutting key cut features into the corresponding key blank to create a new key; e. deburring the new key; and f. dispensing the new key. As shown in FIG. 18, an evacuation fan or similar device may be employed to gather burrs.

As best shown in FIG. 12, the key making apparatus comprises a means for grasping a key blank 78 while leaving the blade thereof free of constraint for cutting. Notably, a preferred embodiment of the invention allows a blade that has at least one longitudinal cuttable side edge to be cut while the side of the blade opposite the cuttable side edge is free of restriction.

As shown in FIG. 20, a key blank comprises a blade with a tip 150 on the distal end and which terminates at the shoulder 148 on its proximate end, a shank extending longitudinally from the shoulder 148 to the hip 140 and a handle 142 having a hole 144 centrally disposed in the handle. As shown on FIG. 12, a preferred embodiment of the means for grasping is a key effector which engages a section of the key blank consisting of its handle and its shank, while leaving the opposite side of said blade free of constraint. Alternatively, the section of the key blank so engaged may be the solely the handle or solely the shank.

The key effector may be positioned to place the key blank in operative relationship with a means for cutting the longitudinal cuttable side edge thereof. FIG. 13 shows a rotary cutting wheel that may be employed to make key cuts in the blade of a key blank. A key blank having a blade with two longitudinal cuttable side edges may be grasped by a means for grasping, such as the key effector, and a first longitudinal cuttable side edge of the blade thereof placed in a face to face cutting relationship with a first side of the rotary cutting wheel, whereby cuts are made in the first cuttable side edge of the key blank. After which the means for grasping and the key blank engaged thereto may be moved in a direction which is perpendicular to longitudinal centerline of the key blank and which passes through a line extending from the axis of the rotary cutting wheel to position a second longitudinal cuttable side edge of the key blank for cutting. The means for grasping and the key blank engaged thereto may then be moved to promote a face to face cutting relationship between the second longitudinal cuttable side edge of the key blank and the opposite side of the cutting wheel, whereby cuts are made in the second longitudinal cuttable side edge of the key blank.

As is evident from the foregoing disclosure, a method for automatically making keys may comprise grasping a key blank having a blade and making cuts in the blade while leaving the blade free of constraint.

Additionally, where the blade of the key blank has at least one longitudinal cuttable side edge, a process for making keys automatically may involve making cuts in a longitudinal cuttable side edge of the blade while leaving the opposite side of the blade free of constraint.

Such processes may additionally include grasping a key blank having a blade with at least one longitudinal cuttable side edge and a handle, by its handle, by its shank, or by a section of the key blank comprising its handle and its shank.

Alternatively, in connection with a key blank having a blade with two longitudinal cuttable side edges, a method for automatically making keys may comprise cutting, with a first side of a rotary cutting wheel, a first longitudinal cuttable side edge of the key blank while leaving the opposite side of said blade free of constraint, and cutting the other longitudinal cuttable side edge of the key blank from the opposite side of the cutting wheel while leaving the opposite side of said blade free of constraint. The opposite (or other) side of the cutting wheel being a locality relative to the cutting wheel that is approximately 180 degrees from the first side of the rotary cutting wheel, that is, the locality relative to the cutting wheel where the key blank engages the cutting wheel during cutting of the first longitudinal cuttable side edge of the key blank.

Furthermore, a preferred method for automatically making keys comprises cutting, with a first side of a rotary cutting wheel, a longitudinal cuttable side edge of a key blank having a blade with two longitudinal cuttable side edges while leaving the opposite side of the blade free of constraint, moving the key blank in a direction which is perpendicular to its longitudinal centerline and which passes through a line extending from the axis of the rotary cutting wheel to position a second longitudinal cuttable side edge in a face to face relationship with the opposite side of the rotary cutting wheel for cutting, and cutting, with the opposite side of the rotary cutting wheel, the second longitudinal cuttable side edge of the key blank while leaving the opposite side of said blade free of constraint.

Additionally, a method for automatically making keys comprises grasping a key blank having a blade with two longitudinal cuttable side edges, a shank and a handle, by the section of the key blank consisting of its handle and its shank, cutting, with a first side of a rotary cutting wheel, a first longitudinal cuttable side edge of a key blank while leaving the opposite side of said blade free of constraint, moving the key blank to position a second longitudinal cuttable side edge in a face to face relationship with the opposite side of the cutting wheel, and cutting, with the opposite side of the cutting wheel, the second longitudinal cuttable side edge of the key blank while leaving the opposite side of said blade free of constraint. Movement of the key blank from the position where the first longitudinal cuttable side edge is cut to the position where the second longitudinal cuttable side edge is cut can be accomplished most efficiently by moving the key blank in a direction which is perpendicular to its longitudinal centerline and which passes through a line extending from the axis of the rotary cutting wheel. Other movements which achieve the same end result are easily cognizable.

Furthermore, another embodiment of the means for cutting (not shown in the drawing) comprises two rotary cutting wheels. One arrangement of such rotary cutting wheels is to dispose each wheel in a common plane, in a side by side relationship, for example, at a sufficient distance from one another to allow the blade of a key blank to be positioned therebetween for cutting. In such an arrangement, each longitudinal cuttable cutting side edge may be cut by one of the rotary cutting wheels.

Figure 6:
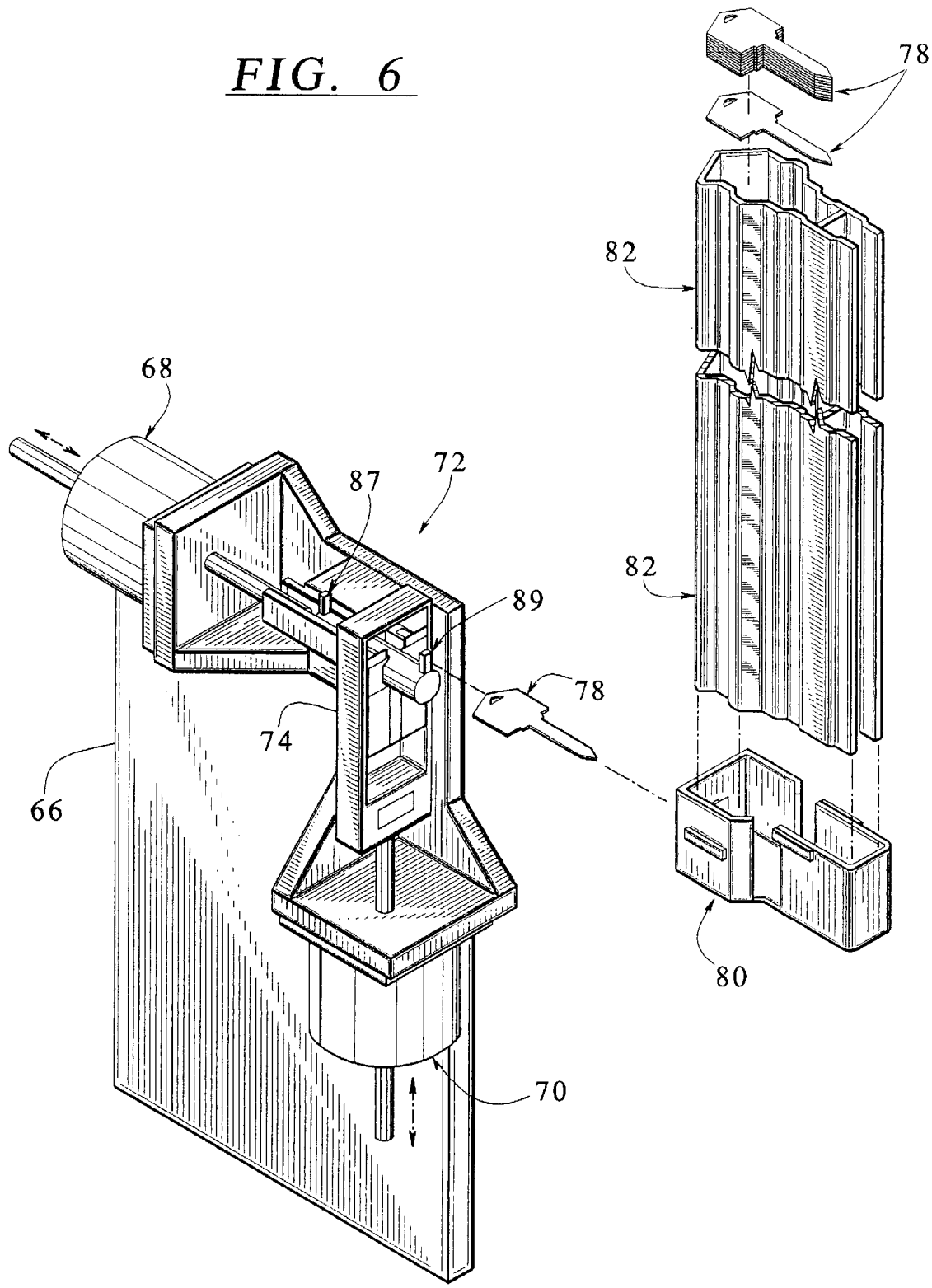
FIG. 6 is a partially exploded perspective view showing a positional relationship of a preferred embodiment of a key dispenser cup to a key holding container and the key effector, respectively.

As best shown in FIGS. 7 and 9 of the drawing, the present invention provides a preferred embodiment having a means for storing a plurality of key blanks 78. Such means includes a plurality of key holding containers 82, each for holding a stack of like key blanks 78 and a dispenser cup 80 disposed at the bottom of each key holding container 78, as shown in FIG. 6, each of the dispenser cups having an opening at the top suitably sized and adapted to receive a key holding container and having a proximate front wall with a passage 86 disposed therein and a bottom wall, having at least one upwardly extending nub 92 rising more than one key blank thickness on which a key holding container 78 may be disposed, with a slot 81 centrally disposed along a portion thereof extending continuously from the passage disposed in the front wall through which a key blank may be withdrawn, as shown in FIG. 7. Each of the dispenser cups having its opening aligned in a like direction.

Figure 14:
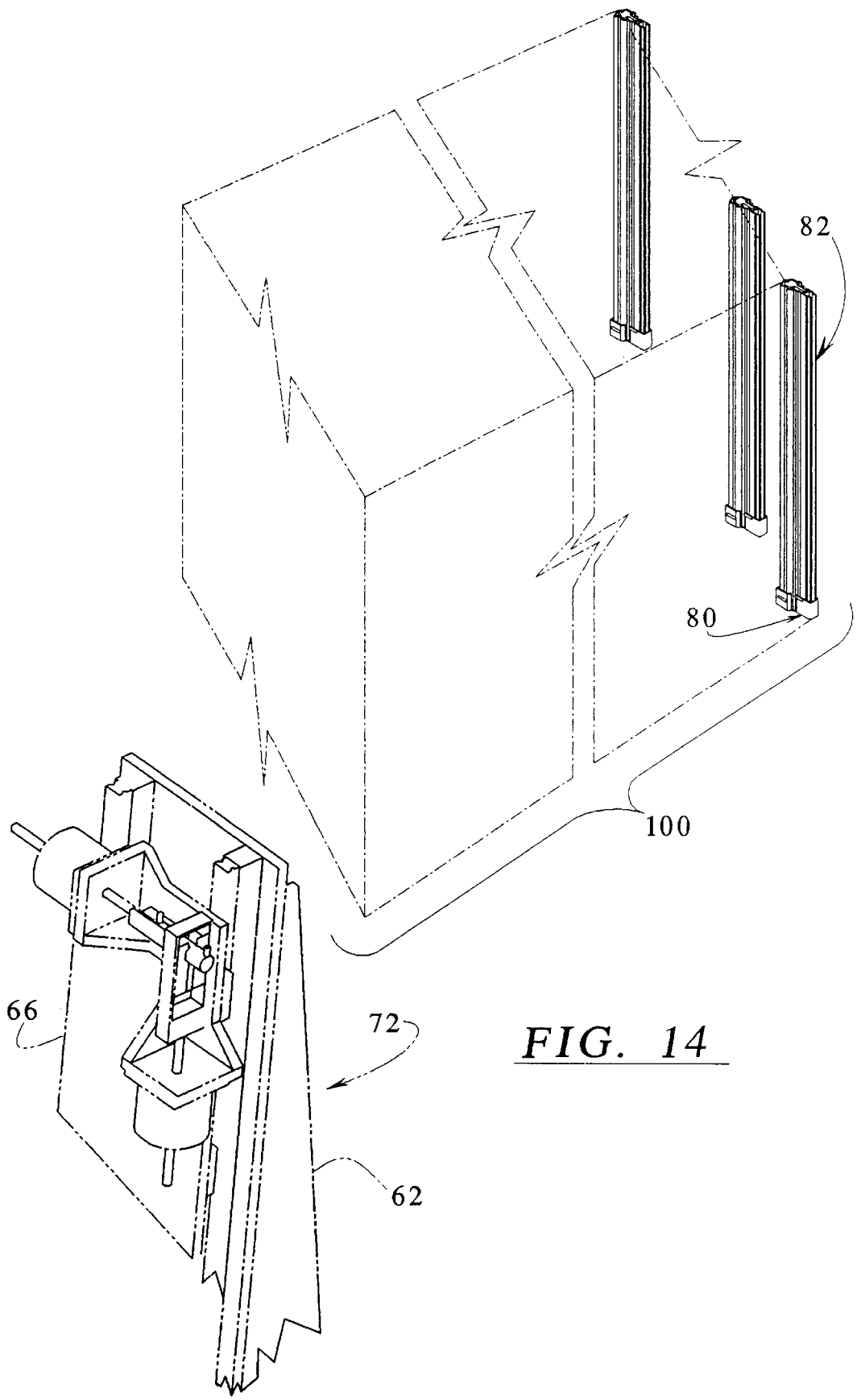
FIG. 14 is a partial perspective view of a preferred embodiment of a spatial orthogonal array of the dispenser cups and associated key holding containers in relation to a representation of the key effector, shown in phantom.

As best shown in FIG. 14 of the drawing, the present invention provides that the dispenser cups 80 are disposed in a spatial array 100 of columns and rows, wherein the columns and rows are arranged orthogonally with each dispenser cup in a row being disposed at a like elevation and with the rows being generally parallel to the proximate front walls thereof. Each row of dispenser cups 80 has a vertically spaced distance from the dispenser cups of an adjacent row, forming a generally uniform stepped relationship therebetween with the dispenser cups of a row facing the proximate front walls of the dispenser cups in an adjacent row being at a elevated spaced distance relative thereto. The spaced distance is sufficient to allow the means for grasping to access a key blank from any dispenser cup and to remove same.

A preferred embodiment of the invention has at least one key holding container 82 having an opening at the bottom and an opening at the top and a generally uniform vertical cavity disposed therein. The cavity is suitably sized and adapted to hold a stack of horizontally positioned key blanks 78. There is a dispenser cup for each key holding container. The dispenser cups each have an opening at the top suitably sized and adapted to receive a key holding container and a proximate front wall with a passage 86 disposed therein and a bottom wall with a slot 81 centrally disposed along a portion thereof extending continuously from the passage 86 disposed in the front wall. The passage 86 is suitably sized to allow a key blank 78 to be withdrawn horizontally therethrough and has an overhead door 88 disposed thereon. As best shown in FIG. 10 of the drawing, the door 88 has a outwardly projecting contour with a live hinge pivot means 88a and it is arranged and adapted to move between a generally closed position (as shown in FIG. 10) and an open position in which the live hinge pivot means 88a is compressed leaving the passage 86 sufficiently open to permit a key blank 78 to be withdrawn therefrom (as shown in FIG. 11). This unique hinged door 88 permits a key blank positioned at the bottom of the stack to be withdrawn and the key blank positioned immediately above the bottom key blank is effectively blocked from moving horizontally by the position of the door 88.

To complete the key making process the identified corresponding key blank 78 is grasped by a key effector 72 and positioned for cutting. As shown in FIG. 13, key cut features are then cut into the key blank using a rotary cutting wheel 102 which allows cuts to be easily made to both edges of the blade, if that is required.

A preferred embodiment of a means for grasping a corresponding key blank comprises a key effector 72 having a base 56, a moveable pin positioning assembly having a pin which is suitably sized and adapted to extend into a hole 94 in the handle of a key blank 78, and a means for clamping.

As best shown in FIG. 8 of the drawing, the present invention provides the pin positioning assembly comprising a footing 84, a pair of upwardly disposed opposing collar members 75, a sleeve 83, and a rod 85 having the pin 89 uprightly and radially disposed on a distal end thereof, each of the opposing collar members 75 comprises: a bottom surface arranged and adapted to be supported on top of the footing 84 and to support the sleeve 83 disposed laterally therebetween, an inwardly directed flange extending from and parallel to its upper surface at a spaced distance from each other, each of the flanges extends over the supported sleeve 83 to limit the sleeve from independent upward movement, a proximate side wall, a distal side wall, an interior side wall, and an exterior side wall, each of the side walls having its bottom edge connected to the side edges of a bottom wall and its top edge connected to the side edges of a top surface, respectively. Each of the exterior side wall is co-planar with a lateral side surface of the footing 84, the bottom wall of each of the collar members 75 and its top surface each lie in a horizontal plane, and its side walls each lie in a vertical plane, the interior side wall is arranged and adapted to engage a side exterior wall of the sleeve 83 to limit lateral movement of same. A recess 75b forming an opening in its upper surface suitably sized and adapted to receive a spring 73 and a block 71, and an upwardly extending lip 75a on the distal end of its upper surface, each of the lips 75a on each of the respective collar members lies in a vertical plane and has a space therebetween greater than the lateral width of any of said plurality of key blanks taken across its shoulder and less than the lateral width of any of said plurality of key blanks 78 taken across its handle, a spring 73 and a spring biased block 71 normally exposed from the recess 75b in the upper surface thereof with the top of the block 71 extending higher than the vertical lips 75a and which may be compressed therein by the clamping means. As shown in FIG. 12, each block 71 may have a sloped face 71a on the distal side wall to facilitate downward movement of the block 71 when laterally contacted by a key blank 78 being withdrawn. As will be understood by those skilled in the art, the vertical lips 75a shown in the drawing as being flat and both lying in the same vertical plane, may be upraised vertical poles or flat uprising surfaces that are not necessarily co-planar. The one common feature of all such embodiments is the distance between the lips for it is at this proximate area that the lips will contact a selected key blank.

In combination with the key making apparatus described, at least one key blank (see FIG. 20 et al.) having a means for registering adapted to support the key blank against the upwardly extending lips 75a of the key effector 72 is provided. By supporting the means for registering against the upwardly extending lips 75a, the key blank can be uniformly secured to the key effector 72.

As shown in FIG. 20, the means for registering comprises a hip 140 disposed longitudinally between the shoulder 148 and the handle 142 of the key blank. The hip 140 has an upper nub 140a and a mirror image lower nub disposed symmetrically about the longitudinal centerline of the key blank, each nub having a uniform contour with adjacent longitudinal and transverse contact surfaces, said longitudinal contact surface 146 extends generally longitudinally from the transverse contact surface toward the shoulder and said transverse contact surface emanates in a plane that is perpendicular to the longitudinal centerline of said key blank, each of said longitudinal contact surfaces 146 is disposed at a lateral distance from the longitudinal centerline that is greater than one half of the lateral width of the key blank taken across its shoulder 148. Alternatively, each of the contact surfaces 146 may be disposed at a lateral distance from the longitudinal centerline of the key blank sufficient to allow each of the contact surfaces to simultaneously engage an upwardly extending lip 75a of the respective collar members of the key effector 72. The hip 140 of the key blank is adapted to register the key blank by uniformly supporting it against the upwardly extending lips 75a of the key effector 72.

As shown in FIGS. 20, 20A, 20B, 20C, and 20D, the key blanks disclosed herein are improved key blanks, for use with an automatic key making apparatus having a key effector with upwardly extending lips for grasping a key blank, of the type in which a key blank of generally planar configuration having an elongated blade with a blade tip 150 on one end and a blade butt on the other end, a shoulder 148 extending laterally from the blade butt, a handle 142, and a shank between the shoulder 148 and the handle 142, wherein the improvement comprises a means for registering adapted to support the key blank against the upwardly extending lips of the key effector.

The means for registering of the improved key blank includes a hip 140 disposed longitudinally between the shoulder and the handle of the key blank. The hip 140 has an upper nub 140a and a mirror image lower nub disposed symmetrically about the longitudinal centerline of the key blank. Each nub having a uniform contour with adjacent longitudinal and transverse contact surfaces, said longitudinal contact surface extends generally longitudinally from the transverse contact surface toward the shoulder and said transverse contact surface emanates in a plane that is perpendicular to the longitudinal centerline of said key blank, and each of said longitudinal contact surfaces is disposed at a lateral distance from the longitudinal centerline that is greater than one half of the lateral width of the key blank taken across its shoulder. Note that the improvements disclosed can be employed with any kind of handle and any kind of blade, only the hip 140 criteria must be uniform.

In another preferred embodiment, the means for registering comprises a hip 140 disposed longitudinally between the shoulder 148 and the handle 142 of the key blank, where the hip 140 has an upper nub 140a and a mirror image lower nub disposed symmetrically about the longitudinal centerline of the key blank. Each nub has a uniform contour with a contact surface emanating from a plane that is perpendicular to the longitudinal centerline of the key blank, and each of the contact surfaces is disposed at a lateral distance from the longitudinal centerline of the key blank sufficient to allow each of the contact surfaces 146 to simultaneously engage an upwardly extending lip 75a of the respective collar members 75 of the key effector. In this way, the hip 140 of the key blank is adapted to register the key blank by uniformly supporting it against the upwardly extending lips 75a of the key effector 72.

The sleeve 83 has a generally elongated shape with a cylindrical cavity extending longitudinally therein forming openings on each end thereof and a cavity surface arranged and adapted to slidingly secure the rod 85 which may move axially therein. As best shown in FIG. 8, the sleeve 83 further has a slot centrally disposed longitudinally along its upper surface whereby the rod 85 may move axially within the sleeve 83 without the upwardly extending pin 89 being impeded.

Referring also to FIG. 6, the rod 85 is axially connected at its proximate end to a first actuable means 68 for providing axial movement and having a diameter slightly smaller than the diameter of the cylindrical cavity of the sleeve 83 so that it may slidingly move axially therein. The top of the upwardly extending pin 89 extending higher than the top of normally exposed spring biased blocks 71. The springs 73 serve to temporarily hold a key blank 78 in key pressing position prior to clamping and further providing potential energy to discharge the key blank following cutting and the removal of the means for clamping.

Referring again to FIG. 8, the footing 84 has the shape of a square prism with a horizontal upper surface, two lateral side walls, and a proximate side wall and a distal side wall and the sleeve is supported by and positioned between the upwardly disposed opposing collar members 75. The upwardly disposed opposing collar members 75 are supported by and attached to the upper surface of the footing 84.

As shown in FIG. 6, the means for clamping comprises a clamp 74, connected to a second actuable means 70 for providing vertical movement, having a bottom wall, two parallel side walls, and a top wall, and having a rectangular aperture 98 bounded by the bottom surface of the top wall, the top surface of the bottom wall and the interior surface of each side wall. The rectangular aperture 98 of the clamp 74 is suitably sized and adapted to encompass the footing 84 and collar members 75 of the pin positioning assembly and move vertically with respect thereto between a first position, in which the bottom surface of the top wall is at a spaced distance above the upwardly extending pin 89, and a second position, in which the lower surface of the top wall is below the upper edge of the upwardly extending lips 75a of the collar members 75 and in operative association with the upper surface of the collar members 75.

Figure 5:
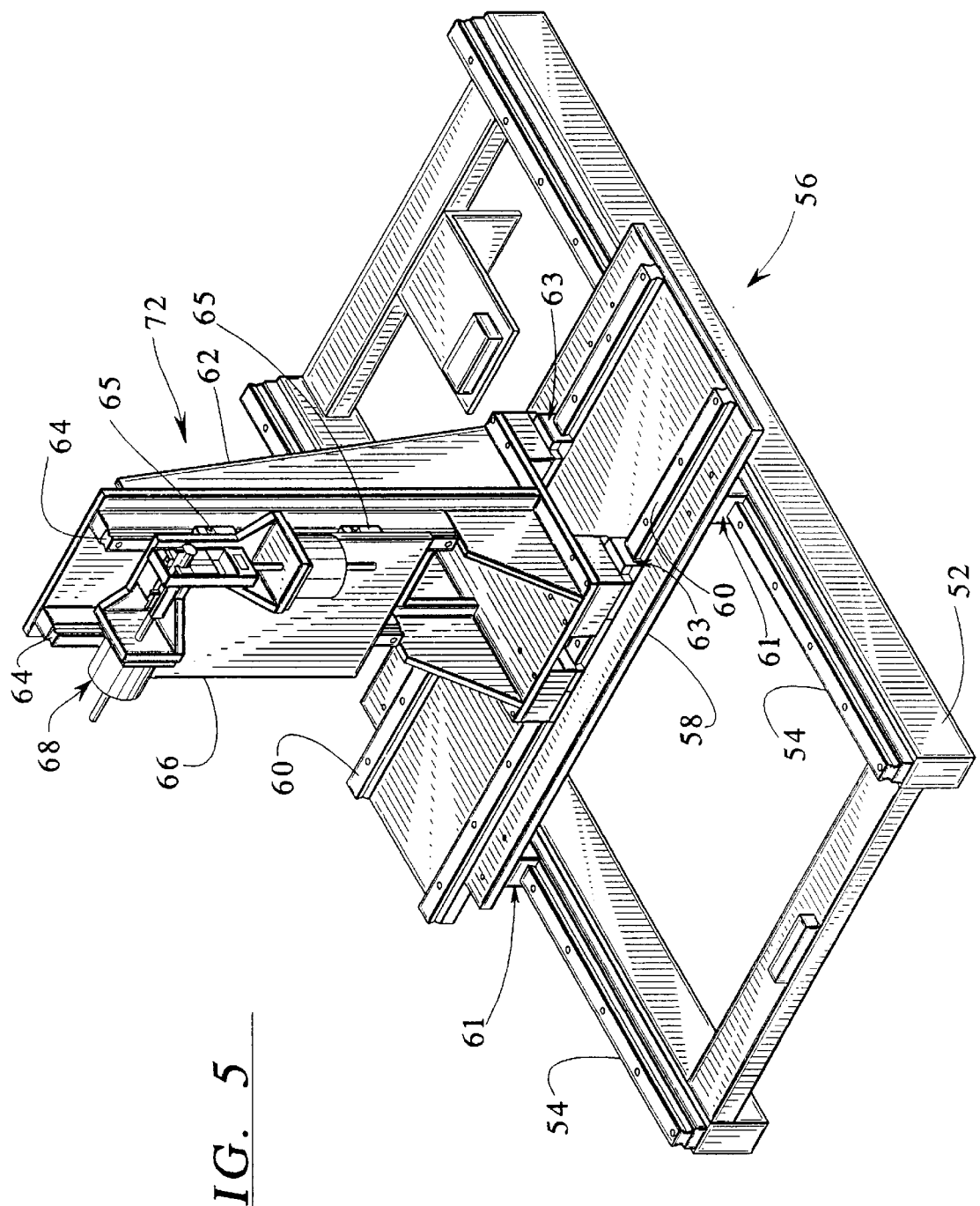
FIG. 5 is a perspective view of a preferred embodiment of the key effector base showing the subbase linear slide motion guides.

As shown in FIG. 5, the base 56 has four subbases including a first subbase 52 having a fixed position and a first system of linear slide motion guides, comprised of at least one linear rail 54 and associated slide 61, disposed thereon, a second subbase 58 engaged to the first system of linear slide motion guides and moveable thereon and having a second system of linear slide motion guides, comprised of at least one linear rail 60 and associated slide 63, disposed thereon, a third subbase 62 engaged to the second system of linear slide motion guides and moveable thereon and having a third system of linear slide motion guides, comprised of at least one linear rail 64 and associated slide 65, disposed thereon, and a fourth subbase 66 engaged to the third system of linear slide motion guides and moveable thereon and having the key effector 72 attached thereto.

The second subbase 58 has a first subbase motor means (not shown in the drawing) to move it along the first system of linear slide motion guides engaging it to the first subbase 52,. the third subbase 62 has a second subbase motor means (not shown in the drawing) to move it along the second system of linear slide motion guides engaging it to the second subbase 58, the fourth subbase 66 has a third subbase motor means (not shown in the drawing) to move it along the third system of linear slide motion guides engaging it to the third subbase 62. The respective systems of linear slide motion guides are arranged mutually perpendicular, whereby, each of the subbase motor means moves the key effector 72 linearly in a direction perpendicular to the movement effected by the other subbase motor means.

Referring to the illustration in FIG. 6 and details shown in FIGS. 10 and 11, the key effector 72 operably withdraws a key blank 78 from the key dispenser cup 80 by positioning the upwardly extending pin 89 at a spaced distance below and in alignment with a hole 94 in the handle of a corresponding key blank 78 and with the clamp 74 disposed in the first position, as shown in FIG. 10. The key effector 72 is moved up to a point where the pin 89 enters the hole 94 of the bottom key blank 78 in the stack. As the key effector 72 is moved upwardly placing the pin 89 into engagement with the hole 94 in the handle of the corresponding key blank 78, the upper surface of the top wall of the clamp 74 push against the hinged door 88 of the dispenser cup 80 opening the door 88 to allow access for withdrawing the key blank 78, as shown in FIG. 11.

A preferred method comprises actuating at least one subbase motor drive to position a key effector in operative association with a corresponding key blank in response to an identifying signal, actuating a first actuable means 68 to cause the key effector to withdraw the corresponding key blank 78 from a holding means, actuating a second actuable means 70 to secure the corresponding key blank 78 with a clamping means, actuating at least one subbase motor drive for the means for cutting, actuating at least one subbase motor drive to position the key effector and the secured corresponding key blank in operative association with the means for cutting to cut a new key, actuating the second actuable means to release the clamping means, and actuating at least one subbase motor drive to position the new key for dispensing.

The key effector 72 has a control means operatively connected to each of the subbase motor means and to the first and second actuable means (68 and 70, respectively) for withdrawing the corresponding key blank 78 from the dispenser cup 80 and restraining the movement of the corresponding key blank 78 with the clamp 74.

A method for automatically grasping and cutting during the key making process comprises actuating at least one subbase motor drive, each of said subbase motor drives being arranged and adapted to move one of the moveable subbases, to position a key effector 82 having a moveable rod 85 with an upwardly extending pin 89 in operative association with a corresponding key blank 78 in response to an identifying signal, actuating the first actuable means 68 to horizontally move the rod 85 axially to position the upwardly extending pin 89 at a spaced distance below and in alignment with a hole 94 in the handle of the corresponding key blank 78, actuating a motor drive to vertically position the pin 89 of the key effector 72 into the hole 94 in the handle of the corresponding key blank 78, actuating the first actuable means 68 to horizontally draw in the rod 85 axially to withdraw the corresponding key blank 78 from a holding means, actuating the second actuable means 70 to secure the corresponding key blank 78 with a clamping means, actuating a means for cutting, actuating at least one subbase motor drive to position the key effector and the secured corresponding key blank in operative association with the means for cutting to cut a new key, actuating the second actuable means 70 to release the clamping means, and actuating at least one subbase motor drive to position the new key for dispensing.

As the key effector pin 89 is pulled back, the key handle passes over the upwardly extending lips 75a of the collar members 75, the clamp 74 is moved 95% down and the pin 89 is moved forward pushing the handle of the key blank 78 forward causing the front of the key handle to engage the upwardly extending lips and a pressure is applied, as shown in FIG. 12. Approximately fifty pound per square inch of pressure is preferred. Then, the clamp 74 is moved down further until approximately fifty pound per square inch of pressure is exerted on the key blank handle. The key blank 78 is now securely clamped.

As shown in FIG. 12, the rod 85 may have a second upwardly extending pin 87 to activate a limit switch 96, which shown in phantom.

To insure accuracy in the key cutting operation, a means for indicating the actual position of the key blank relative to the key effector is provided to correct misalignments that may occur.

The foregoing method comprises the steps of actuating at least one subbase motor drive to position the key effector and the secured corresponding key blank in operative association with a position indicator to determine the actual position of the key blank relative to the key effector, and producing a positioning signal for correcting alignment between the cutting wheel and the misaligned key blank. The secured key blank is moved over to a position indicator where its is measured at two points. One point near the tip of the key blank and the other near the handle. This information is stored and processed so that when the cuts are made in the key blank 78, the exact alignment of the secured key blank is taken into account. If the key blank is skewed a little, then the cuts can be correspondingly corrected. One such position indicator with a reading range from 0 to 25 millimeters distributed as Fowler Ultra-Digit Mark IV indicator is preferred.

The motors that finitely move the various components of the apparatus preferably range from 2 amp to 8 amp and can be servo or stepper motors similar to those manufactured by Anaheim. The motors may be controlled by a motion control board installed on the PC such as those manufactured by NuLOGIC.

As best shown in FIG. 13 of the drawing, the present invention provides a means for cutting key cut features into the corresponding key blank comprises a key cutting wheel 102 rotatable in at least one direction and having at least one anvil 106 adjacent thereto for each rotatable cutting direction. Each anvil 106 has a flat contact surface (104 and 108, respectively) lying in a plane that is perpendicular to a tangent line of the cutting wheel 102. Additionally, the anvil 106 serves to brace the blade of a corresponding key blank 78 disposed flatly on the flat contact surface (104 or 108) thereof by the key effector 72 for cutting and to block movement of the key blank 78 caused by the tangential forces generated by the key cutting wheel 102. As illustrated in FIG. 18, the key effector control means selectively actuates each of the subbase motor means to dispose the blade of the corresponding key blank 78 grasped by the key effector 72 flatly on the flat contact surface (104 or 108) of the anvil 106 and to place selected portions of the key blank 78 in operative cutting relation to the key cutting wheel 102 in response to the identifying signal, whereby key cut features are cut into the key blank 78.

The key making apparatus preferably cuts key cut features into the key blank in accordance with the selected lock manufacturer's original key cut codes. These manufacturer original key cut codes are stored in the master pattern memory.

Alternatively, although not the preferred method since it may copy worn, dirty, or damaged aspects of an object key, the identifying signal may further define key cut features of the object key that can be cut into a new key blank.

After cutting the cut key is moved over to a deburring means (basically a knife edge) and the newly cut portion of the key is dragged across the knife edge scrapping off any burrs.

For deburring, the key effector control means selectively actuates each of the subbase motor means to place the key effector in position to deburr—to make physical contact with an object whereby burrs are removed.

After the cutting operation is complete, the key effector control means selectively actuates each of the subbase motor means to place the key effector in position to dispense the new key. In such position the second actuable means is actuated to raise the clamp and the first actuable means is actuated to move the rod proximately to release the new key from contact with the upwardly extending lips.

By means of a computing means (see FIG. 18), the required object key positioning can be controlled. A computer comprising a first ROM for storing a program controlling the operation of said components and said controlling means, RAM for storing extracted attributes and the position of the object key and various data associated with operation, and a CPU for executing said program and a second ROM for storing the plurality specific key manufacturers' data representing at least master patterns for the plurality of selected key blanks disposed in the key blank dispensers.

In the foregoing disclosure, a preferred means for identifying attributes of an object key, for determining the position of the longitudinal centerline of the object key relative to a light stripe, for controlling the horizontal leveling, for recognizing the object key attributes, for storing such information about the object keys and the plurality of key blanks (master pattern memory), for comparing, and for selecting a corresponding key blank and associated key cut codes, a computing means having an analog/digital signal converter is preferred.

While the current best mode contemplates the use of one computer to serve all controlling and processing functions, individual controllers could easily be employed. A positioning control means is operably connected and responsive to the output signal from the means for determining the position of the object key and is operably connected to a means for rotating the transparent section of the pedestal. In this mode, the longitudinal centerline of an object key can be aligned perpendicular to a light stripe projected on to the object key by a light stripe generator and the light stripe generator can be positioned to project a light stripe on to the object key at the location where the grooves begin.

In another preferred embodiment of the invention for automatically making keys a non-contact means for extracting attributes of an object key comprises a light stripe generator which is arranged and adapted to project at least one light stripe obliquely on to an object key and a light receiver is arranged and adapted to receive an image of the projected light stripe reflected from the object key, and a means for identifying attributes relating to key cut codes of an object key that is operably connected and responsive to the output signal from the means for receiving an object image.

It will be obvious to one skilled in the art of image recognition that other methods employing optical character recognition, magnetic resonance imaging, or hologramatic imaging could be utilized. Moreover, an apparatus employing other known light generators and light receivers, could easily be employed.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims.

Furthermore, the purpose of the foregoing abstract is to enable the U.S. Patent and Trademark Office and the public generally, and especially the scientist, engineers and practitioners in the art who are not familiar with patent or legal terms of phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention are pointed out with particularity in the claims annexed to and forming a part of this disclosure. For a better understanding of the invention, its operating advantages and the specific objects attained by its uses, reference should be made to the accompanying drawing and descriptive matter in which there is illustrated preferred embodiments of the invention.

What is claimed as being new and desired to be protected is a follows:

1. A key making apparatus comprising:
   a non-contact means for extracting attributes of an object key having means for lighting arranged and adapted to project light onto an object key disposed on a supporting means and reveal an image of an object key positioned thereon, means for receiving at least one object image of an object key positioned on said supporting means and producing an output signal, means for identifying attributes of an object key that is operably connected and responsive to the output signal of the means for receiving an object image of the object key and means for aligning the supporting means and the means for receiving an object image of an object key,
   whereby, a revealed image of an object key disposed on the supporting means may be received by the means for receiving an object image of an object key Producing an output signal,
   wherein the means for aligning comprises:
   a means for supporting an object key having a transparent section on which the object key may be placed;
   a means for backlighting arranged and adapted to pass light through the transparent section of the supporting means and project an image of the object key positioned thereon;
   a means for receiving the object image of the object key;
   a means for ascertaining the position of the object key on the supporting means and producing an output signal; and
   a means for repositioning the object key relative to the means for receiving the object image of the object key responsive to the output signal produced by the ascertaining means,
   whereby, the object key can be repositioned relative to the means for receiving the object image of the object key.

2. A key making apparatus utilizing attributes of an object key comprising:
   means for determining the initial relative orientation of the object key as loosely supported on a surface;
   a non-contact means for extracting laterally exposed key cuts and attributes of the outer shape of the object key,
   whereby, key cut codes of the object key can be recognized.

3. A key making apparatus utilizing attributes of an object key comprising:
   means for determining the initial relative orientation of the object key as loosely supported on a surface;
   a non-contact means for extracting laterally protected attributes of the object key including at least one of a longitudinal groove and dimple,
   whereby, key cut codes of the object key can be recognized.

4. A key making apparatus utilizing attributes of an object key comprising means for determining the initial relative orientation of the object key as loosely supported on a surface, a non-contact means for extracting laterally exposed key cuts of the object key having means for backlighting arranged and adapted to pass light through a transparent section of the surface and project an image of the laterally exposed key cuts of the object key positioned thereon, means for receiving at least one object image of the laterally exposed key cut attributes of the object key positioned on said transparent section and producing an output signal correlated to said key cuts, and means for identifying laterally exposed attributes of the object key that is operably connected and responsive to the output signal correlated to said key cut attributes of the object key of the means for receiving an object image of the object key,
   whereby, a key blank and key cut codes from which the object key is made can be identified.

5. A key making apparatus utilizing attributes of an object key comprising:
   means for loosely supporting the object key comprising a surface;
   a non-contact means for extracting attributes of the object key including laterally exposed key cuts, comprising means for determining the position of a longitudinal axis of the object key; and
   means for establishing an operative positional relationship between the longitudinal axis of the object key and the non-contact means for extracting attributes of the object key, wherein the non-contact means for extracting attributes of an object key comprises:
   a means for backlighting arranged and adapted to pass light through a transparent section of a supporting means and project an image of an object key positioned thereon;
   a means for receiving at least one object image of an object key positioned on said transparent section and producing an output signal; and
   a means for identifying attributes of an object key that is operably connected and responsive to the output signal from the means for receiving an object image of the object key,
   whereby, a key blank and key cut codes from which the object key is made can be identified.

6. A key making apparatus utilizing attributes of an object key comprising:
   means for loosely supporting the object key comprising a surface;
   a means for extracting attributes of an object key; and
   means for establishing an operative positional relationship between the object key and the means for extracting attributes of the object key,
   wherein the means for establishing an operative positional relationship comprises:
   the means for loosely supporting the object key has a transparent section on which the object key may be placed, said means for loosely supporting the object key being rotatable;
   a means for backlighting arranged and adapted to pass light through the transparent section of the supporting means and project an image of the object key positioned thereon;

a means for receiving the object image of the object key and producing an output signal;

a means for determining the position of the longitudinal axis of the object key relative to a light stripe which may be projected on to the object key by a light stripe generator responsive to the output signal produced by the receiving means;

a means for rotating the means for loosely supporting the object key;

an object key positioning control means that is operably connected and responsive to an output signal from the means for determining the position of the object key and that is operably connected to the means for rotating the means for loosely supporting the object key, whereby, the longitudinal axis of an object key can be aligned perpendicular to a light stripe projected on to the object key by a light stripe generator.

7. A key making apparatus utilizing attributes of an object key having a longitudinal axis comprising:

means for loosely supporting the object key consisting of a surface;

a non-contact means for extracting attributes of the object: key; and means for establishing an operative positional relationship between the object key and the non-contact means for extracting attributes of the object key, wherein the non-fixturing means for establishing an operative positional relationship comprises:

the means for loosely supporting the object key having a transparent section on which the object key may be placed, said means for loosely supporting the object key being rotatable;

a means for backlighting arranged and adapted to pass light through the transparent section of the supporting means and project an image of the object key positioned thereon;

a means for receiving the object image of the object key and producing an output signal;

a means for determining the position of the longitudinal axis of the object key relative to a light stripe which may be projected on to the object key by a light stripe generator responsive to the output signal produced by the receiving means;

a means for rotating the means for loosely supporting the object key;

an object key positioning control means that is operably connected and responsive to an output signal from the means for determining the position of the object key and that is operably connected to the means for rotating the means for loosely supporting the object key, whereby, the longitudinal axis of an object key can be aligned perpendicular to a light stripe projected on to the object key by a light stripe generator.

8. A key making apparatus utilizing attributes of an object key comprising:

means for loosely supporting the object key comprising a surface;

a non-contact means for extracting attributes of the object key; and means for establishing an operative positional relationship between the object key and the non-contact means for extracting attributes of the object key, wherein the non-contact means for extracting attributes of an object key having a longitudinal axis comprises:

a means for backlighting arranged and adapted to pass light through a transparent section of a supporting means and project an image of an object key positioned thereon;

a means for receiving at least one object image of an object key positioned on said transparent section and producing an output signal; and a means for identifying attributes of an object key that is operably connected and responsive to the output signal from the means for receiving an object image of the object key., wherein the non-fixturing means for establishing an operative positional relationship comprises:

the means for supporting an object key having a transparent section on which the object key may be placed being rotatable;

a means for determining the position of the longitudinal axis of the object key relative to a light stripe which may be projected on the object key by a light stripe generator from the output signal produced by the receiving means;

a means for rotating the means for supporting an object key;

an object key positioning control means that is operably connected and responsive to an output signal from the means for determining the position of the object key and that is operably connected to the means for rotating the means for supporting an object key, whereby, the longitudinal axis of an object key can be aligned perpendicular to a light stripe which may be projected on to the object key by a light stripe generator.

9. The key making apparatus of claim 6, wherein the means for supporting an object key further comprises a means for aligning an object key with a horizontal plane.

10. The key making apparatus of claim 7, wherein the means for supporting an object key further comprises a means for aligning an object key with a horizontal plane.

11. The key making apparatus of claim 8, wherein the means for supporting an object key further comprises a means for aligning an object key with a horizontal plane.

12. The key making apparatus of claim 8, wherein:

a. the non-fixturing means for establishing an operative positional relationship further includes:

the transparent section having a blade section proximate to a handle section, said handle section being movable vertically from an upper position which is parallel to the plane of the blade section to a lower position at a spaced distance below the plane of the blade section, said handle section being sized and adapted to support the handle of an object key having a blade and a handle, said blade section being sized and adapted to support the blade of an object key; and b. the means for aligning an object key with a horizontal plane includes:

a horizontal light generator arranged and adapted to project a generally horizontal beam of light immediately above the means for supporting an object key and transverse to the blade of an object key which may be supported on the transparent section thereof;

a horizontal light receiver disposed to receive light from the horizontal light generator that is not obstructed by the blade of an object key disposed on the blade section of the means for supporting an object key, which receiver produces at least one output signal;

a means for adjusting the vertical elevation of the handle section of the means for supporting an object key;

a horizontal control means that is operably connected and responsive to the output signal from the horizontal light receiver and that is operably connected to the means for adjusting the vertical elevation of the handle section of the means for supporting an object key, whereby, an object key having a handle thickness larger than its blade thickness which is disposed on the transparent section of the means for supporting an object key may be aligned with a horizontal plane by lowering the handle section on which the handle of the object key is supported in response to the output signal generated by the horizontal light receiver arranged to receive light when the blade of said object key is not disposed flatly on said blade section.

13. The key making apparatus of claim 12, wherein the means for adjusting the vertical elevation of the handle section of the means for supporting an object key comprises:

a linear actuator having a shaft physically connected to the handle section and at least one linear slide disposed vertically for sliding support.

14. A key making apparatus utilizing attributes of an object key comprising:

a non-contact means for extracting laterally protected attributes including longitudinal grooves of an object key comprising:

a. a light stripe generator arranged and adapted to project at least one light stripe obliquely on to the object key; and b. a means for receiving an object image is arranged and adapted to receive an image of the projected light stripe reflected from the object key, whereby, the laterally protected attributes including longitudinal grooves of the object key can be extracted.

15. A key making apparatus utilizing attributes of an object key comprising:

means for loosely supporting the object key consisting of a surface;

means for determining the initial relative orientation of the object key;

a non-contact means for extracting attributes of the object key including laterally exposed key cuts, wherein the non-contact means for extracting attributes of an object key comprises:

a. a light stripe generator arranged and adapted to project at least one light stripe obliquely on to the object key; and b. a means for receiving an object image is arranged and adapted to receive an image of the projected light stripe reflected from the object key, whereby, the laterally exposed attributes of the object key can be extracted.

16. The key making apparatus of claim 4, wherein the non-contact means for extracting attributes of an object key comprises:

a. a light stripe generator arranged and adapted to project at least one light stripe obliquely on to the object key; and b. a means for receiving an object image is arranged and adapted to receive an image of the projected light stripe reflected from the object key, whereby, the laterally protected attributes of the object key can be extracted.

17. The key making apparatus of claim 12, wherein:

a. the non-contact means for extracting attributes of an object key comprises a light stripe generator arranged and adapted to project at least one light stripe obliquely on to the object key disposed on the transparent section; and b. the means for receiving an object image is arranged and adapted to receive an image of the projected light stripe reflected from the object key, whereby, the laterally protected attributes of the object key be identified by the means for identifying.

18. The key making apparatus of claim 17, wherein the light stripe generator comprises a collimated light source, a disk having a slit, and a convex lens, said disk being positioned between the light source and the lens to project a light stripe.

19. The key making apparatus of claim 17, wherein the light stripe generator comprises a laser producing an array which forms a line projected therefrom.

20. The key making apparatus of claim 17, wherein the means for receiving an object image comprises at least one camera, said camera being a pixel device for oriented fiber optic arrays.

21. A key making apparatus utilizing attributes of an object key comprising a non-contact means for extracting laterally exposed attributes of the object key having means for backlighting arranged and adapted to pass light through a transparent section of a supporting means and project an image of the object key positioned thereon, means for receiving at least one object image of the object key positioned on said transparent section and producing an output signal, and means for identifying laterally exposed attributes of the object key that is operably connected and responsive to the output signal of the means for receiving an object image of the object key;

wherein the means for identifying attributes of an object key comprises:

a. a pattern recognition means for recognizing a pixel pattern from an object image of the object key, and for producing a series of code signals with respect to each target pixel from the result of said recognition, said code signals defining traits of the recognized pixel pattern for each target pixel, said pixel patterns defining attributes of the object key; and b. a discrimination means having a pattern memory in which a set of predetermined master patterns is stored, said predetermined master patterns being a plurality of master code signals, said master code signals defining traits of a master pixel pattern, said master pixel pattern defining attributes of a selected manufacturer's key, for comparing the code signals from the pattern recognition means with a corresponding master code signal, and for producing an identifying signal, said identifying signal defines a corresponding key blank having a hole in the handle thereof with a predetermined master pattern having master code signals that match code signals from the result of the recognition of the pixel pattern of the object key, whereby, a corresponding key blank matching attributes of a known manufacturer's key may be determined.

22. A key making apparatus utilizing attributes of an object key comprising a non-contact means for extracting laterally exposed attributes of the object key having means for backlighting arranged and adapted to pass light through a transparent section of a supporting means and project an image of the object key positioned thereon, means for receiving at least one object image of the object key positioned on said transparent section and producing an output signal, and means for identifying laterally exposed attributes of the object key that is operably connected and responsive to the output signal of the means for receiving an object image of the object key;

wherein the means for identifying attributes of an object key comprises:

a. a pattern recognition means for recognizing an integrated pixel pattern from a plurality of discrete object images of the object key, and for producing a series of code signals with respect to each target pixel from the result of said recognition, said code signals defining traits of the recognized pixel pattern for each target pixel, said integrated pixel pattern defining attributes of the object key; and b. a discrimination means having a pattern memory in which a set of predetermined master patterns is stored, said predetermined master patterns being a plurality of master code signals, said master code signals defining traits of a master pixel pattern, said master pixel pattern defining attributes of a selected manufacturer's key, for comparing the code signals from the pattern recognition means with a corresponding master code signal, and for producing an identifying signal, said identifying signal defines a corresponding key blank having a hole in the handle thereof with a predetermined master pattern having master code signals that match code signals from the result of the recognition of the pixel pattern of the object key, whereby, a corresponding key blank matching attributes of a known manufacturer's key may be determined.

23. A key making apparatus utilizing attributes of an object key comprising a non-contact means for extracting laterally exposed attributes of the object key having means for backlighting arranged and adapted to pass light through a transparent section of a supporting means and project an image of the object key positioned thereon means for receiving at least one object image of the object key positioned on said transparent section and producing an output signal, and means for identifying laterally exposed attributes of the object key that is operably connected and responsive to the output signal of the means for receiving an object image of the object key;

wherein the means for identifying attributes of an object key comprises:

a. a pattern recognition means for recognizing at least one object image of the object key, and for producing a series of code signals with respect to each target pixel from the result of said recognition, said code signals defining traits of the recognized pixel pattern for each target pixel, said pixel patterns defining laterally exposed attributes represented on a polyline of a silhouette of the object key; and b. a discrimination means having a pattern memory in which a set of predetermined master patterns is stored, said predetermined master patterns being a plurality of master code signals, said master code signals defining traits of a master pixel pattern, said master pixel pattern defining laterally exposed attributes of a selected manufacturer's key, for comparing the code signals from the pattern recognition means with a corresponding master code signal, and for producing an identifying signal, said identifying signal defines a corresponding key blank having a hole in the handle thereof with a predetermined master pattern having master code signals that match code signals from the result of the recognition of the pixel pattern of the object key, whereby, a corresponding key blank matching the outer shape of a known manufacturer's key may be determined.

24. The key making apparatus of claim 14, wherein the means for identifying attributes of an object key comprises:

a. a pattern recognition means for recognizing a pixel pattern of at least one object image of the object key, and for producing a series of code signals with respect to each target pixel from the result of said recognition, said code signals defining traits of the recognized pixel pattern for each target pixel, said pixel pattern defining laterally protected attributes of the object key resulting from at least one light stripe being projected obliquely on to the blade thereof; and b. a discrimination means having a pattern memory in which a set of predetermined master patterns is stored, said predetermined master patterns being a plurality of master code signals, said master code signals defining laterally protected attributes of a selected manufacturer's key, for comparing the code signals from the pattern recognition means with a corresponding master code signal, and for producing an identifying signal, said identifying signal defines a corresponding key blank having a hole in the handle thereof with a predetermined master pattern having master code signals that match code signals from the result of the recognition of the pixel pattern of the object key, whereby, a key blank corresponding to a manufacturer's key identified with known laterally protected attributes that match the laterally protected attributes of the object key may be determined.

25. The key making apparatus of claim 23, wherein:

a. the pattern recognition means for recognizing a pixel pattern of at least one object image of the object key wherein said pixel pattern defining laterally protected attributes of the object key resulting from at least one light stripe being projected obliquely on to the blade thereof; and b. the discrimination means having a pattern memory in which a set of predetermined master patterns is stored, said predetermined master patterns being a plurality of master code signals, said master code signal further defining laterally protected attributes of a selected manufacturer's key, for comparing the code signals from the pattern recognition means with a corresponding master code signal, and for producing an identifying signal, said identifying signal defines a corresponding key blank having a hole in the handle thereof with a predetermined master pattern having master code signals that match code signals from the result of the recognition of the pixel pattern of the object key, whereby, a key blank corresponding to a manufacturer's key identified with known laterally protected and laterally exposed attributes that match the attributes of the object key may be determined.

26. The key making apparatus of claim 21, wherein the identifying signal further defines a key cut code identified with the corresponding key blank, whereby, key cuts conforming to the key cut codes of a known manufacturer's key may be determined.

27. The key making apparatus of claim 22, wherein the identifying signal further defines a key cut code identified with the corresponding key blank, whereby, key cuts conforming to the key cut codes of a known manufacturer's key may be determined.

28. The key making apparatus of claim 23, wherein the identifying signal further defines a key cut code identified with the corresponding key blank, whereby, key cuts conforming to the key cut codes of a known manufacturer's key may be determined.

29. The key making apparatus of claim 25, wherein the identifying signal further defines a key cut code identified with the corresponding key blank, whereby, key cuts conforming to the key cut codes of a known manufacturer's key may be determined.

30. The key making apparatus of claim 21, wherein the identifying signal further defines key cut features of the object key that correspond generally with key cut codes identified with the corresponding key blank, whereby, the key cut features of the object key may be determined for use with the corresponding key blank.

31. The key making apparatus of claim 25, wherein the identifying signal further defines key cut features of the object key that correspond generally with key cut codes identified with the corresponding key blank, whereby, the key cut features of the object key may be determined for use with the corresponding key blank.

32. The key making apparatus of claim 17, wherein the means for identifying attributes of an object key comprises:

a. a pattern recognition means for recognizing at least one object image of the object key, and for producing a series of code signals with respect to each target pixel from the result of said recognition, said code signals defining traits of the recognized pixel pattern for each target pixel, said pixel patterns defining attributes of the object key; and b. a discrimination means having a pattern memory in which a set of predetermined master patterns is stored, said predetermined master patterns being a plurality of master code signals, said master code signals defining traits of a master pixel pattern, each master pixel pattern defining attributes of a selected manufacturer's key, for comparing the code signals from the pattern recognition means with a corresponding master code signal, and for producing an identifying signal, said identifying signal defines a corresponding key blank having a hole in the handle thereof and its associated key cut code with a predetermined master pattern having master code signals that match code signals from the result of the recognition of the pixel pattern of the object key, whereby, a corresponding key blank matching a known manufacturer's key and its associated key cut code may be determined.

33. The key making apparatus as in any one of claims 14, 15, 16, 17, 24, 25, 29, 31, or 32, wherein the non-contact means for extracting attributes of an object key further comprises:

a. an elongated horizontal rail having its longitudinal axis lying perpendicular to the light stripe;

b. a bracket slidingly supported by said rail, said bracket supporting the light stripe generator and the means for receiving an image of the light stripe which are attached thereto and in fixed positional relationship with each other; and c. a means for moving the bracket along the rail, whereby, the light stripe generator and the means for receiving an image of the light stripe may move in tandem along the rail and images of the light stripe projected along an object key may be extracted.

34. A method for automatically making keys utilizing attributes of an object key having a longitudinal axis which comprises:

a. loosely supporting the object key by receiving said object key on a surface;

b. determining the initial relative orientation of the object key;

c. establishing an operative positional relationship between the longitudinal axis of the loosely supported object key and a means for extracting attributes of the loosely supported object key; and d. extracting attributes including laterally exposed key cuts of the loosely supported object key, whereby, key cut codes of the object key can be recognized.

35. A method for automatically making keys utilizing attributes of an object key which comprises automatically utilizing means for determing the initial relative orientation of the object key as loosely supported on a surface; and automatically utilizing means for extracting laterally exposed key cuts and attributes of the outer shape of the object key independent of physical contact, whereby, key cut codes of the object key can be recognized.

36. A method for automatically making keys utilizing attributes of an object key having a longitudinal axis which comprises:

a. loosely supporting the object key consisting of a surface;

b. establishing an operative positional relationship between the longitudinal axis of the loosely supported object key and a means for extracting attributes of the loosely supported object key; and c. extracting attributes of the loosely supported object key including laterally exposed key cuts, independent of physical contact, whereby, key cut codes of the object key can be recognized.

37. A method for automatically making keys utilizing attributes of an object key having a longitudinal axis which comprises:

a. loosely supporting the object key consisting of a surface;

b. establishing an operative positional relationship between the longitudinal axis of the loosely supported object key and a means for extracting laterally protected attributes of the loosely supported object key; and c. extracting laterally protected attributes of the loosely supported object key, whereby, key cut codes of the object key can be recognized.

38. A method for automatically making keys which comprises:

a. receiving an object key on a transparent section of a surface an object key;
b. automatically utilizing means for determining the initial relative orientation of the object key as loosely supported on a surface;
c. backlighting the object key by passing light through the transparent section of the surface and projecting an object image including key cut attributes;
d. receiving at least one object image of the object key including key cut attributes;
e. producing an output signal; and
f. identifying laterally exposed attributes including key cut attributes of the object key responsive to the output signal, whereby, key cut codes of the object key can be recognized.

39. A method for automatically making keys which comprises:
a. receiving an object key on a rotatable means for supporting an object key having a transparent section;
b. automatically utilizing means for determining the initial relative orientation of the object key:
c. backlighting the object key by passing light through the transparent section of the supporting means and projecting an object image;
d. receiving at least one object image of the object key;
e. determining from the object image the position of a longitudinal (centerline) axis of the object key in a generally horizontal position relative to a light stripe which may be projected on to the object key by a light stripe generator;
f. producing an output signal corresponding to said determination; and
g. rotating the means for supporting an object key for alignment with a line perpendicular to a light stripe which may be projected on to the object key by a light stripe generator.

40. A method for automatically making keys comprising the following steps:
a. adjusting the focal plane viewed by a means for receiving an object image of an object key;
b. extracting attributes of an object key;
c. recognizing an integrated pixel pattern from a plurality of discrete object images of the object key,
  each of said discrete object images taken from a discrete focal plane in which the object key lies;
d. producing a series of code signals with respect to each target pixel from the result of said recognition, said code signals defining traits of the recognized pixel pattern for each target pixel, said integrated pixel pattern defining attributes of the object key; and
e. comparing the code signals from the pattern recognition means with a corresponding master code signal from a discrimination means having a pattern memory in which a set of predetermined master patterns is stored, said predetermined master patterns being a plurality of master code signals, said master code signals defining traits of a master pixel pattern, said master pixel pattern defining attributes of a selected manufacturer's key;
f. producing an identifying signal, said identifying signal defines both a key cut code and key cut features of the object key that correspond generally with key cut codes identified with the corresponding key blank and a corresponding key blank having a hole in the handle thereof with a predetermined master pattern having master code signals that generally correspond to code signals from the result of the recognition of the pixel pattern of the object key,
  whereby, a corresponding key blank matching attributes of a known manufacturer's key, and key cuts hybridizing the key cut features of the object key and the key cut codes of a known manufacturer's key may be determined.

41. A method for automatically making keys which comprises the steps in the order set forth:
a. projecting a generally horizontal beam of light immediately above the means for supporting an object key and transverse to a blade of an object key supported on the transparent section thereof, said transparent section having a blade section and an adjacent handle section for a blade and handle, respectively, of an object key;
b. receiving the horizontal beam of light which is not obstructed by the blade of an object key disposed on the blade section of the means for supporting an object key and producing at least one output signal;
c. incrementally lowering the vertical elevation of the handle section of the means for supporting an object key in relation to said output signal; and
d. repeating sequential steps a, b, and c until the light received no longer exceeds a minimum threshold, indicating that the blade of said object key is disposed flatly on the blade section.

42. A method for automatically making keys which comprises the sequential steps:
a. receiving an object key on a rotatable means for supporting an object key having a transparent section;
b. backlighting the object key by passing light through the transparent section of the supporting means and projecting an image;
c. receiving at least one object image of the object key;
d. determining from the object image the position of the longitudinal centerline of the object key in a horizontal plane relative to a light stripe projected on to the object key by a light stripe generator;
e. producing an output signal corresponding to said determination;
f. rotating the means for supporting an object key for alignment with a line perpendicular to a light stripe which may be projected on to the object key by a light stripe generator in relation to said output signal;
g. projecting a generally horizontal beam of light immediately above the means for supporting an object key and transverse to a blade of an object key supported on the transparent section thereof, said transparent section having a blade section and an adjacent handle section for a blade and handle, respectively, of the object key;
h. receiving the horizontal beam of light that is not obstructed by the blade of an object key disposed on the blade section of the means for supporting an object key and producing at least one output signal;
i. incrementally lowering the vertical elevation of the handle section of the means for supporting an object key in relation to said output signal; and
j. repeating sequential steps g, h, and i until the light received no longer exceeds a minimum threshold, indicating that the blade of said object key is disposed flatly on the blade section.

43. A method for automatically making keys which comprises:
a. projecting at least one light stripe obliquely on to an object key;

b. receiving an object image of the light stripe of laterally protected attributes of the object key;

c. recognizing a pixel pattern from said object image;

d. producing a series of code signals that define traits of the recognized pixel pattern for each target pixel from the result of said recognition;

e. comparing the code signals with master code signals from a master pattern memory, said master code signals defining traits of a master pixel pattern of a selected manufacturer's key; and f. producing an identifying signal from such comparison, said identifying signal defining a corresponding key blank with a predetermined master pattern having master code signals that match code signals from the result of the recognition of the pixel pattern of the object key.

44. A method for automatically making keys which comprises:

a. projecting at least one light stripe obliquely on to an object key;

b. receiving an object image of the light stripe of laterally protected attributes of the object key;

c. recognizing a pixel pattern from said object image;

d. producing a series of code signals that define traits of the recognized pixel pattern for each target pixel from the result of said recognition;

e. comparing the code signals with master code signals from a master pattern memory, said master code signals defining traits of master pixel patterns which define laterally protected attributes of a selected manufacturer's key; and f. producing an identifying signal from such comparison, said identifying signal defining key cut codes with a predetermined master pattern having master code signals that match code signals from the result of the recognition of the pixel pattern of the object key, whereby, key cuts conforming to the key cut codes may be cut in to a corresponding key blank.

45. A method for automatically making keys which comprises the sequential steps:

a. projecting at least one light stripe obliquely on to an object key;

b. receiving an object image of the light stripe of laterally protected attributes of the object key;

c. recognizing a pixel pattern from said object image;

d. producing a series of code signals that define traits of the recognized pixel pattern for each target pixel from the result of said recognition;

e. comparing the code signals with corresponding master code signals from a master pattern memory, said master code signals defining traits of a master pixel pattern of laterally protected attributes of a selected manufacturer's key; and f. producing an identifying signal from such comparison, said, identifying signal defining a corresponding key blank with a predetermined master pattern having master code signals that match code signals from the result of the recognition of the pixel pattern of the object key.

46. A method for automatically making keys which comprises:

a. receiving an object key on a means for supporting an object key having a transparent section;

b. backlighting the object key by passing light through the transparent section of the supporting means and projecting an image;

c. receiving at least one object image of the object key;

d. recognizing a pixel pattern from said object image;

e. producing a series of code signals that define traits of the recognized pixel pattern for each target pixel from the result of said recognition, said target pixels defining a polyline of laterally exposed attributes of the object key;

f. comparing the code signals with corresponding master code signals from a master pattern memory, each master code signal defining traits of a master pixel pattern of laterally exposed attributes of a selected manufacturer's key;

g. producing an identifying signal from such comparison; and h. identifying laterally exposed attributes of the object key responsive to the output signal.

47. A method for automatically making keys which comprises:

a. receiving at least one object key on a means for supporting an object key having a transparent section;

b. backlighting the object key by passing light through the transparent section of the supporting means and projecting an object image;

C. receiving an object image of the object key;

d. repositioning the object image receiver;

e. repeating steps b, c, and d;

f. gathering together the plurality of object images and producing at least one integrated output signal; and g. identifying laterally exposed attributes of the object key responsive to the integrated output signal.

48. A method for automatically making keys which comprises:

a. backlighting an object key and projecting an object image;

b. receiving an object image of the object key;

c. repositioning the object image receiver;

d. repeating steps a,b, and c;

e. gathering together the plurality of object images and producing an integrated object image;

f. recognizing a pixel pattern from said integrated object image;

g. producing a series of code signals that define traits of the recognized pixel pattern for each target pixel from the result of said recognition;

h. comparing the code signals with corresponding master code signals from a master pattern memory, each master code signal defining traits of a master pixel pattern of laterally exposed attributes of a selected manufacturer's key; and i. producing an identifying signal from such comparison, said identifying signal defining a corresponding key blank with a predetermined master pattern having master code signals that match code signals from the result of the recognition of the pixel pattern of the object key.

49. A method for automatically making keys which comprises:

a. projecting a light stripe from a light stripe generator obliquely on to an object key;

b. receiving an object image of the light stripe of the object key;

c. repositioning an assembly of the light stripe generator and the object image receiver which are in fixed positional relationship with each other;

d. repeating steps a, b, and c;

e. gathering together the plurality of object images and producing an integrated object image;

f. recognizing a pixel pattern from said integrated object image;

g. producing a series of code signals that define traits of the recognized pixel pattern for each target pixel from the result of said recognition;

h. comparing the code signals with corresponding master code signals from a master pattern memory, each master code signal defining traits of a master pixel pattern of laterally protected attributes of a selected manufacturer's key; and i. producing an identifying signal from such comparison, said identifying signal defining a corresponding key blank with a predetermined master pattern having master code signals that match code signals from the result of the recognition of the pixel pattern of the object key.

50. A method for automatically making keys which comprises:

a. projecting a light stripe from a light stripe generator obliquely on to an object key;

b. receiving an object images of the light stripe of the object key;

c. varying the exposure time for the object receiver;

d. repeating steps a, b, and c;

e. comparing the plurality of object images, discarding any aberrant object images, and producing an optimum object image of the remaining object images;

f. recognizing a pixel pattern from said optimum object images;

g. producing a series of code signals that define traits of the recognized pixel pattern for each target pixel from the result of said recognition;

h. comparing the code signals with corresponding master code signals from a master pattern memory, each master code signal defining traits of a master pixel pattern of a selected manufacturer's key; and i. producing an identifying signal from such comparison, said identifying signal defining a corresponding key blank with a predetermined master pattern having master code signals that match code signals from the result of the recognition of the pixel pattern of the object key.

51. A method for automatically making keys which comprises:

a. projecting a light stripe from a light stripe generator obliquely on to an object key;

b. receiving an object image of the light stripe of the object key;

c. varying the exposure time for the object receiver;

d. repeating steps a, b, and c;

e. comparing the plurality of object images, discarding any aberrant object images, and producing an optimum object image of the remaining object images;

f. repositioning an assembly of the light stripe generator and the object image receiver which are in fixed positional relationship with each other;

g. repeating steps a, b, c, d, and e;

h. gathering together the plurality of optimum object images and producing at least one integrated output signal;

i. recognizing a pixel pattern from said integrated object images;

j. producing a series of code signals that define traits of the recognized pixel pattern for each target pixel from the result of said recognition;

k. comparing the code signals with corresponding master code signals from a master pattern memory, each master code signal defining traits of a master pixel pattern of a selected manufacturer's key; and l. producing an identifying signal from such comparison, said identifying signal defining a corresponding key blank with a predetermined master pattern having master code signals that match code signals from the result of the recognition of the pixel pattern of the object key.

52. The method for automatically making keys as in any one of claims 43–51, comprising the following additional steps:

a. selecting a key blank corresponding to said identifying signal from a plurality of key blanks;

b. grasping said key blank;

c. positioning said key blank for cutting;

d. cutting key cut features into said corresponding key blank to create a new key;

e. deburring said new key; and f. dispensing said new key.

53. A method for automatically making keys which comprises:

a. receiving an object key having a blade and a handle on a rotatable means for supporting an object key having a transparent section with a fixed blade section adjacent to a movable handle section;

b. backlighting the object key by passing light through the transparent section of the supporting means and projecting an image;

c. receiving at least one object image of the object key;

d. determining from the object image the position of the longitudinal centerline of the object key relative to a light stripe which may be projected on to the object key by a light stripe generator;

e. producing a first output signal corresponding to said determination;

f. rotating the means for supporting an object key for alignment with a line perpendicular to a light stripe which may be projected on to the object key by a light stripe generator in relation to said first output signal;

g. projecting a generally horizontal beam of light immediately above the means for supporting an object key and transverse to the blade of the object key supported thereon;

h. receiving the light of the horizontal beam that is not obstructed by the blade of an object key disposed on the blade section of the means for supporting an object key and producing at least one second output signal;

i. incrementally lowering the vertical elevation of the handle section of the means for supporting an object key in relation to said second output signal; and j. repeating sequential steps g, h, and i until the light received no longer exceeds a minimum threshold, indicating that the blade of said object key is disposed flatly on the blade section;

k. continue backlighting the object key by passing light through the transparent section of the supporting means and projecting an image;

l. receiving at least one backlit object image of the object key;

m. recognizing a pixel pattern from said backlit object image;

n. producing a series of primary code signals that define traits of the recognized pixel pattern for each target pixel from the result of said recognition, said target pixels defining a polyline of laterally exposed attributes of the object key;

o. comparing the primary code signals relating to outline shape of the polyline with corresponding master code signals from a master pattern memory, each master code signal defining traits of a master pixel pattern relating to the shape of a selected manufacturer's key;

p. producing a first identifying signal from such comparison,
    said first identifying signal defining a corresponding key blank with a predetermined master pattern having master code signals that match code signals from the result of the recognition of the pixel pattern of the object key,
    whereby, a corresponding selected manufacturer's key and a corresponding key blank responsive to the first identifying signal may be determined;

q. projecting at least one light stripe obliquely on to an object key disposed on the transparent section, thereby creating an image of laterally protected attributes of said object key;

r. receiving an object image of the light stripe of the laterally protected attributes of the object key;

s. recognizing a pixel pattern from said object image of the light stripe of the laterally protected attributes of the object key;

t. producing a series of secondary code signals that define traits of the recognized pixel pattern for each target pixel from the result of said recognition, said target pixels defining a light stripe of the laterally protected attributes of the object key;

u. comparing each of the secondary code signals with a corresponding master code signal from the master pattern memory, said master code signals defining traits of a master pixel pattern relating to the laterally protected attributes of the selected manufacturer's key;

v. producing a second identifying signal from such comparison, said second identifying signal defining that the corresponding key blank with a predetermined master pattern having master code signals matches the secondary code signals from the result of the recognition of the pixel pattern of the laterally protected attributes of the object key;

w. comparing the primary code signals relating to laterally exposed key cut features of the polyline with the master code signal from the master pattern memory, said master code signals defining traits of a master pixel pattern of key cut codes of the selected manufacturer's key;

x. producing a third identifying signal from such comparison, said third identifying signal defining a key cut code of the selected manufacturer's key with a predetermined master pattern having master code signals that match the primary code signals from the result of the recognition of the pixel pattern of the laterally exposed attributes of the object key,
    whereby, the key cut code of the object key is identified and the corresponding key blank is confirmed, in response to the third identifying signal;

y. selecting the corresponding key blank from a plurality of key blanks from said identifying signal;

z. grasping said key blank;

aa. positioning said key blank for cutting; and ab. cutting key cut features into said key blank to create a new key.

54. A method for automatically making keys comprising the following steps:

a. adjusting the focal plane viewed by a means for receiving an object image of an object key;

b. extracting attributes of an object key;

c. recognizing an integrated pixel pattern from a plurality of discrete object images of the object key,
    each of said discrete object images taken from a discrete focal plane in which the object key lies;

d. producing a series of code signals with respect to each target pixel from the result of said recognition, said code signals defining traits of the recognized pixel pattern for each target pixel, said integrated pixel pattern defining attributes of the object key; and e. comparing the code signals from the pattern recognition means with a corresponding master code signal from a discrimination means having a pattern memory in which a set of predetermined master patterns is stored, said predetermined master patterns being a plurality of master code signals, said master code signals defining traits of a master pixel pattern, said master pixel pattern defining attributes of a selected manufacturer's key;

f. producing an identifying signal, said identifying signal defines a corresponding key blank having a hole in the handle thereof with a predetermined master pattern having master code signals that match code signals from the result of the recognition of the pixel pattern of the object key,
    whereby, a corresponding key blank matching attributes of a known manufacturer's key may be determined.

55. A method for automatically making keys comprising the following steps:

a. adjusting the focal plane viewed by a means for receiving an object image of an object key;

b. extracting attributes of an object key;

c. recognizing a pixel pattern from an object image of the object key;

d. producing a series of code signals with respect to each target pixel from the result of said recognition, said code signals defining traits of the recognized pixel pattern for each target pixel, said integrated pixel pattern defining attributes of the object key; and e. comparing the code signals from the pattern recognition means with a corresponding master code signal from a discrimination means having a pattern memory in which a set of predetermined master patterns is stored, said predetermined master patterns being a plurality of master code signals, said master code signals defining traits of a master pixel pattern, said master pixel pattern defining attributes of a selected manufacturer's key;

f. producing an identifying signal, said identifying signal defines both a key cut code and key cut features of the object key that correspond generally with key cut codes identified with the corresponding key blank and a corresponding key blank having a hole in the handle thereof with a predetermined master pattern having master code signals that generally correspond to code signals from the result of the recognition of the pixel pattern of the object key,
    whereby, a corresponding key blank matching attributes of a known manufacturer's key, and key cuts hybridizing the key cut features of the object key and the key cut codes of a known manufacturer's key may be determined.

56. A method for automatically making keys which comprises:

a. receiving at least one object image of an object key;

b. recognizing a pixel pattern from said object image;

c. producing a series of code signals that define traits of the recognized pixel pattern for each target pixel from the result of said recognition, said target pixels defining attributes of the object key;

d. comparing the primary code signals with corresponding master code signals from a master pattern memory, each master code signal defining traits of a master pixel pattern of attributes of a selected manufacturer's key;

e. producing a rejection signal from such comparison, said rejection signal defining a lack of master code signals matching the primary code signals from the result of said recognition of the pixel pattern of the object key; and, in response to said rejection signal:

f. turning on an overhead light and illuminating the object key;

g. receiving at least one object image of the illuminated object key and producing a memory signal; and h. storing said memory signal.

57. A method for automatically making keys which comprises:

a. backlighting an object key and projecting an image;

b. receiving at least one backlit object image of the object key;

c. recognizing a pixel pattern from said backlit object image;

d. producing a series of primary code signals that define traits of the recognized pixel pattern for each target pixel from the result of said recognition, said target pixels defining a polyline of laterally exposed attributes of the object key;

e. comparing the primary code signals relating to the outline shape of the polyline with corresponding master code signals from a master pattern memory, each master code signal defining traits of a master pixel pattern of the shape of a selected manufacturer's key;

f. producing a first rejection signal from such comparison, said rejection signal defining a lack of corresponding master code signals matching the primary code signals from the result of said recognition of the pixel pattern of the object key; and, in response to said first rejection signal:

g. turning on an overhead light and illuminating the object key;

h. receiving at least one object image of the illuminated object key and producing first memory signal; and i. storing said first memory signal.

58. A method for automatically making keys which comprises:

a. backlighting an object key and projecting an image;

b. receiving at least one backlit object image of the object key;

c. recognizing a pixel pattern from said backlit object image;

d. producing a series of primary code signals that define traits of the recognized pixel pattern for each target pixel from the result of said recognition, said target pixels defining a polyline of laterally exposed attributes of the object key;

e. comparing the primary code signals relating to outline shape of the polyline with corresponding master code signals from a master pattern memory, each master code signal defining traits of a master pixel pattern relating to the shape of a selected manufacturer's key;

f. producing a first identifying signal from such comparison,
    said first identifying signal defining a corresponding key blank with a predetermined master pattern having master code signals that match code signals from the result of the recognition of the pixel pattern of the object key,
    whereby, a corresponding selected manufacturer's key and a corresponding key blank responsive to the first identifying signal may be determined;

g. projecting at least one light stripe on to an object key;

h. receiving an object image of the light stripe of laterally protected attributes of the object key;

i. recognizing a pixel pattern from said object image of the light stripe of the laterally protected attributes of the object key;

j. producing a series of secondary code signals that define traits of the recognized pixel pattern for each target pixel from the result of said recognition, said target pixels defining a light stripe of the laterally protected attributes of the object key;

k. comparing each of the secondary code signals with corresponding master code signals from a master pattern memory, each master code signal defining traits of a master pixel pattern of the laterally protected attributes of the selected manufacturer's key;

l. producing an inquiry signal from such comparison, said inquiry signal defining a lack of corresponding master code signals matching the secondary code signals from the result of said recognition of the pixel pattern of the object key; and, in response to said inquiry signal:

m. determining whether there may be information on another side of the object key from the master pattern memory relating to the selected manufacturer's key, and producing a rejection signal, said rejection signal defining a lack of information on another side of the object key; and, in response to said rejection signal:

n. turning on an overhead light and illuminating the object key;

o. receiving at least one object image of the illuminated object key and producing a memory signal; and p. storing said memory signal.

59. A method for automatically making keys which comprises:

a. backlighting the object key by passing light through the transparent section of the supporting means and projecting an image;

b. receiving at least one backlit object image of the object key;

c. recognizing a pixel pattern from said backlit object image;

d. producing a series of primary code signals that define traits of the recognized pixel pattern for each target pixel from the result of said recognition, said target pixels defining a polyline of laterally exposed attributes of the object key;

e. comparing the primary code signals relating to an outline shape of the polyline with corresponding master code signals from a master pattern memory, each master code signal defining traits of a master pixel pattern of the shape of a selected manufacturer's key;

f. producing a first identifying signal from such comparison, said first identifying signal defining a corresponding key blank with a predetermined master pattern having master code signals that match code signals from the result of the recognition of the pixel pattern of the object key, whereby, a corresponding selected manufacturer's key and a corresponding key blank responsive to the first identifying signal may be determined; and g. projecting at least one light stripe on to an object key;

h. receiving an object image of the light stripe of laterally protected attributes of the object key;

i. recognizing a pixel pattern from said object image of the light stripe of the laterally protected attributes of the object key;

j. producing a series of secondary code signals that define traits of the recognized pixel pattern for each target pixel from the result of said recognition of the pixel pattern from said object image of the light stripe of the laterally protected attributes of the object key;

k. comparing each of the secondary code signals with corresponding master code signals from a master pattern memory, each master code signal defining traits of a master pixel pattern of the laterally protected attributes of the selected manufacturer's key;

l. producing an inquiry signal from such comparison, said inquiry signal defining corresponding master code signals matching the secondary code signals from the result of said recognition of the pixel pattern of the object key; and, in response to said inquiry signal:

m. determining whether there may be information on another side of the object key from the master pattern memory relating to the selected manufacturer's key, and producing a restart signal, said restart signal defining further information on another side of the object key; and, in response to said restart signal:

n. providing instructions to flip over the object key; and o. repeating steps a through k.

60. A method for automatically making keys which comprises:

a. backlighting an object key and projecting an image;

b. receiving at least one backlit object image of the object key;

c. recognizing a pixel pattern from said backlit object image;

d. producing a series of primary code signals that define traits of the recognized pixel pattern for each target pixel from the result of said recognition, said target pixels defining a polyline of laterally exposed attributes of the object key;

e. comparing the primary code signals relating to outline shape of the polyline with corresponding master code signals from a master pattern memory, each master code signal defining traits of a master pixel pattern relating to the shape of a selected manufacturer's key;

f. producing a first identifying signal from such comparison, said first identifying signal defining a corresponding key blank with a predetermined master pattern having master code signals that match code signals from the result of the recognition of the pixel pattern of the object key, whereby, a corresponding selected manufacturer's key and a corresponding key blank responsive to the first identifying signal may be determined;

g. projecting at least one light stripe on to an object key disposed on the transparent section, thereby creating an image of laterally protected attributes of said object key;

h. receiving an object image of the light stripe of the laterally protected attributes of the object key;

i. recognizing a pixel pattern from said object image of the light stripe of the laterally protected attributes of the object key;

j. producing a series of secondary code signals that define traits of the recognized pixel pattern for each target pixel from the result of said recognition, said target pixels defining a light stripe of the laterally protected attributes of the object key;

k. comparing each of the secondary code signals with a corresponding master code signal from the master pattern memory, said master code signals defining traits of a master pixel pattern relating to the laterally protected attributes of the selected manufacturer's key;

l. producing a second identifying signal from such comparison, said second identifying signal defining that the corresponding key blank with a predetermined master pattern having master code signals matches the secondary code signals from the result of the recognition of the pixel pattern of the laterally protected attributes of the object key;

m. comparing the primary code signals relating to laterally exposed key cut features of the polyline with the master code signal from the master pattern memory, said master code signals defining traits of a master pixel pattern of key cut codes of the selected manufacturer's key;

n. producing a rejection signal from such comparison, said rejection signal defining a lack of corresponding master code signals matching the primary code signals from the result of said recognition of the pixel pattern of the object key; and, in response to said rejection signal:

o. turning on an overhead light and illuminating the object key;

p. receiving at least one object image of the illuminated object key and producing a memory signal; and q. storing said memory signal.

61. The method for automatically making keys as in claim 56, further comprising displaying key reject instructions and opening an access door.

62. A method for automatically making keys which comprises:

a. actuating at least one subbase motor drive to position a key effector having a moveable rod with an upwardly extending pin in operative association with a corresponding key blank in response to an identifying signal;

b. actuating a first actuable means to horizontally move the rod axially to position the upwardly extending pin at a spaced distance below and in alignment with a hole in the handle of the corresponding key blank;

c. actuating a motor drive to position the pin of the key effector vertically into the hole in the handle of the corresponding key blank;

d. actuating the first actuable means to horizontally draw in the rod axially to withdraw the corresponding key blank from a holding means;

e. actuating a second actuable means to secure the corresponding key blank with a clamping means;

f. actuating a means for cutting;

g. actuating at least one subbase motor drive to position the key effector and the secured corresponding key blank in operative association with the means for cutting to cut a new key;

h. actuating the second actuable means to release the clamping means; and i. actuating at least one subbase motor drive to position the new key for dispensing.

63. The method for automatically making keys in claim 62 comprising actuating at least one subbase motor drive to position the key effector and the secured corresponding key blank in operative association with a position indicator to determine the actual position of the key blank relative to the key effector, and producing a positioning signal for correcting a misalignment.

64. The key making apparatus of claim 4, wherein the means for identifying attributes of an object key comprises a computing means having an analog/digital signal converter.

65. The key making apparatus of claim 5, wherein the means for identifying attributes of an object key comprises a computing means having an analog/digital signal converter.

66. The key making apparatus of claim 6, wherein the means for determining the position of the longitudinal axis of the object key relative to a light stripe comprises a computing means having an analog/digital signal converter.

67. The key making apparatus of claim 12, wherein the horizontal control means comprises a computing means having an analog/digital signal converter.

68. The key making apparatus of claim 14, wherein the recognition means comprises a computing means having an analog/digital signal converter.

69. A key making apparatus comprising:

means for determining the initial relative orientation of the object key as loosely supported on a surface, a non-contact means for extracting attributes including key cuts of an object key having means for lighting arranged and adapted to project light onto an object key disposed on the surface and reveal an image including key cuts of an object key positioned thereon, means for receiving at least one object image of an object key including key cuts positioned on said surface and producing an output signal, means for identifying attributes including key cuts of an object key that is operably connected and responsive to the output signal of the means for receiving an object image of the object key and means for aligning the surface and the means for receiving an object image of an object key, whereby, a revealed image of an object key including key cuts disposed on the surface may be received by the means for receiving an object image of an object key producing an output signal, wherein the non-contact means for extracting laterally exposed attributes including key cuts of an object key comprises:

a means for backlighting arranged and adapted to pass light through a transparent section of the surface and project an image of an object key including key cuts positioned thereon;

a means for receiving at least one object image including key cuts of an object key positioned on said transparent section and producing an output signal; and a means for identifying laterally exposed attributes including key cuts of an object key that is operably connected and responsive to the output signal of the means for receiving an object image of the object key.

70. A method for automatically making keys which comprises the following automatic steps:

a. automatically utilizing means for determining the initial relative orientation of the object key as loosely supported; on a surface;

b. adjusting the focal plane viewed by a means for receiving an object image of an object key; and c. extracting attributes including longitudinal grooves and attributes of the outer shape of an object key, whereby, key cut codes of the object key can be recognized.

71. A method for automatically making keys utilizing attributes of an object key which comprises:

a. loosely supporting the object key by receiving a said object key on a surface;

b. automatically utilizing means for determining the initial relative orientation of the loosely supported object key;

c. adjusting the focal plane viewed by a means for receiving an object image of the loosely supported object key; and d. extracting attributes including laterally protected grooves of the loosely supported object key, whereby, key cut codes of the object key can be recognized.

72. A method for automatically making keys which comprises automatically utilizing means for determining the initial relative orientation of the object key as loosely supported on a surface, and automatically utilizing means for extracting attributes including key cuts and attributes of the outer shape of an object key independent of physical contact, whereby, key cut codes of the object key can be recognized.

73. A method for automatically making keys which comprises:

a. receiving an object key on a surface; and the following automatic steps;

b. automatically utilizing means for determining the initial relative orientation of the object key as loosely supported on the surface;

c. receiving at least one object image of the object key including key cuts;

d. producing an output signal relating to said key cuts; and e. identifying attributes including key cut codes of the object key responsive to the output signal.

74. The method for automatically making keys of claim 70, wherein adjusting the focal plane viewed by a means for receiving an object image of an object key comprises automatically adjusting a variable focus lens of the means for receiving an object image of an object key.

75. The method for automatically making keys of claim 70, wherein adjusting the focal plane viewed by a means for receiving an object image of an object key comprises automatically varying the distance between an object key disposed on a supporting surface and the means for receiving an object image.

76. The method for automatically making keys of claim 75, wherein varying the distance between an object key disposed on the supporting surface and the means for receiving an object image comprises automatically moving the supporting surface relative to the means for receiving an object image.

77. The method for automatically making keys of claim 75, wherein varying the distance between an object key disposed on the supporting surface and the means for receiving an object image comprises automatically moving the means for receiving an object image relative to the supporting surface.

78. A method for automatically making keys having a longitudinal axis which comprises automatically aligning an object key that is loosely supported on a surface by determining the position of the longitudinal axis of the object key supported thereon and receiving an object image of the object key and producing an output signal, whereby, a revealed image of an object key disposed on the surface may be received by the means for receiving an object image of an object key and the key cut codes of the object key determined.

79. A method for automatically making keys which comprises:

a. placing an object key on a means for supporting which has a transparent section on which the object key may be placed;
   b. passing backlight through the transparent section of the supporting means and project an image of the object key positioned thereon;
   c. receiving the object image of the object key;
   d. ascertaining the position of the object key on the supporting means and producing an output signal; and
   e. repositioning the object key relative to the means for receiving the object image of the object key responsive to the output signal produced by the ascertaining means.

80. A method for automatically making keys comprising the following steps:

a. adjusting the focal plane viewed by a means for receiving an object image of an object key;
   b. extracting attributes of an object key;
   c. recognizing a pixel pattern from an object image of the object key;
   d. producing a series of code signals with respect to each target pixel from the result of said recognition, said code signals defining traits of the recognized pixel pattern for each target pixel, said pixel patterns defining attributes of the object key;
   e. comparing the code signals from a pattern recognition means with a corresponding master code signal from a discrimination means having a pattern memory in which a set of predetermined master patterns is stored, said predetermined master patterns being a plurality of master code signals, said master code signals defining traits of a master pixel pattern, said master pixel pattern defining attributes of a selected manufacturer's key;
   f. producing an identifying signal, said identifying signal defines a corresponding key blank having a hole in the handle thereof with a predetermined master pattern having master code signals that match code signals from the result of the recognition of the pixel pattern of the object key, whereby, a corresponding key blank matching attributes of a known manufacturer's key may be determined.

81. A key making apparatus as in one of claims 3–7, 9–11, 14–16, 21–31, or 64–66, in which the means for establishing an operative positional relationship comprises:

a. a means for loosely supporting the object key consisting of a surface having a transparent section on which the object key may be placed being rotatable, the transparent section having a blade section proximate to a handle section, said handle section being movable vertically from an upper position which is parallel to the plane of the blade section to a lower position at a spaced distance below the plane of the blade section, said handle section being sized and adapted to support the handle of the object key having a blade and a handle, said blade section being sized and adapted to support the blade of the object key;

b. a means for determining the position of the longitudinal axis of the object key relative to a light stripe which may be projected on the object key by a light stripe generator from the output signal produced by the receiving means;

c. a means for rotating the means for loosely supporting the object key;

d. an object key positioning control means that is operably connected and responsive to an output signal from the means for determining the position of the object key and that is operably connected to the means for rotating the means for loosely supporting the object key, whereby, the longitudinal axis of the object key can be aligned perpendicular to a light stripe which may be projected on to the object key by a light stripe generator; and e. a means for aligning the object key with a horizontal plane comprising:

a horizontal light generator arranged and adapted to project a generally horizontal beam of light immediately above the means for loosely supporting the object key and transverse to the blade of the object key which may be supported on the transparent section thereof;

a horizontal light receiver disposed to receive light from the horizontal light generator that is not obstructed by the blade of the object key disposed on the blade section of the means for loosely supporting the object key, which receiver produces at least one output signal;

a means for adjusting the vertical elevation of the handle section of the means for loosely supporting the object key;

a horizontal control means that is operably connected and responsive to the output signal from the horizontal light receiver and that is operably connected to the means for adjusting the vertical elevation of the handle section of the means for loosely supporting the object key, whereby, an object key having a handle thickness larger than its blade thickness which is disposed on the transparent section of the means for loosely supporting the object key may be aligned with a horizontal plane by lowering the handle section on which the handle of the object key is supported in response to the output signal generated by the horizontal light receiver arranged to receive light when the blade of said object key is not disposed flatly on said blade section.

82. The key making apparatus of claim 6, wherein the non-contact means for extracting attributes of an object key comprises:

a. a light stripe generator which arranged and adapted to project at least one light stripe obliquely on to an object key;

b. a means for receiving an object image is arranged and adapted to receive an image of the projected light stripe reflected from the object key; and c. a means for identifying attributes relating to key cut codes of an object key that is operably connected and responsive to the output signal from the means for receiving an object image.

83. The key making apparatus of claim 21, wherein the non-contact means for extracting attributes of an object key comprises:

a. a means for storing memory data of rejected object keys that do not have corresponding master code signals matching the code signals from the result of said recognition of the pixel pattern of the object key,
    whereby, the key making apparatus may acquire additional information about keys that are not as yet available in its master pattern memory.

84. A method for automatically making keys which comprises:

a. projecting a generally horizontal beam of light immediately above a means for supporting an object key and transverse to the blade of the object key supported thereon;

b. receiving the light of the horizontal beam that is not obstructed by the blade of an object key disposed on the blade section of the means for supporting an object key and producing at least one output signal;

c. incrementally lowering the vertical elevation of the handle section of the means for supporting an object key in relation to said second output signal; and d. repeating sequential steps a, b, and c, a specified number of times;

e. producing a non-existent key rejection signal from such specified number of repetitions, said nonexistent key rejection signal defining a lack of an object key blocking the light reception, indicating that the object key was not disposed on the supporting means; and, in response to said non-existent key rejection signal:

f. turning on an overhead light, displaying instructions, and opening an access door.

85. The key making apparatus of claim 2, wherein the non-contact means for extracting attributes of an object key comprises:

a means for lighting arranged and adapted to project light onto an object key disposed on the surface and reveal an image of an object key positioned thereon;

a means for receiving at least one object image of an object key positioned on said surface and producing an output signal; and a means for identifying attributes of an object key that is operably connected and responsive to the output signal of the means for receiving an object image of the object key.

86. The key making apparatus of claim 85, further comprising a means for adjusting the focal plane viewed by the means for receiving an object image of an object key.

87. The key making apparatus of claim 85, wherein the means for lighting comprises a light source.

88. The key making apparatus of claim 85, wherein the means for receiving an object image comprises at least one camera, said camera having a lens capable of viewing a shallow focal plane.

89. The key making apparatus of claim 88, wherein the camera has a zoom lens.

90. The key making apparatus of claim 86, wherein the means for adjusting the focal plane viewed by the means for receiving an object image of an object key comprises a lens with a variable focus.

91. The key making apparatus of claim 86, wherein the means for adjusting the focal plane viewed by the means for receiving an object image of an object key comprises a means for varying the distance between an object key disposed on the supporting surface and the means for receiving an object image.

92. The key making apparatus of claim 91, wherein the means for varying the distance between an object key disposed on the supporting surface and the means for receiving an object image comprises a means for moving the supporting surface relative to the means for receiving an object image.

93. The key making apparatus of claim 91, wherein the means for varying the distance between an object key disposed on the supporting surface and the means for receiving an object image comprises a means for moving the means for receiving an object image relative to the supporting surface.

94. The key making apparatus of claim 85, wherein the non-contact means for extracting attributes of an object key further comprises:

a means for aligning the supporting means and the means for receiving an object image of an object key, whereby, a revealed image of an object key disposed on the supporting means may be received by the means for receiving an object image of an object key producing an output signal.

95. A key making apparatus comprising:

a non-contact means for extracting attributes of an object key having means for lighting arranged and adapted to project light onto an object key disposed on a supporting means and reveal an image of an object key positioned thereon, means for receiving at least one object image of an object key positioned on said supporting means and producing an output signal, and means for identifying attributes of an object key that is operably connected and responsive to the output signal of the means for receiving an object image of the object key, wherein the means for identifying attributes of an object key comprises:

a. a pattern recognition means for recognizing a pixel pattern from an object image of the object key, and for producing a series of code signals with respect to each target pixel from the result of said recognition, said code signals defining traits of the recognized pixel pattern for each target pixel, said pixel patterns defining attributes of the object key; and b. a discrimination means having a pattern memory in which a set of predetermined master patterns is stored, said predetermined master patterns being a plurality of master code signals, said master code signals defining traits of a master pixel pattern, said master pixel pattern defining attributes of a selected manufacturer's key, for comparing the code signals from the pattern recognition means with a corresponding master code signal, and for producing an identifying signal, said identifying signal defines a corresponding key blank having a hole in the handle thereof with a predetermined master pattern having master code signals that match code signals from the result of the recognition of the pixel pattern of the object key, whereby, a corresponding key blank matching attributes of a known manufacturer's key may be determined.

96. A key making apparatus comprising:

a non-contact means for extracting attributes of an object key having means for lighting arranged and adapted to project light onto an object key disposed on a supporting means and reveal an image of an object key positioned thereon, means for receiving at least one object image of an object key positioned on said supporting means and producing an output signal, and means for identifying attributes of an object key that is operably connected and responsive to the output signal of the means for receiving an object image of the object key, wherein the means for identifying attributes of an object key comprises:

a. a pattern recognition means for recognizing an integrated pixel pattern from a plurality of discrete object images of the object key, and for producing a series of code signals with respect to each target pixel from the result of said recognition, said code signals defining traits of the recognized pixel pattern for each target pixel, said integrated pixel pattern defining attributes of the object key; and b. a discrimination means having a pattern memory in which a set of predetermined master patterns is stored, said predetermined master patterns being a plurality of master code signals, said master code signals defining traits of a master pixel pattern, said master pixel pattern defining attributes of a selected manufacturer's key, for comparing the code signals from the pattern recognition means with a corresponding master code signal, and for producing an identifying signal, said identifying signal defines a corresponding key blank having a hole in the handle thereof with a predetermined master pattern having master code signals that match code signals from the result of the recognition of the pixel pattern of the object key, whereby, a corresponding key blank matching attributes of a known manufacturer's key may be determined.

97. The key making apparatus of claim 96, wherein each of the discrete object images of the object key comprises a pixel pattern from a discrete focal plane in which the object key lies.

98. The key making apparatus of claim 95, wherein the identifying signal further defines a key cut code identified with the corresponding key blank, whereby, key cuts conforming to the key cut codes of a known manufacturer's key may be determined.

99. The key making apparatus of claim 96, wherein the identifying signal further defines a key cut code identified with the corresponding key blank, whereby, key cuts conforming to the key cut codes of a known manufacturer's key may be determined.

100. The key making apparatus of claim 95, wherein the identifying signal further defines key cut features of the object key that correspond generally with key cut codes identified with the corresponding key blank, whereby, the key cut features of the object key may be determined for use with the corresponding key blank.

101. The key making apparatus of claim 96, wherein the identifying signal further defines key cut features of the object key that correspond generally with key cut codes identified with the corresponding key blank, whereby, the key cut features of the object key may be determined for use with the corresponding key blank.

102. The key making apparatus of claim 95, wherein the identifying signal further defines both a key cut code and key cut features of the object key that correspond generally with key cut codes identified with the corresponding key blank, whereby, key cuts hybridizing the key cut features of the object key and the key cut codes of a known manufacturer's key may be determined for use with the corresponding key blank.

103. The key making apparatus of claim 96, wherein the identifying signal further defines both a key cut code and key cut features of the object key that correspond generally with key cut codes identified with the corresponding key blank, whereby, key cuts hybridizing the key cut features of the object key and the key cut codes of a known manufacturer's key may be determined for use with the corresponding key blank.

* * * * *